(12) United States Patent
Fenech, III et al.

(10) Patent No.: US 9,676,537 B2
(45) Date of Patent: Jun. 13, 2017

(54) PACKAGE OPENING FEATURE AND METHODS OF MANUFACTURING SAME

(71) Applicant: Intercontintental Great Brands LLC, East Hanover, NJ (US)

(72) Inventors: Louis Peter Fenech, III, East Hanover, NJ (US); Rachel Leichte, East Hanover, NJ (US); Jeffrey Thomas Weber, East Hanover, NJ (US); Evan Ziolkowski, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

(21) Appl. No.: 14/773,016

(22) PCT Filed: Mar. 10, 2014

(86) PCT No.: PCT/US2014/022380
§ 371 (c)(1),
(2) Date: Sep. 4, 2015

(87) PCT Pub. No.: WO2014/164416
PCT Pub. Date: Oct. 9, 2014

(65) Prior Publication Data
US 2016/0016714 A1 Jan. 21, 2016

Related U.S. Application Data

(60) Provisional application No. 61/776,659, filed on Mar. 11, 2013.

(51) Int. Cl.
*B65D 65/26* (2006.01)
*B65D 75/58* (2006.01)
(Continued)

(52) U.S. Cl.
CPC .......... *B65D 75/5838* (2013.01); *B32B 27/08* (2013.01); *B32B 27/308* (2013.01);
(Continued)

(58) Field of Classification Search
CPC ............ B65D 75/5833; B65D 75/5838; B65D 75/5855; B65D 65/40; B65D 75/30
(Continued)

(56) References Cited

U.S. PATENT DOCUMENTS 5,333,735 A 8/1994 Focke
6,428,867 B1 8/2002 Scott
(Continued)

FOREIGN PATENT DOCUMENTS

CN 101209763 7/2008
CN 102730312 10/2012
(Continued)

OTHER PUBLICATIONS

Machine translation of description of JP 2002255229 A.*
(Continued)

*Primary Examiner* — Jes F Pascua
(74) *Attorney, Agent, or Firm* — Fitch, Even, Tabin & Flannery LLP

(57) ABSTRACT

Flexible film packages having an easily opened package feature incorporated therein and method of producing such packages are provided. The package opening feature may be incorporated into a variety of package formats such as flow wrapped packages having a longitudinal seal (including fin seals or lap seals) or packages with side seals (including two-, three-, or four-side seal pouches). In one illustrative approach, the package opening feature is disposed adjacent or at a package seal, such as, for example, an end seal, a top seal, a bottom seal, a side seal, or a longitudinal seal. The flexible film laminate has at least first and second film layers,
(Continued)

and at least one of the film layers defining an interior cavity configured to hold food products. In a number of configurations, the flexible film packages may be reclosable or resealable.

8 Claims, 39 Drawing Sheets

(51) Int. Cl.
  B32B 27/08 (2006.01)
  B32B 27/30 (2006.01)
  B32B 27/32 (2006.01)
  B32B 27/36 (2006.01)
  B65B 61/04 (2006.01)
  B65B 61/18 (2006.01)
  B65D 65/40 (2006.01)
  B65D 75/30 (2006.01)

(52) U.S. Cl.
  CPC .............. B32B 27/32 (2013.01); B32B 27/36 (2013.01); B65B 61/04 (2013.01); B65B 61/184 (2013.01); B65D 65/40 (2013.01); B65D 75/30 (2013.01); B65D 75/5833 (2013.01); B65D 75/5855 (2013.01); B32B 2439/00 (2013.01)

(58) Field of Classification Search
  USPC ....... 229/87.05; 383/210, 211, 66, 203, 204, 383/207, 208, 209
  See application file for complete search history.

(56) References Cited

U.S. PATENT DOCUMENTS

| | | | |
|---|---|---|---|
| 6,616,334 B2 | 9/2003 | Faaborg | |
| 6,918,532 B2 | 7/2005 | Sierra-Gomez | |
| 7,475,781 B2 | 1/2009 | Kobayashi | |
| 7,681,732 B2* | 3/2010 | Moehlenbrock | B32B 7/12 206/459.1 |
| 8,114,451 B2 | 2/2012 | Sierra-Gomez | |
| 8,256,636 B2* | 9/2012 | Huffer | B65D 77/2036 220/266 |
| 8,545,099 B2* | 10/2013 | Davis | B29C 59/007 220/266 |
| 8,616,374 B2* | 12/2013 | Hemmerlin | B65D 75/5844 206/440 |
| 8,814,430 B2* | 8/2014 | Veternik | B65D 75/5844 229/87.05 |
| 2005/0276525 A1 | 12/2005 | Hebert | |
| 2005/0284776 A1 | 12/2005 | Kobayashi | |
| 2008/0063325 A1* | 3/2008 | Miller | B65D 75/20 383/211 |
| 2010/0018974 A1* | 1/2010 | Lyzenga | B65D 75/5838 220/214 |
| 2010/0172604 A1* | 7/2010 | Andersson | B65D 75/366 383/211 |
| 2010/0278454 A1 | 11/2010 | Huffer | |
| 2011/0127319 A1 | 6/2011 | Golden | |
| 2011/0132976 A1 | 6/2011 | Drewnowski | |
| 2012/0177307 A1* | 7/2012 | Duan | B65D 75/5833 383/211 |
| 2013/0056469 A1* | 3/2013 | Davis | B29C 59/007 220/266 |
| 2013/0056470 A1* | 3/2013 | Hallak | B65D 75/5855 220/270 |
| 2013/0121624 A1* | 5/2013 | Lyzenga | B65B 9/067 383/203 |
| 2013/0177263 A1* | 7/2013 | Duan | B65D 75/5833 383/95 |
| 2013/0270268 A1* | 10/2013 | Lyzenga | B65D 75/5838 220/269 |
| 2014/0363545 A1* | 12/2014 | Veternik | B65D 75/5844 426/108 |
| 2015/0016756 A1* | 1/2015 | Down | B65D 75/5833 383/203 |

FOREIGN PATENT DOCUMENTS

| | | |
|---|---|---|
| EP | 1939107 | 7/2008 |
| EP | 1939107 A1 | 7/2008 |
| JP | 57163658 | 10/1982 |
| JP | 2002255229 A | * 9/2002 |
| JP | 2003300537 A | * 10/2003 |
| JP | 2008239187 A | * 10/2008 |
| JP | 2009062096 A | * 3/2009 |
| JP | 2012086848 A | * 5/2012 |
| WO | 2011146658 | 11/2011 |
| WO | 2011146658 A1 | 11/2011 |

OTHER PUBLICATIONS

International Search Report for PCT/US2014/022380 dated Jun. 23, 2014.

International Search Report for PCT/US2014/022380 dated Jun. 23, 2014; 2 pages.

First Office Action and Chinese Search Report for Chinese Application No. 201480011865.6 dated Jun. 28, 2016; 9 pages.

* cited by examiner

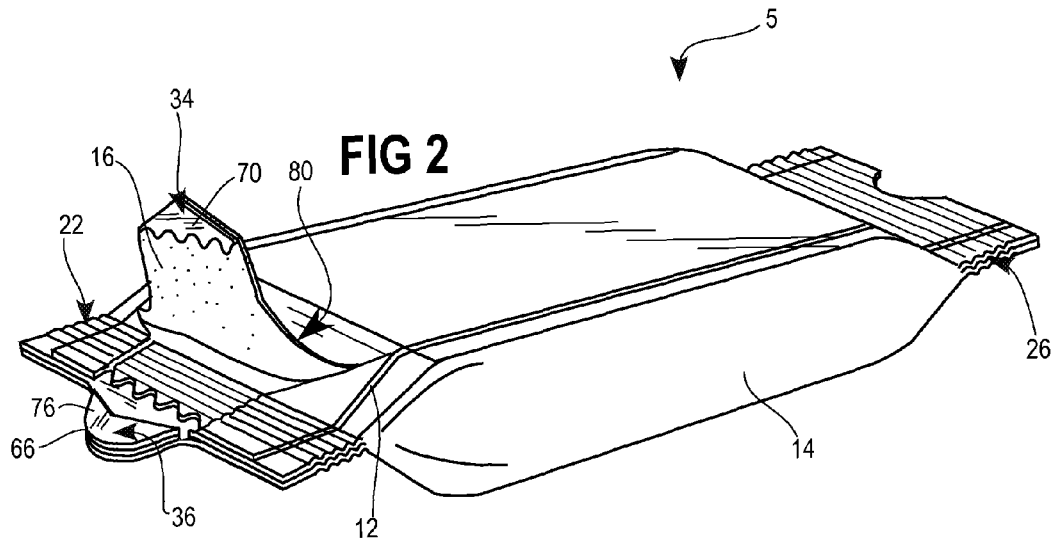
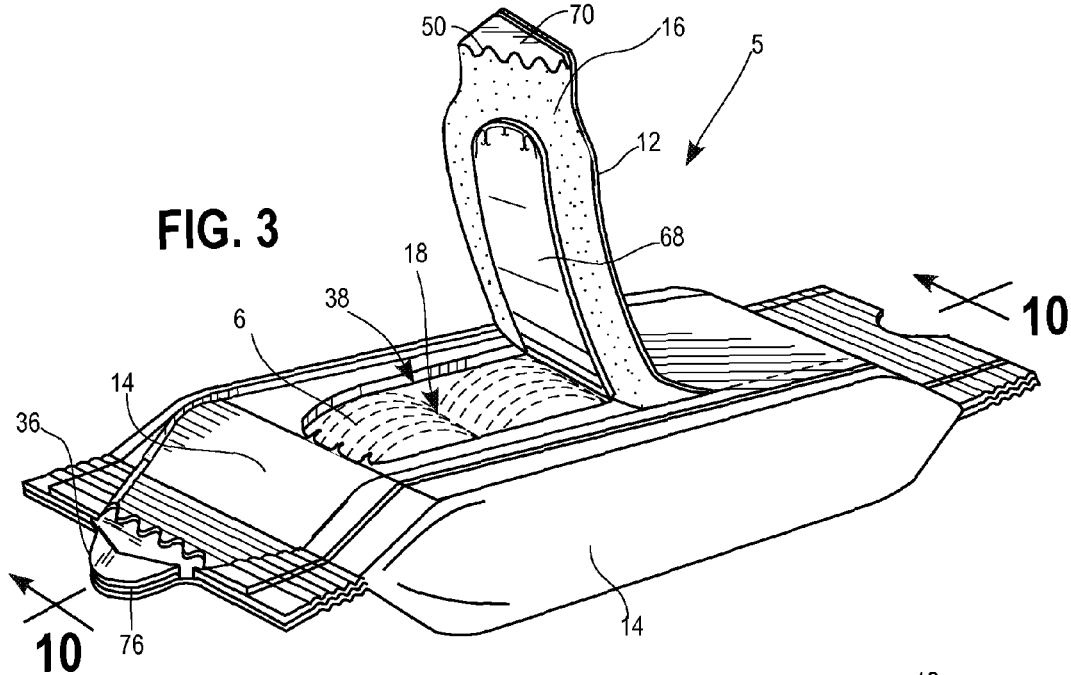
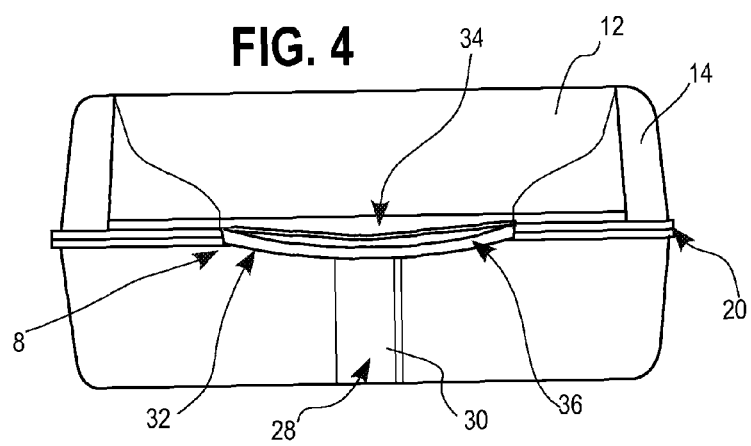

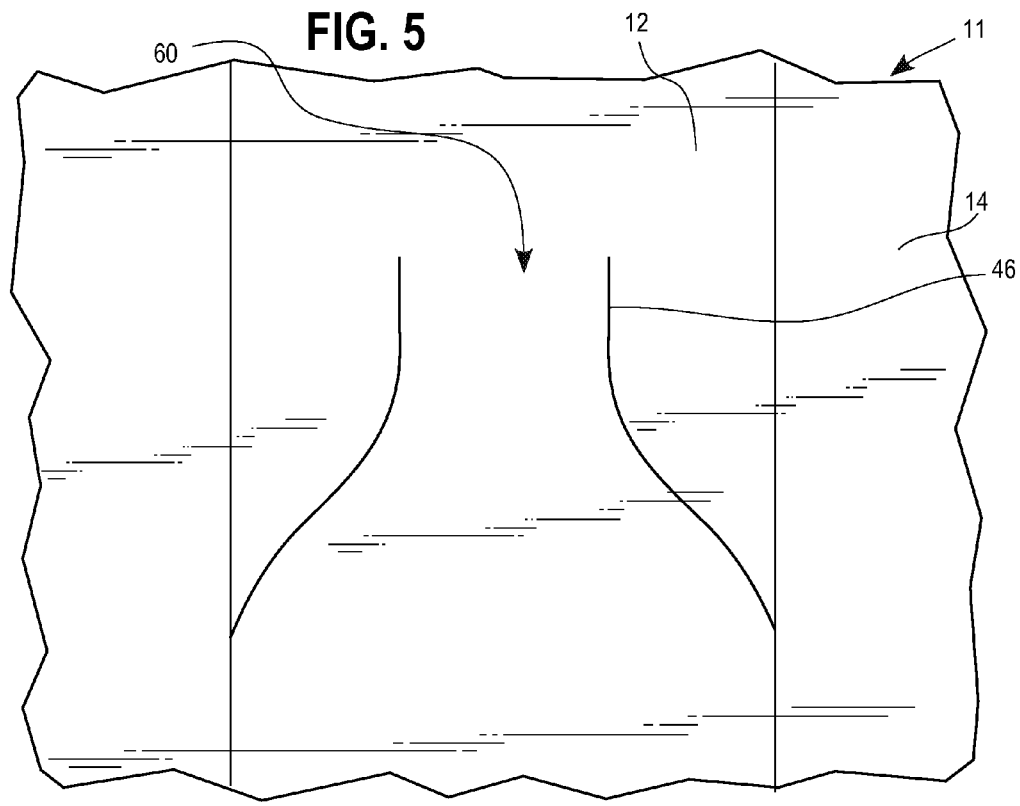
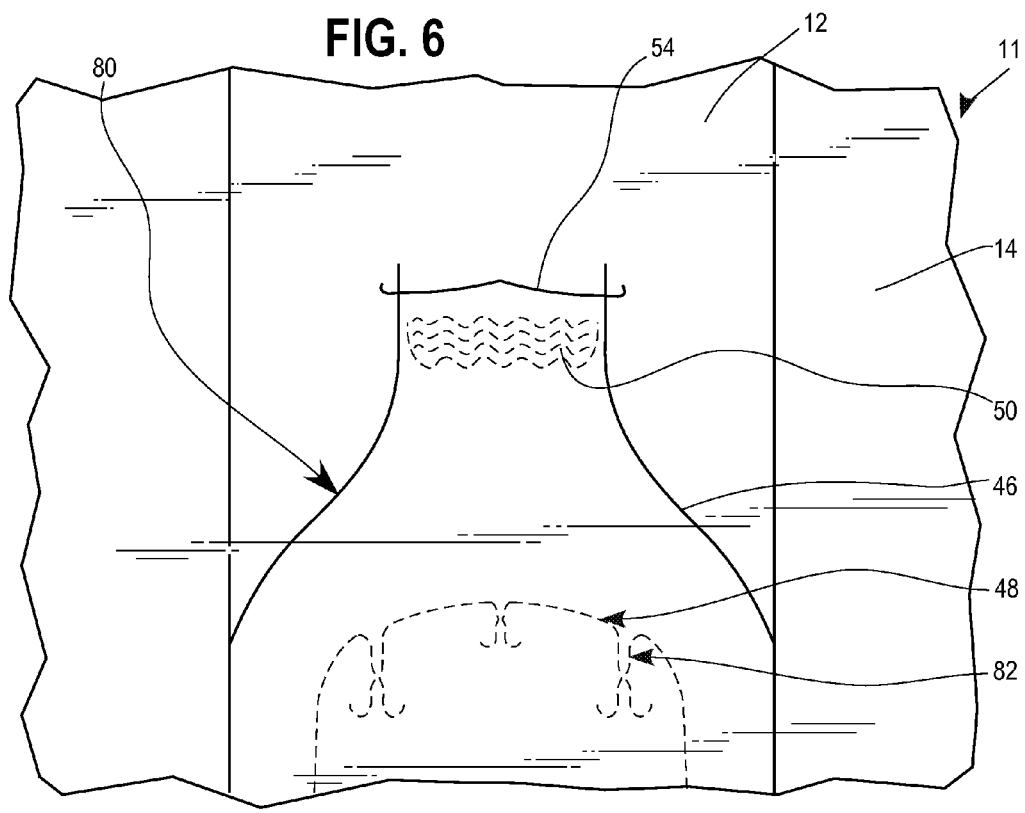

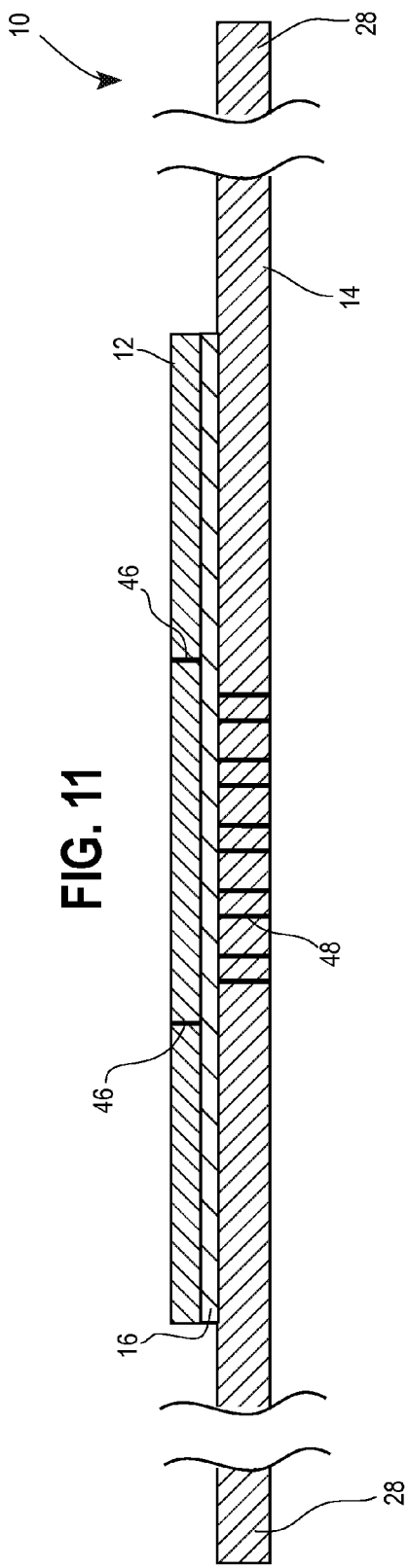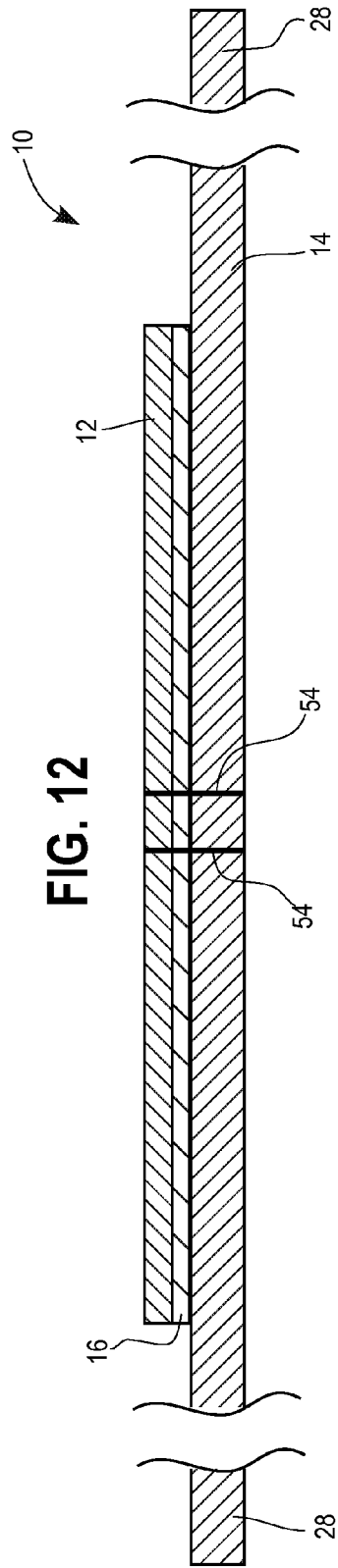

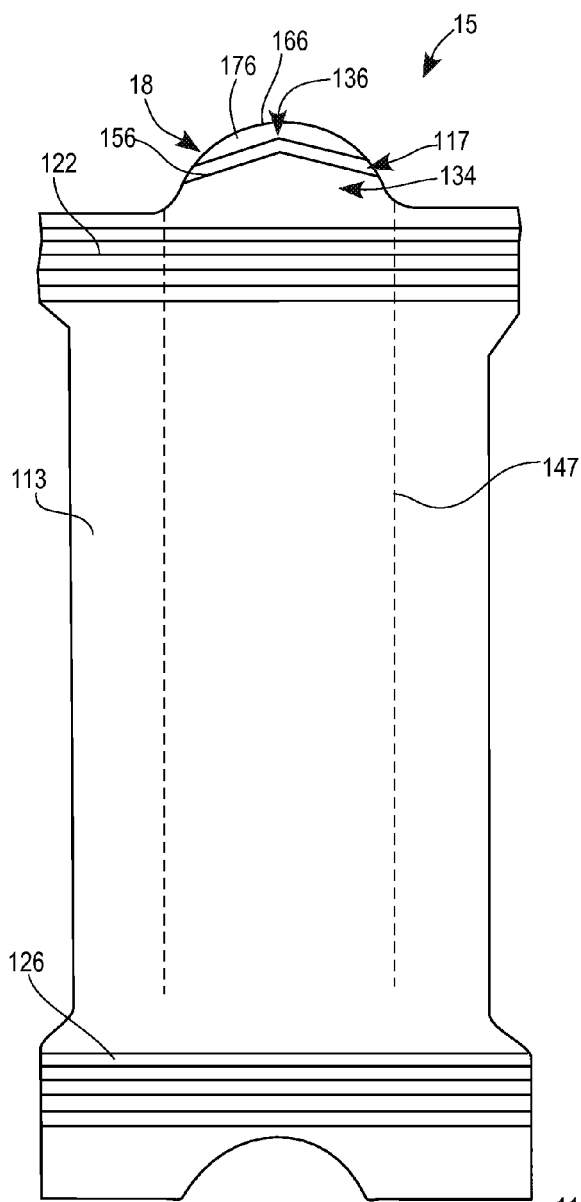
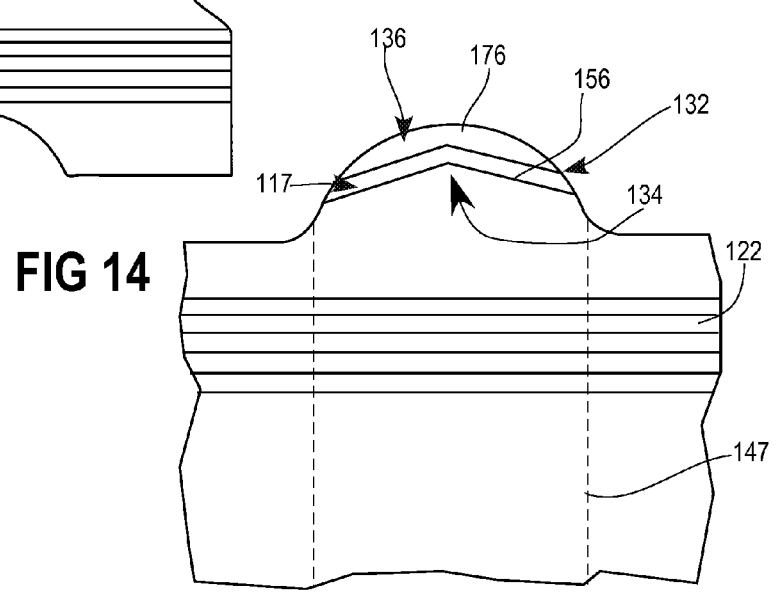

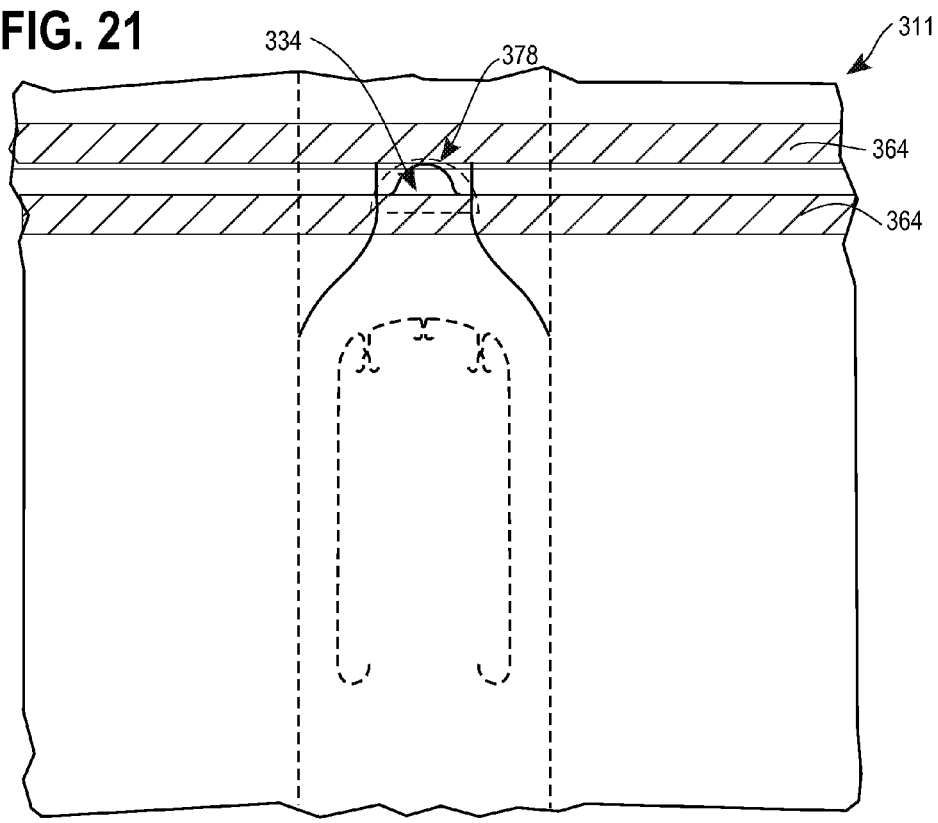
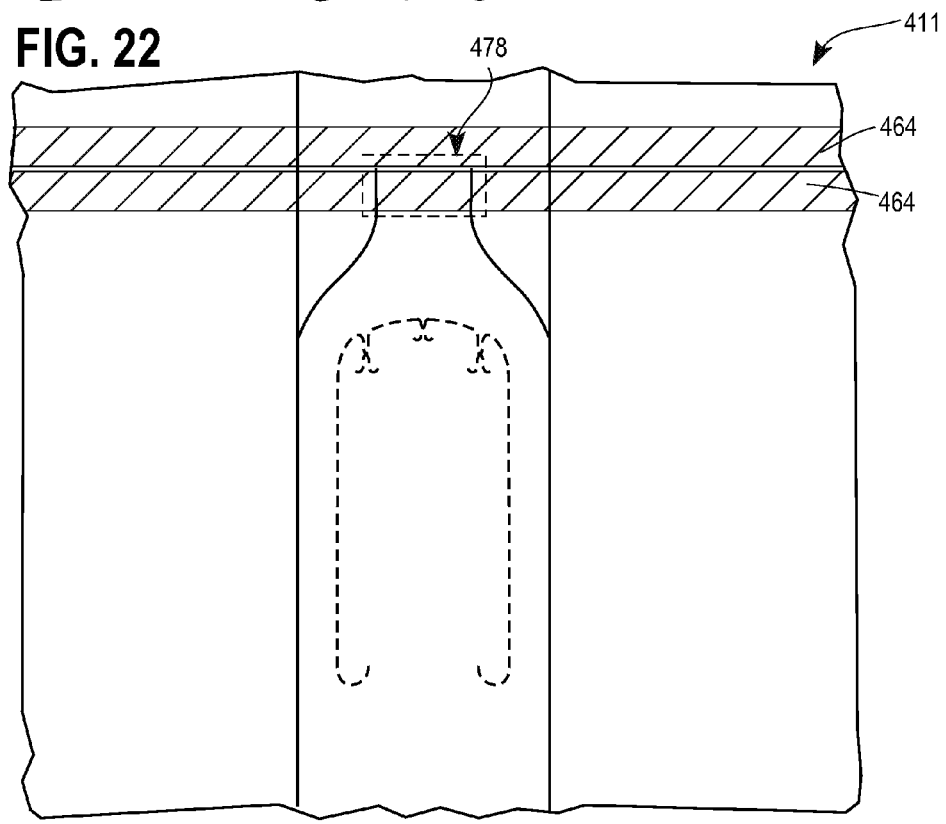

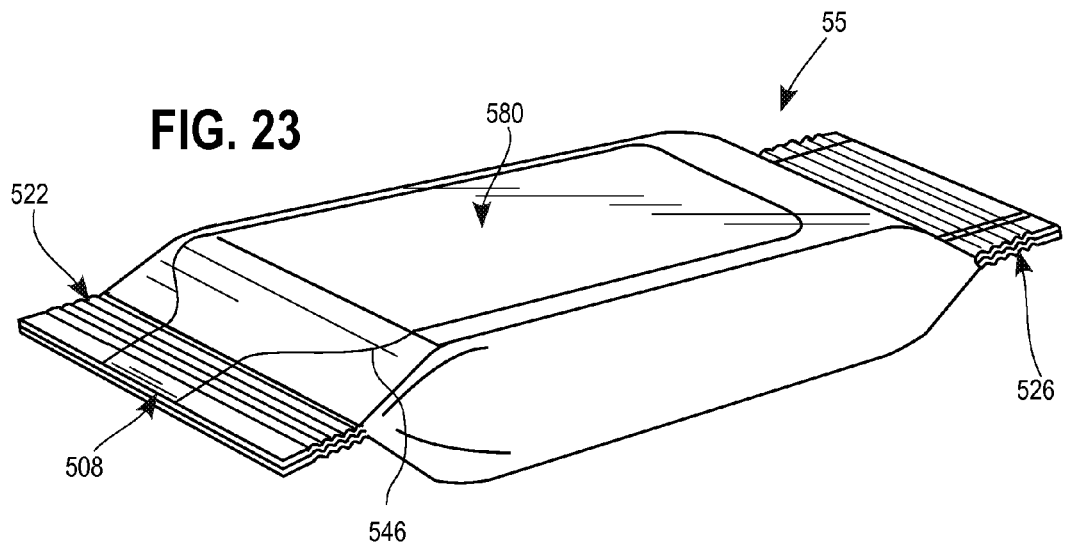
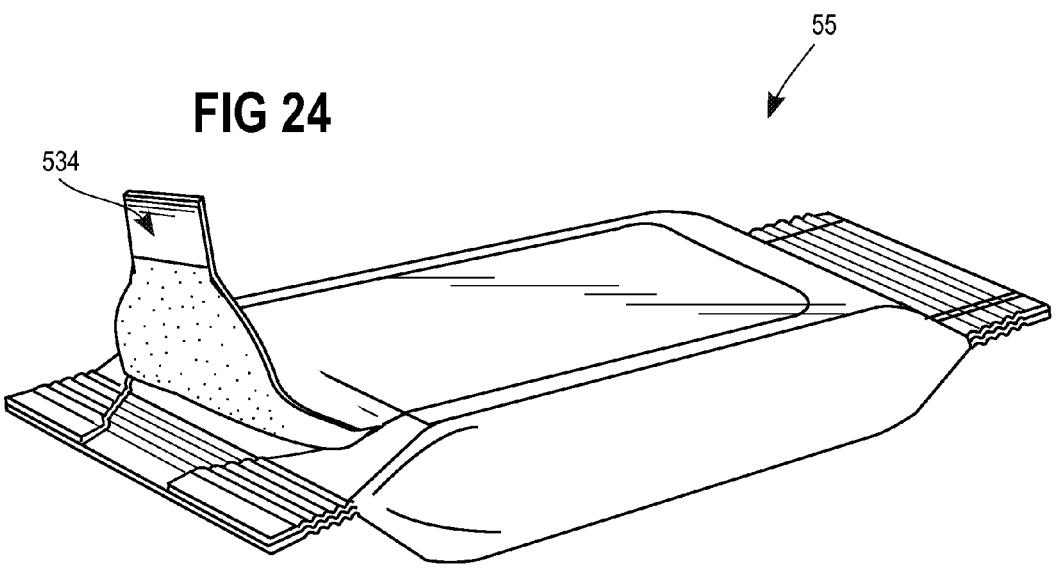

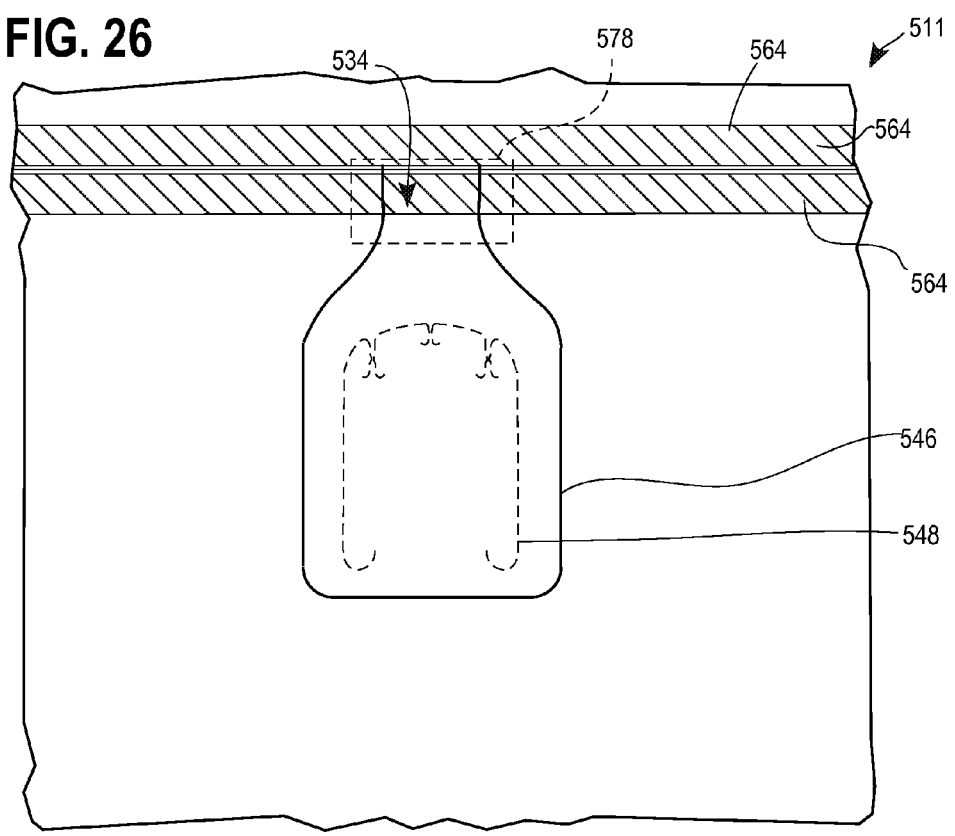
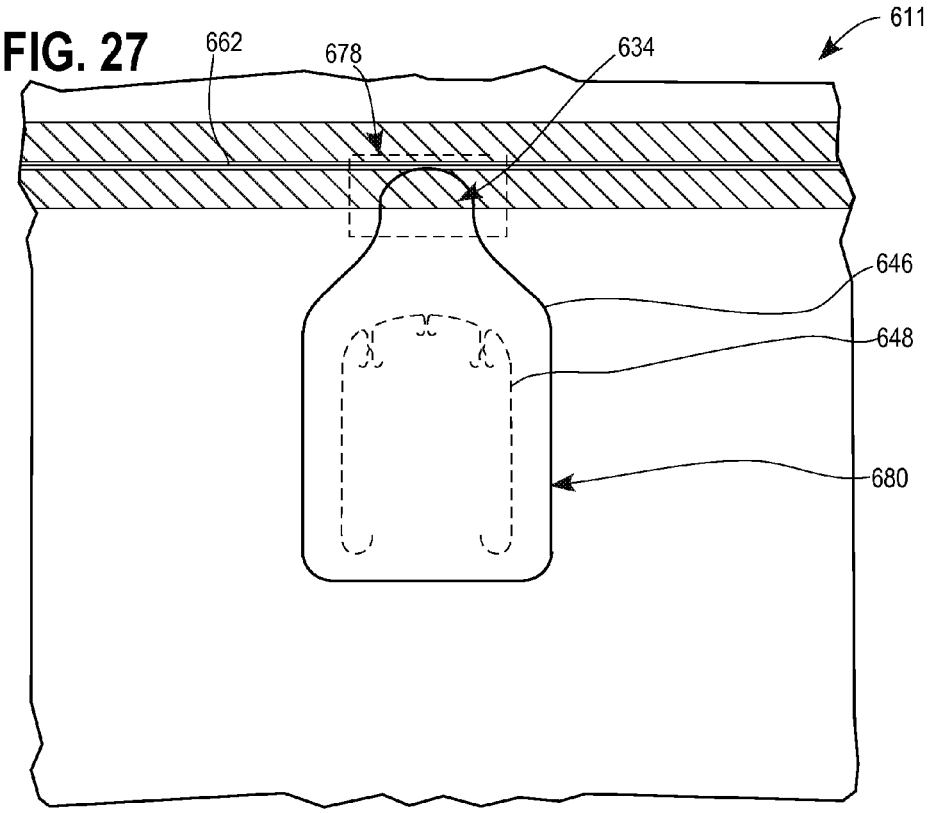

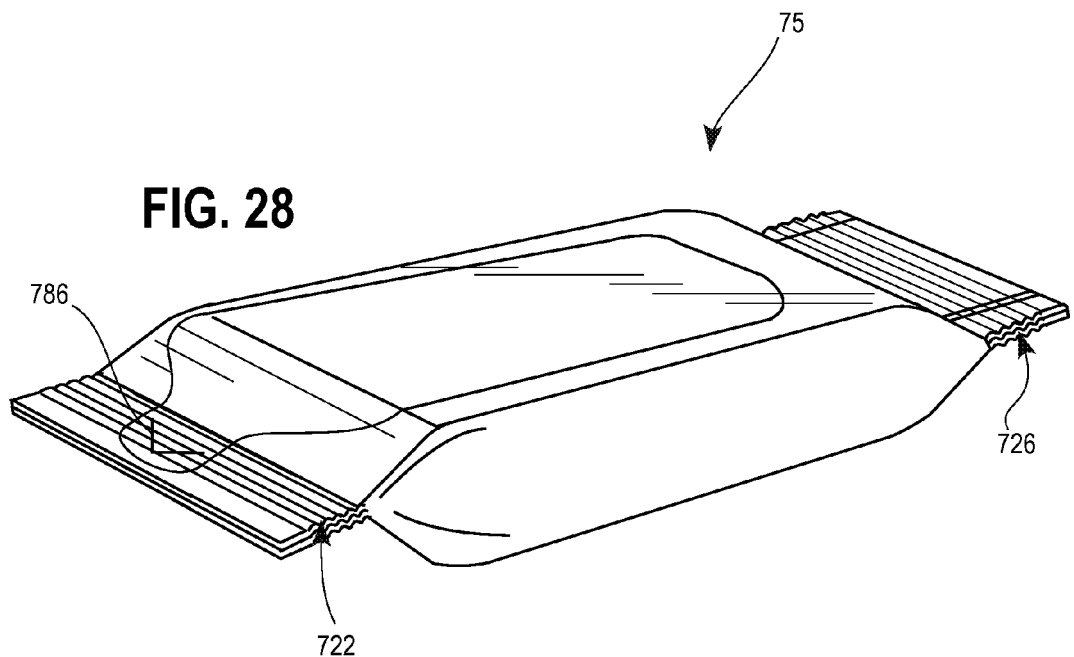
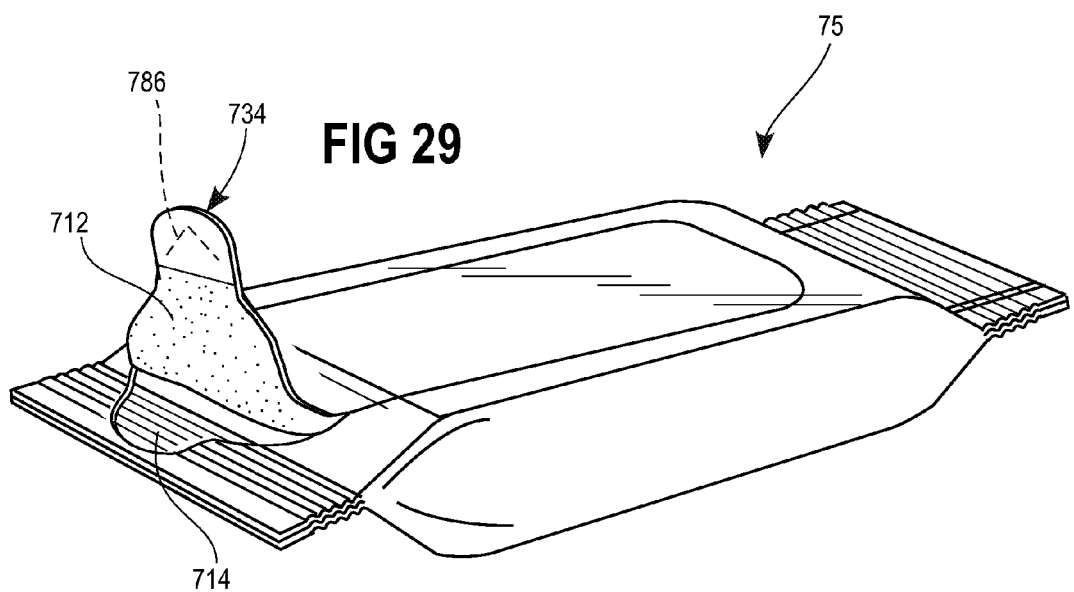

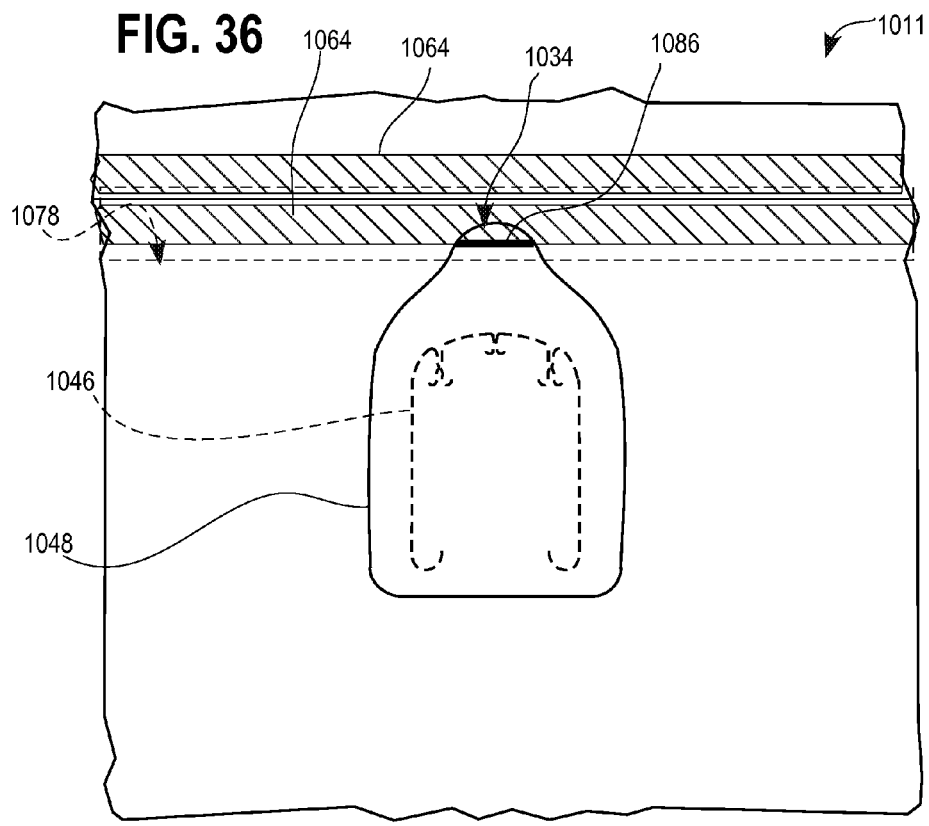
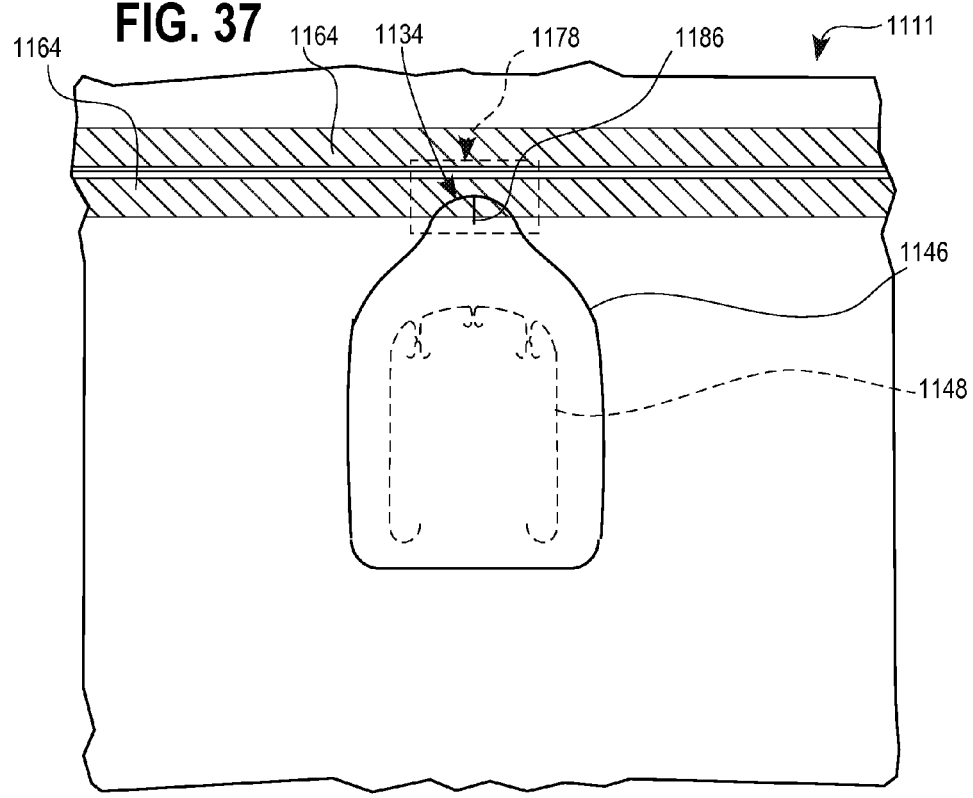

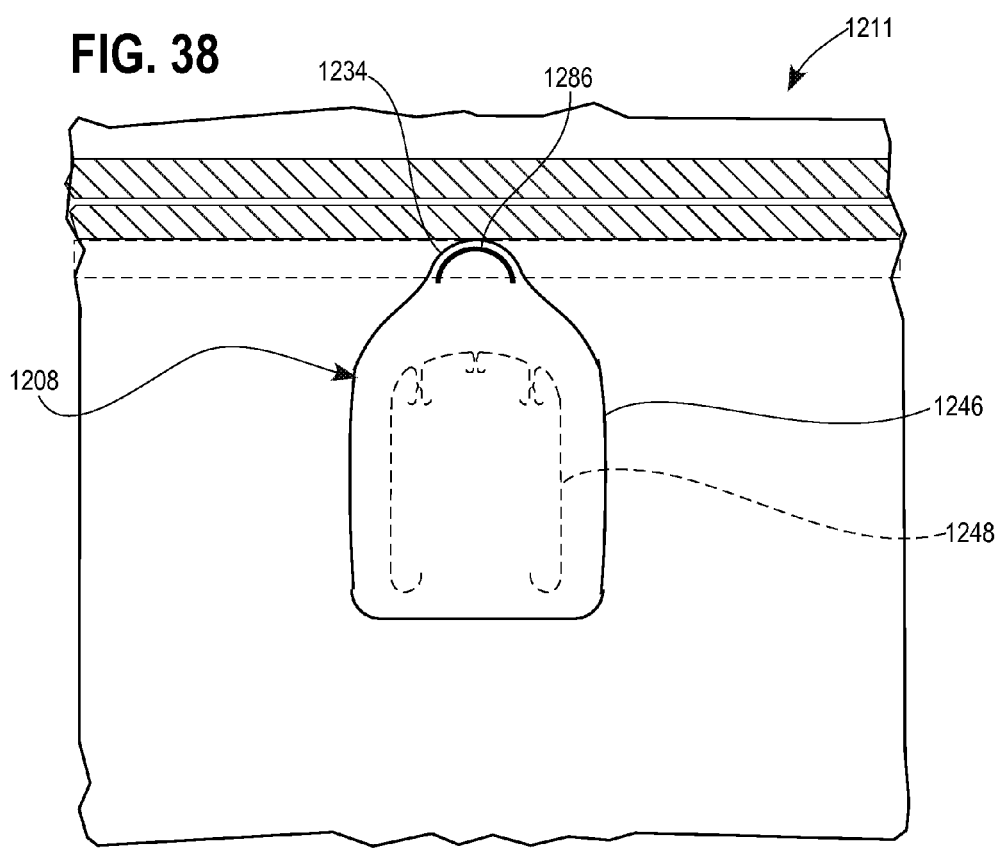
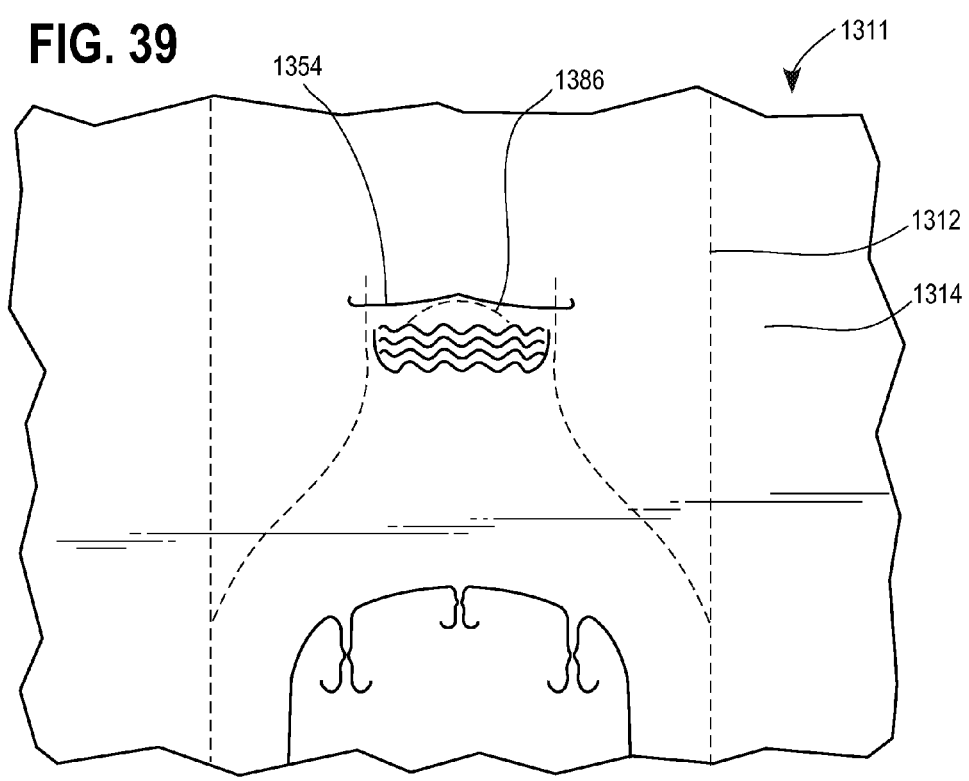

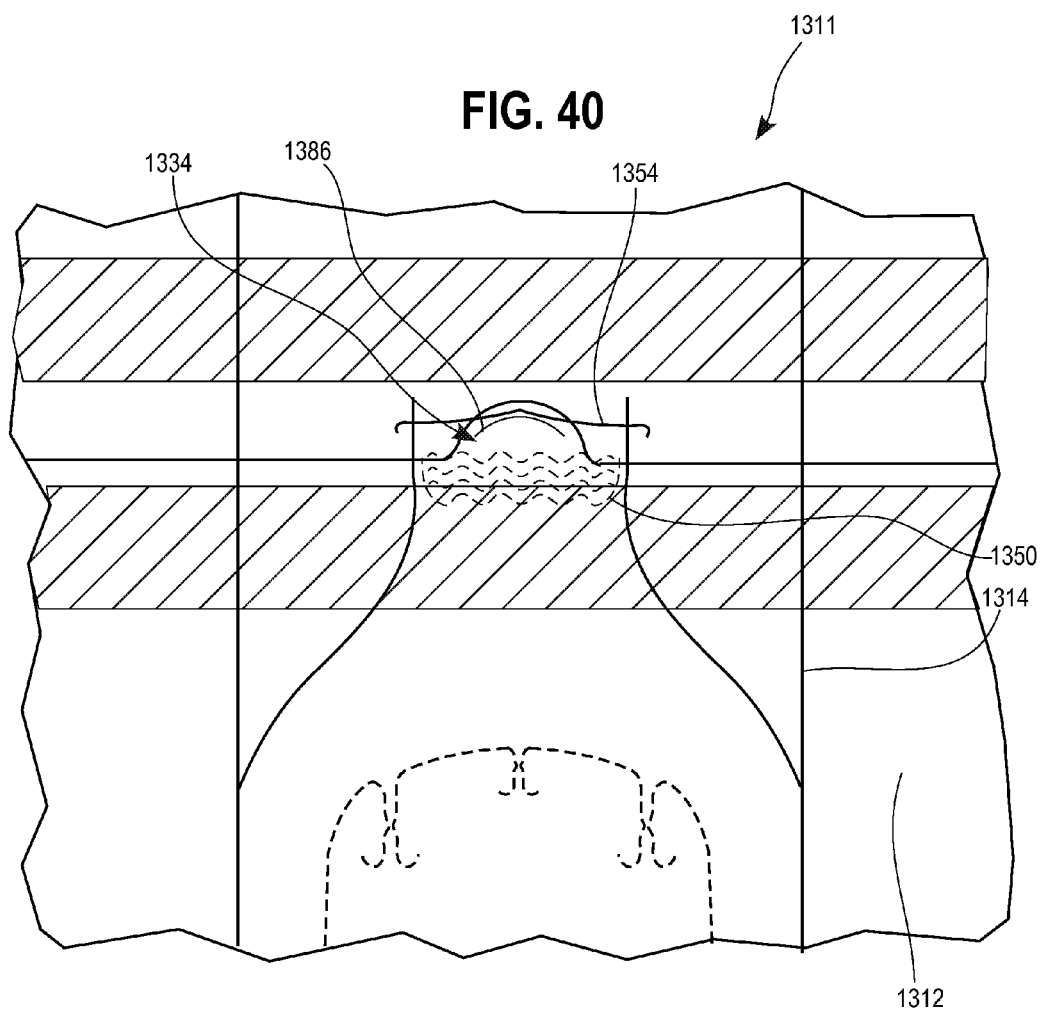

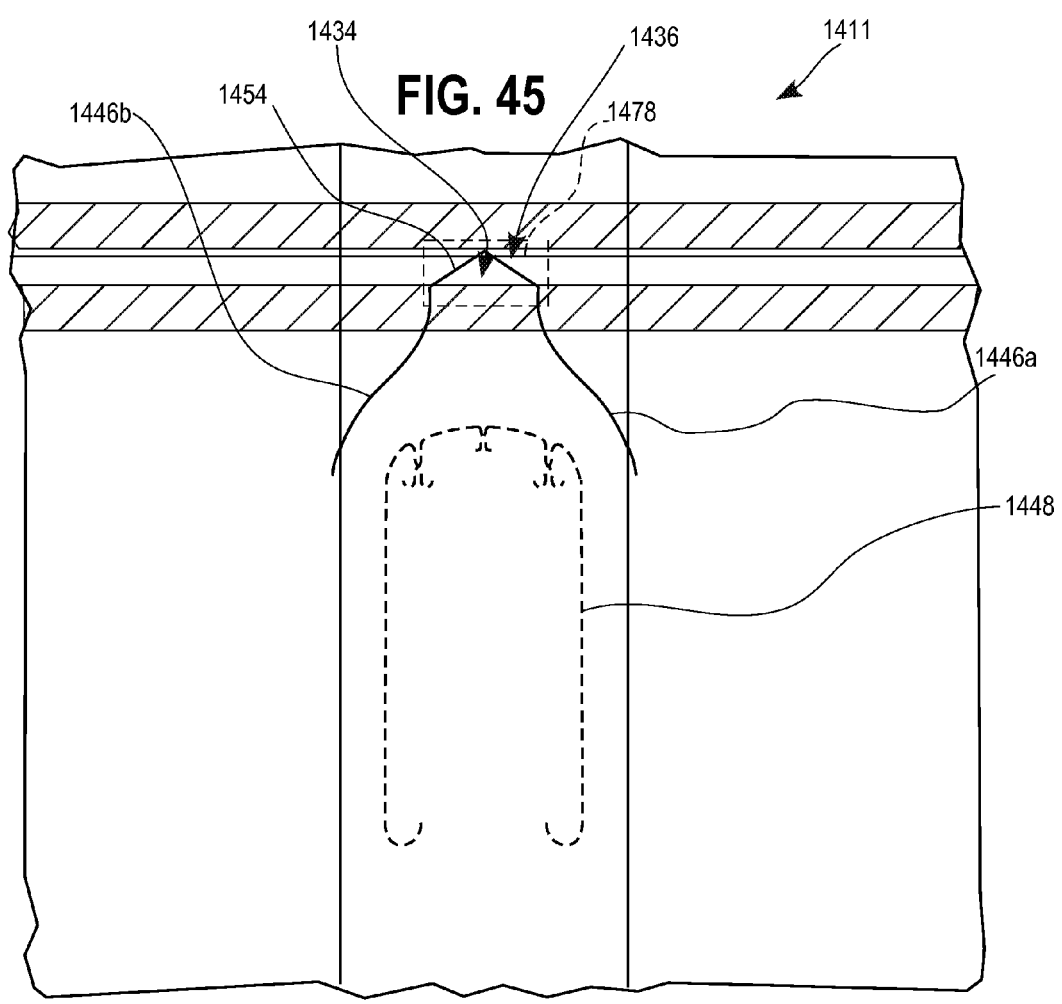

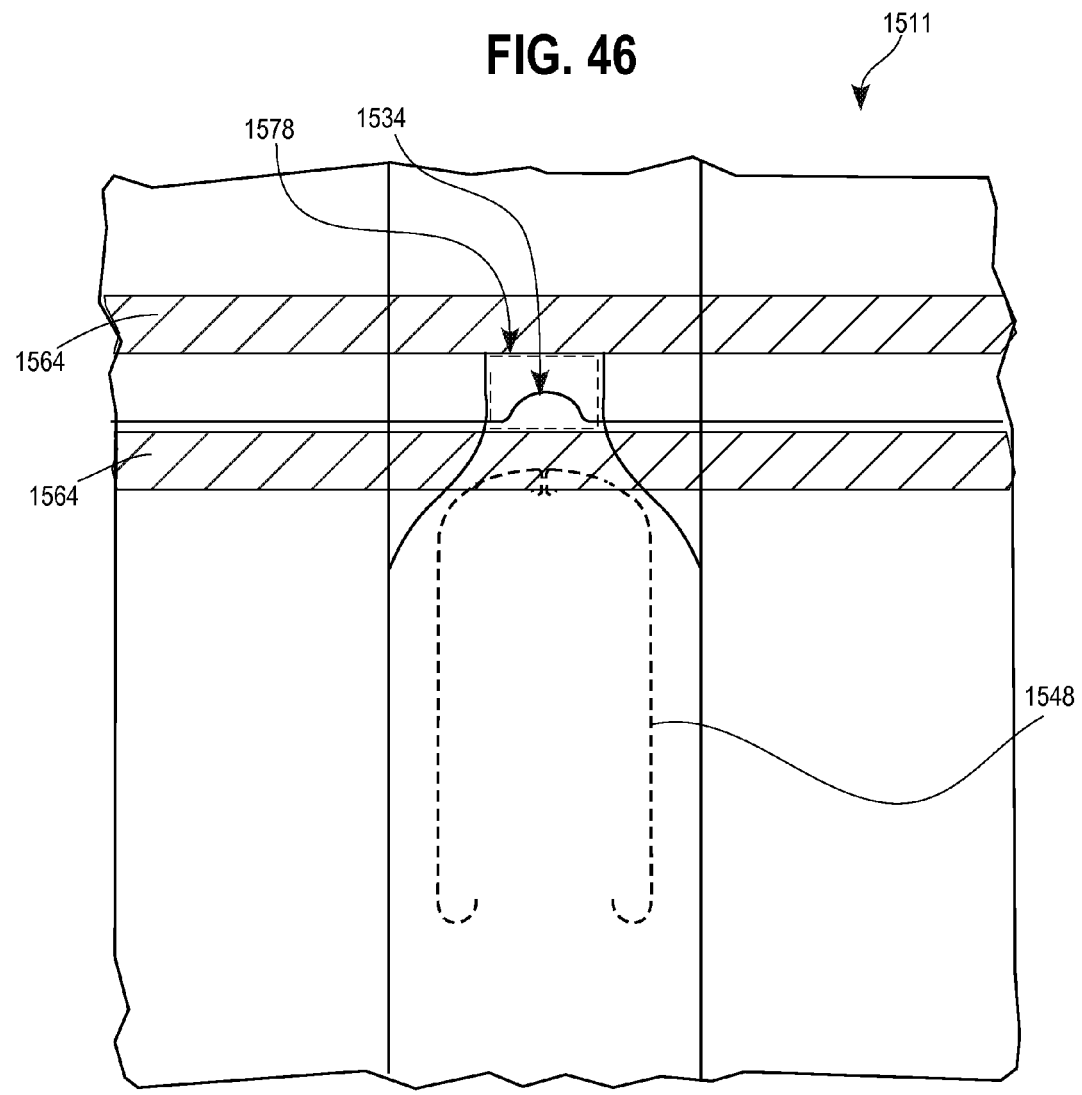

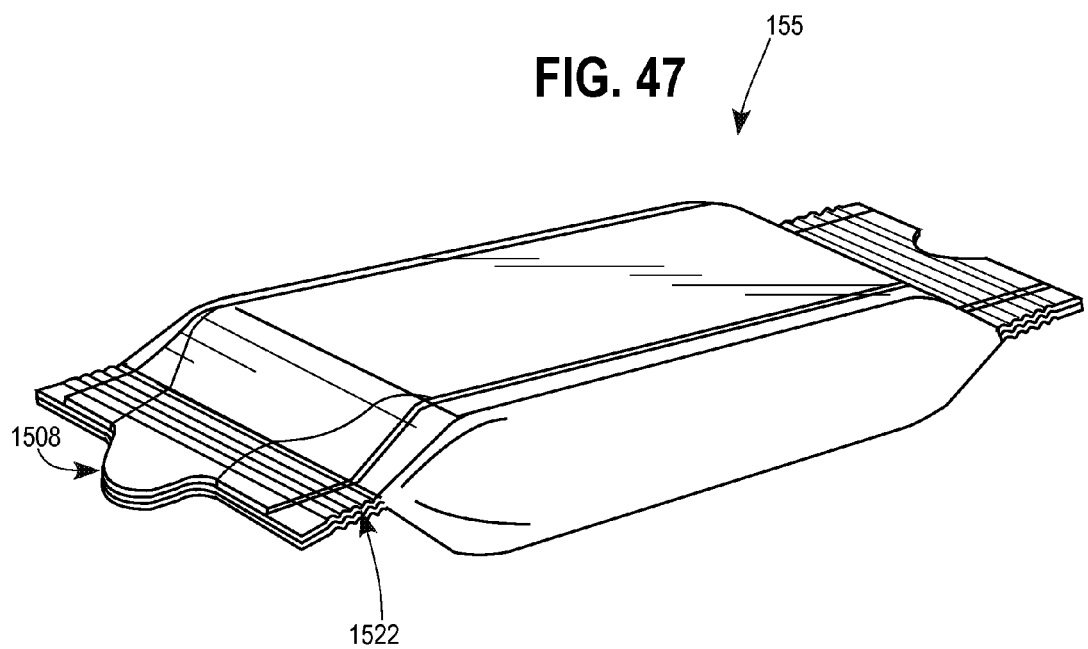
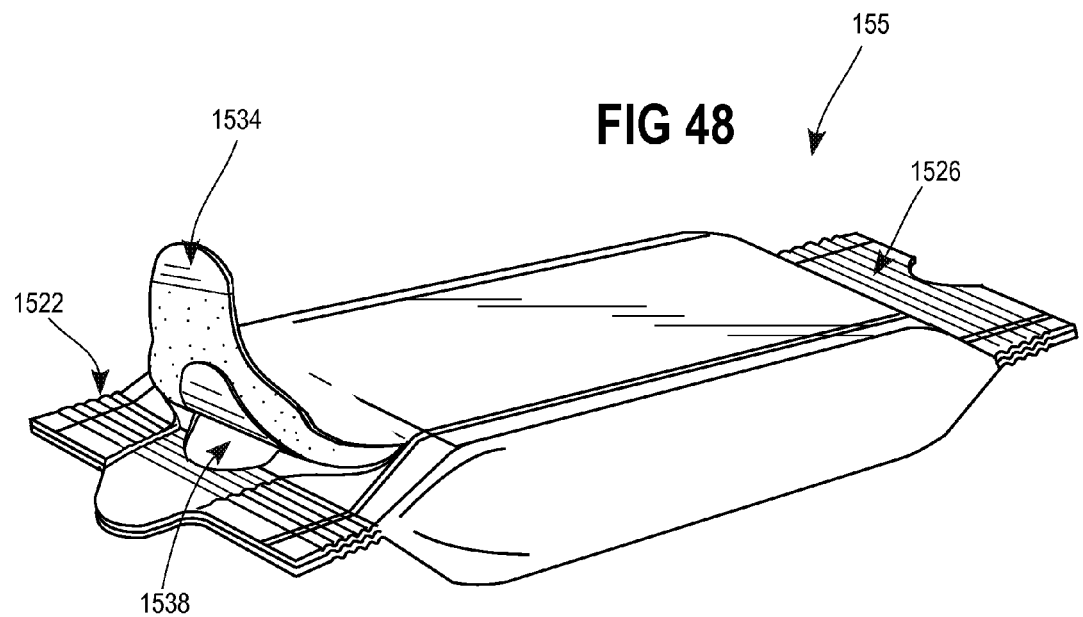

PACKAGE OPENING FEATURE AND METHODS OF MANUFACTURING SAME

CROSS-REFERENCE TO RELATED APPLICATIONS

This application is a U.S. National Phase application filed under 35 U.S.C. §371 of International Application PCT/US2014/022380, filed Mar. 10, 2014, designating the United States, which claims the benefit of U.S. Provisional Patent Application No. 61/776,659, filed Mar. 11, 2013.

TECHNICAL FIELD

This disclosure relates generally to flexible packaging, and in particular, to flexible packaging having an opening feature.

BACKGROUND

Flexible film packages are well known in the art for storing and shipping products. These flexible film packages can provide a lightweight package with a hermetic seal. A partial or substantial hermetic seal makes such flexible film packages useful for storing a variety of food products, including, for example, crackers, chewing gum, chocolate, cookies, cheese sandwiches, biscuits, candy, meat products, and dried fruits and vegetables, to note but a few options. Further, such flexible film packages may be used for non-food applications, such as medical, pharmaceutical, or industrial packaging applications. Depending on the product, some of these flexible film packages also may contain structural supports, such as a frame or tray, whereas others may only contain the products to be packaged.

One type of flexible film package is formed from a single web of material that is formed or wrapped around a product. These 'flow-wrap' type packages (i.e., horizontally or vertically formed packages using a single web of material) are formed by enveloping or wrapping the product with the web of material and forming a longitudinal seal, such as a fin, bottom, or lap seal with two edge portions of the web of material. A pair of end seals may then be formed in the web to form the packages. In other embodiments, packages formed from more than a single web of material and with numerous side-seals can be formed. Because these types of packages can provide hermetically sealed enclosures, they are suitable for packaging food products and other products requiring protection against contamination by moisture, oxygen, and ambient atmosphere.

Flexible film packages have many advantages over other containers. For example, flexible film packages may be manufactured at a substantially lower cost than rigid containers and may be substantially lighter in weight, which results in reduced transportation costs. Further, by being comprised of flexible film, such packages do not require the same amount of storage space as rigid containers, which can be particularly beneficial to grocers, pharmacist, and others who stock such products in such packages.

Though the packages are highly desirable for packing and shipping, consumers sometimes have difficulty opening the packages and accessing the contents of the packages. For example, consumers often open such packages by grasping two walls of a package and pulling the two walls apart from one another. Some consumers may cut the flexible film of the package with a scissors to open the package, especially when the consumer has struggled to firmly grasp the package walls or rupture a package seal. Neither of these opening methods, however, are typically resealable or easily reclosable.

In other configurations, opening features such as tear initiation features are incorporated into the film. Consumers have noted limitations with some of these tearing initiation features as well. For example, some tear initiation features provide unreliable tear propagation and require accurate registration during package formation to be useful. These tear initiation features also are typically not resealable or easily reclosable.

Package opening features that may be incorporated into resealable or reclosable packages may include adhesive-free or adhesive-deadened tabs on the face of the package, disposed a distance away from a package end- or side-seal. For example, resealable packages may have a sealing layer or label with an adhesive-free portion that may be manually grasped and lifted by a consumer to provide access to the package contents. Many consumers have not been particularly quick to recognize the adhesive-free or adhesive-deadened grasping portions on the face of the packages, and thus, such packages sometimes include a notice near package end- or side-seals instructing consumers not to pull and rupture the end- or side-seal, but instead to locate the grasping portion on the face of the package to open the resealable opening.

BRIEF DESCRIPTION OF THE DRAWINGS

FIG. 2 comprises a perspective view of the package of FIG. 1 in a partially open configuration;

FIG. 3 comprises a perspective view of the package of FIG. 1 in an open configuration;

FIG. 4 comprises an end view of the package of FIG. 1;

FIG. 5 comprises a top schematic view of an outer portion of a laminate;

FIG. 6 comprises a top schematic view of an outer portion of a laminate;

FIG. 11 comprises a cross section of the laminate of FIG. 7 at line 11-11;

FIG. 12 comprises a cross section of the laminate of FIG. 7 at line 12-12;

FIG. 13 comprises a top view of an alternative embodiment of a package with a package opening feature;

FIG. 14 comprises a detailed view of a portion of FIG. 13;

FIG. 21 comprises a top schematic view of an outer portion of an alternative laminate configuration;

FIG. 22 comprises a top schematic view of an outer portion of an alternative laminate configuration;

FIGS. 23-25 comprise perspective views of an alternative embodiment of a package with an opening feature;

FIG. 26 comprises a top schematic view of a laminate configurable to form the package of FIG. 23;

FIG. 27 comprises top schematic views of an alternative laminate configuration;

FIGS. 28-30 comprise perspective views of an alternative embodiment of a package with an opening feature;

FIG. 36 comprises a top schematic view of an alternative laminate configuration;

FIG. 37 comprises a top schematic view of an alternative laminate configuration;

FIG. 38 comprises a top schematic view of an alternative laminate configuration;

FIGS. 39-40 comprise top schematic views of an inner and outer portion of an alternative laminate configuration;

FIG. 45 comprises a top schematic view of an alternative laminate configuration;

FIGS. 46 comprises a top schematic view of an alternative laminate configuration;

FIGS. 47-49 comprise perspective views of the alternative laminate configuration of FIG. 46 formed into a package;

DETAILED DESCRIPTION

Figure 1:
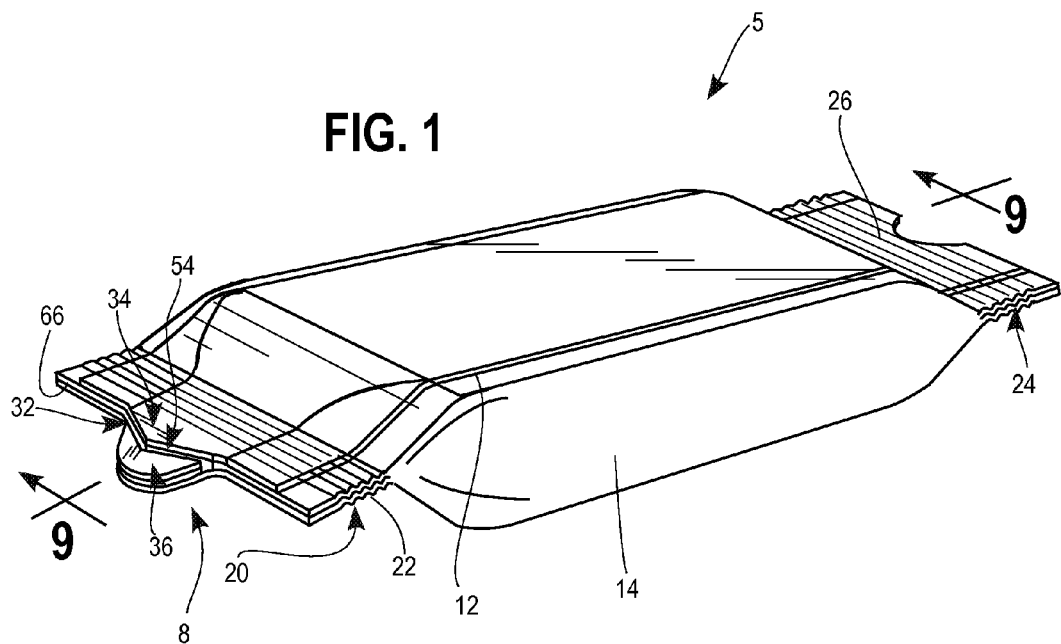
FIG. 1 comprises a perspective view of a package with an open feature in a closed configuration.

Pursuant to the various embodiments described herein, flexible film packages having a useful easy-open feature and methods of producing such packages are provided. The package opening feature may be incorporated into a variety of package formats such as flow wrapped packages having a longitudinal seal (including fin seals or lap seals) or packages with side seals (including two-, three-, or four-side seal pouches). It is anticipated that the package opening feature is disposed adjacent or at a package seal, such as, for example, an end seal, a top seal, a bottom seal, a side seal, or a longitudinal seal, to note but a few options. By one approach, the flexible film laminate forming such packages has at least first and second film layers, and at least one of the film layers defines an interior cavity configured to hold packaged products. In a number of configurations, the flexible film packages may be reclosable or resealable.

In one illustrative embodiment, the flexible film laminate may have a first pair of edge portions formed into a first end seal, a second pair of edge portions formed into a second end seal, and a third pair of edge portions formed into a third longitudinal seal, such as a fin seal or a lap seal. In other configurations, the flexible film laminate may be formed into a package having side seals.

By one approach, the first and second film layers are coextensive with one another. By yet another approach, one of the film layers is disposed within the edges of the other film layer such that the film layers are not coextensive with one another. For example, the first film layer may extend within the third edge portions of the second film layer and also may extend from the first end seal to the second end seal.

In one configuration, the flexible film laminate will include a pressure sensitive or another resealable adhesive disposed in between at least portions of the first and second film layers. In one example, the resealable adhesive may be disposed throughout the area between the first and second film layers. In other configurations, the resealable adhesive is disposed in only some areas between the first and second film layers such that the resealable adhesive may be pulse coated or pattern applied. Depending on the package formed, the pattern application process may dispose only resealable adhesive, or it can dispose permanent adhesive in addition to the resealable adhesive if desired for the package. In other configurations, the package may include only permanent adhesive or sealant between the film layers, which may be applied continuously or in a pulse or pattern application process.

Further, the flexible film laminate may have a first side, a second side, and a laminate thickness therebetween. As described herein, when formed into a package, the second side of the flexible film laminate is typically oriented toward the interior cavity of the flexible film package.

As noted above, the package opening feature is disposed adjacent or at a package seal. In one illustrative embodiment, the package opening feature is disposed distal to the package body or interior cavity with respect to the end seal. For example, the package opening feature may be disposed on the film edges of the package beyond the end seal. By one approach, a package opening is disposed in the package body in between the end seals and the package opening feature is disposed adjacent the end seal on a side away from the package opening and not on the body of the package. By yet another approach, the package opening feature or a portion thereof may be disposed in the film at the same position as where the end seal is formed into the film. In other configurations, the package opening feature may be disposed in the film on the package body just inside of the package seal. It also is anticipated that the package opening feature may extend from beyond the end seal to the end seal or from the end seal into the film of the package body. Further, in some configuration, the package opening feature might extend from one side of the end seal to the other side.

Though the package opening feature may be disposed adjacent or at the package seal, in some package configurations the end seal may not rupture upon package opening and accessing of the package contents. For example, in one embodiment having an opening disposed on the face of the package, in between the end seals, and having a resealable closure disposed thereover, the package opening feature will not rupture the end seal but, instead, will permit the consumer to easily open the package by lifting the resealable closure to expose the opening. In another illustrative embodiment, the package opening feature is disposed adjacent or at the package seal and then ruptures the end seal as the package is opened.

To provide an easy open feature in the flexible film package, gripping portions may be formed into the flexible film. When the flexible film laminate is formed into the package, the gripping portions may be disposed adjacent or at a formed package seal, such as an end seal, top seal, bottom seal, side seal, or longitudinal seal. By one approach, the gripping portions include a pull tab having a first position when the package is closed and a second position when the package is opened. In one configuration, when the pull tab is disposed in the second position a portion of the first film layer and a flap of the second film layer also are disposed upward from a remainder of the package by pulling a pull tab of the gripping portions upward from the remainder of the package and lifting the portion of the first film layer and the flap of the second film layer to expose a package opening. In other configurations, when the pull tab is pulled upward a portion of the first film layer is lifted to expose a cut in the second film layer through which the package contents can be removed.

The gripping portions also may include an opposing gripping tab defined by a package edge, such as a leading edge of the package. A consumer may grasp the pull tab and the opposing gripping tab and pull the two tabs away from one another to open the package. As noted above, the package opening feature, including the gripping portions, may be formed into the film beyond the end seal, at the end seal, or just inside the end seal, with respect to the package body. While some configurations may have both gripping portions disposed beyond the end seal or just inside the end seal, it also is anticipated that one of the gripping portions may be disposed may be disposed adjacent to the end seal and another of the gripping portions disposed at the end seal.

In one example, the pull tab is defined, in part, by a throughcut formed through the entire thickness of the flexible film laminate such that the pull tab has a gripping edge that can be easily manually grasped by a consumer. In addition, a partial-depth cut through a second portion of the flexible film laminate also may define a portion of the pull tab. For example, the throughcut may define the leading edge of the pull tab and the partial-depth cut through a portion of the flexible film laminate may define a trailing edge of the pull tab. The opposing gripping portions also may be defined, in part, by the throughcut formed through the entire thickness of the flexible film laminate. More particularly, in one configuration, the opposing gripping portion includes a cut away or separated portion of the first film layer defined by a package edge, such as a leading edge of the package, and the throughcut.

In addition to the trailing edge of the pull tab, partial-depth cuts through a second portion or section of the flexible film laminate also may define an opening into the package. For example, a partial-depth cut may define a portion of the second film layer, such as a flap, that is lifted to form package opening. In one approach, the inner partial-depth cuts are formed through a second portion of the flexible film laminate and only extend partially through the entire thickness of the flexible film laminate.

In addition to the partial-depth cut on the inner surface of the package film, an outer partial-depth cut may be formed in the first film layer. By one approach, the outer partial-depth cuts extend from a first side of the flexible film laminate through a first portion of the flexible film laminate and only partially extend through the entire thickness of the flexible film laminate. The outer partial-depth cuts may form a narrowing portion of the first film layer at a point where the narrowing portions are disposed adjacent the package opening feature and thereby facilitate lifting of a portion of the first film layer from the remainder of the package. The outer partial-depth cut also may define a sealing panel or sealing layer that is lifted from the remainder of the package when the opening is exposed. In one aspect, the portion of the first film layer not forming the pull tab and the sealing panel or sealing layer may be removed or stripped away from the package.

In one illustrative embodiment, the first portion or section of the flexible film laminate through which the outer partial-depth cuts extend is equivalent to the thickness of the first film layer and the second portion or section of the flexible film laminate through which the inner partial-depth cuts extend is equivalent to the thickness of the second film layer. Therefore, in one configuration, the partial-depth cuts extend through the entire thickness or nearly the entire thickness of the first or second film layers, respectively. It also is anticipated that the inner and outer partial-depth cuts may extend through the second or first film layers, respectively, and into the resealable adhesive disposed between the first and second film layers but not into the other film layer. In short, though the partial-depth cuts extend into the first or second film layer, it is not anticipated that either partial-depth cut extends through the entire thickness of the flexible film laminate.

In one illustrative embodiment, the package may not include a flap that is lifted to expose a package opening, but instead, will include a cut that is large enough to be manipulated to create an opening through which the food contents can be removed. In such a configuration, the inner partial-depth cut may still form the package opening, but the inner partial-depth cut may not define a flap or portion of the second film layer that is lifted to expose the opening.

As described herein, the package opening feature is disposed adjacent or at the leading edge of the package. It is noted, however, that one of skill in the art would readily understand these teachings to include a package opening feature being formed in the trailing edge or side of the package, though only the example of the leading edge of the package is described in detail herein for the sake of brevity.

In one aspect, a package opening feature suitable for use on a flexible film package may include a first end seal formed by upper and lower package portions and gripping portions formed in the flexible film adjacent the first end seal. Further, the gripping portions may include a first portion and a second portion, where the first and second portions are pulled apart to open the package associated therewith. The first gripping portion may be defined, in part, by a full-depth cut or throughcut disposed through the first and second sections of the flexible film of the upper package portion and a partial cut disposed in the second section of the flexible film of the upper package portion, wherein the partial cut is at least partially disposed in the first end seal. The second gripping portion may be defined, in part, by an outer package edge and, in some configurations, by the throughcut disposed through the first and second sections of the flexible film of the upper package portion. In one example, the leading edge of the package will be edge welded such that the upper and lower package portions are bonded together. By one approach, the throughcut disposed through the first and second sections of the flexible film of the upper package portions provides a separation between the first and second gripping portions of the first film layer such that the consumer can easily detect the opening feature and may easily grasp the two separate gripping portions.

By one approach, a laminate for producing flexible film packages includes a web of flexible film having a web thickness, a web width and a longitudinal axis, wherein the web has at least first and second film layers with an adhesive disposed in between at least portions of the first and second film layers. In one aspect, the web of flexible film is configured to be formed into a series of package forming blanks, such that each identical package forming blank includes a series of partial-depth cuts formed therein extending from one side of the flexible film through a portion of the web thickness, and a full-depth cut completely through the entire web thickness of the flexible film and through a portion of the film width. In one example, the partial-depth cuts subsequently form a package opening and a portion of a pull tab and the full-depth cut subsequently forms a leading edge of the pull tab.

A method for manufacturing a package may include forming partial-depth cuts in a continuous web of flexible film having a thickness, a width, and a longitudinal axis. A series of inner partial-depth cuts (formed into a side of the film subsequently formed into an interior surface of a package) may be formed partially through the thickness of the flexible film and subsequently define a package opening and a rear edge or trailing edge of a pull tab. The method also may include forming a full-depth cut through the entire thickness of, but only through a portion of the width of, the continuous web of flexible film. A continuous longitudinal seal may be formed from a pair of opposing edges of the continuous web of flexible film and first and second end seals may be formed in the flexible film such that the full-depth cut is disposed in between the end seals of adjacent packages and the first end seal at least partially intersects with the partial-depth cuts forming the trailing edge of the pull tab. The method also may include separating individual packages from the series by forming a cut between the end seals of adjacent packages such that a separation cut is disposed in between the second end seal of a leading package and the throughcut of a trailing package. In another configuration, a series of outer partial-depth cuts may be formed in an outer layer of the flexible film subsequently forming a narrowing portion of outer layer of the flexible film that may be lifted from a remainder of the package upon opening.

By one approach, when the leading edge of the package is formed by a seal jaw or knife, the residual heat from the seal jaw or knife may weld the upper and lower package portions at the leading edge of the package. This welding is typically described as edge welding. This edge welding may permit the separated portion, which is formed by the leading edge of the package and the throughcut and subsequently becomes a portion of the opposing gripping portion, to adhere or bond to a remainder of the package. More particularly, because the flexible film layers beyond the end seals are free ends, and thus, are not otherwise secured to one another, the portion of the first film layer disposed beyond the throughcut would be separated from the remainder of the package if the leading edge of the package is not edge welded together at that position.

An apparatus for forming a laminate described herein may include a first roller or rollers configured to support a web of flexible film laminate having at least a first film layer, a second film layer, and an adhesive disposed between at least portions of the first and second film layers and a second roller disposed downstream of the first roller, where the second roller is configured to support the web of flexible film laminate. The apparatus also may include a multi-level cutter disposed between the first and second rollers. The multi-level cutter forms a series of partial-depth cuts into the flexible film laminate on a side of the laminate subsequently forming an interior surface of the package and a full-depth cut into the flexible film laminate. The full-depth cut formed by the multi-level cutter extends through an entire thickness of the flexible film laminate, but is disposed within less than an entire width of the flexible film laminate.

An in-line apparatus for forming form-fill-seal packages may include a set of rollers configured to support a web of flexible film laminate and a folding element configured to manipulate the web of flexible film laminate into a tubular shape forming a cavity into which a food product is disposed through a fill tube. The in-line apparatus may further include a multi-depth cutter configured to form a series of partial-depth cuts and full-depth cuts into the flexible film laminate. The partial-depth cuts may include a tab cut that subsequently forms a trailing edge of a pull tab. The in-line apparatus may further include seal jaws configured to form first and second end seals into the flexible film laminate to thereby form a portion of the flexible film packages. It is anticipated that the seal jaws will be configured to form an unsealed film portion between the first and second end seals of adjacent packages. In addition, the in-line apparatus is configured to dispose the full-depth cut in the unsealed film portion in between the first and second end seals of adjacent packages and at least a portion of the tab cut being disposed in the first end seal.

In yet another configuration, a package described herein includes a flexible film laminate with first and second film layers and a resealable adhesive disposed in between portions of the film layers. The flexible film laminate may define, at least in part, a package interior. The package further includes a package opening feature disposed adjacent a first package end seal, the package opening feature including a pull tab that can be grasped and lifted to expose a package opening formed into the second film layer. Further, the pull tab may be disposed at an adhesive free area disposed between the first and second film layer. The pull tab of such a package may be disposed distal to the package interior relative to the first package seal. The pull tab also may include a pop-up cut formed through a portion of the first film layer and extending from an outer surface of the package. The package also may include a full-depth cut that extends through the first and second film layers of the upper portion of the package end, wherein the full-depth cut defines a leading edge of the pull tab. Alternatively, or in addition, the pull tab may undergo heat treatment at the time of package formation to create or induce irregularities into the film that forms the pull tab to make the pull tab more readily apparent to consumers. If heat treatment of the pull tab is desired to create irregularities that highlight the location of the pull tab, the material of the outer, first layer film that forms the pull tab should be selected according to its properties in such regards.

The flexible film packages described herein may contain a food product, though the packaging applications also may include non-food applications such as medical, pharmaceutical or industrial packaging applications, to note but a few additional options. Further, the packages may have at least a partial, initial hermetic seal to provide at least a partial barrier against ambient atmosphere. More particularly, to extend the shelf-life of products contained within the flexible film package, the seals forming the package may be hermetic or at least partially or substantially hermetic. To that end, the package may include seals formed by a variety of processes such as, for example, hot seal, cold seal, low tack seal (including employing a low tack adhesive or fastener), sonic waves, and combinations thereof.

If a resealable seal is incorporated into the flexible film package, such as that formed around an opening in the face of the package and surrounded by a sealing layer or panel, film layer, or closure layer, a pressure sensitive adhesive or other resealable adhesive may be incorporated into the flexible film package.

The flexible film packages may have a variety of configurations, including, for example, a bag, a pouch, a rectilinear-shape, a cylindrical-shape, and a column-shape, among others. By one approach, the package configuration and shape are primarily influenced by the products contained within the package, in part, due to the flexibility of the flexible film laminate. By yet another approach, the package configuration are primarily influenced by structure within the package such as an internal rigid support or product tray. In such configurations, the flexible film may be configured as a flow-wrap or overwrap around the structure.

The flexible film packages may be produced in a number of manners. For example, the flexible film packages may be formed around the food product or may be fully or partially formed and then filled with the food products. In addition, it is anticipated that the flexible film packages may be formed in-line just before the food product is packaged or formed around the food product. In some applications, it may be desirable to form the flexible film laminate or even the entire flexible film package off-line well before the products are packaged.

As used herein, the flexible film laminate may be formed of a variety of materials and can be disposed as a web of material on a roll or as individual blanks. For example, the flexible film laminate may be laminated, extruded, cast, blown, or a combination thereof. By one approach, the flexible film laminate may include several thin layers of material, such as thin layers of a polymer material. More specifically, the structure of the flexible film laminate may include a polyethylene terephthalate (PET) layer, polyethylene, an oriented polyproplylene (OPP) layer, a polylactic acid (PLA) layer, a single layer (mono-web) polymer, a sealant layer (such as ethylene vinyl acetate (EVA), ionomer plastic, matallicine, organoclay, and the like), an ink or print layer, nylon, a metalized layer, such as a metalized oriented polypropylene (MET OPP) layer, paper, foil, an adhesive, and/or a non-woven material, among others. These various layers may be included in the flexible film laminate and may have a variety of thicknesses and densities.

In one illustrative approach, the flexible film laminate may be a combination of several of the above-mentioned materials or film structures. For example, one flexible film laminate structure may include a PET layer, an ink layer, an adhesive layer, and a bi-axially oriented polypropylene (BOPP) layer. In another example, the structure may include a BOPP layer, an ink layer, a low-density polyethylene layer, and a metalized OPP. In yet another configuration, the structure may include a surface lacquer layer, an ink layer, and a cavitated OPP. Further, the components of the flexible film laminate may be joined, for example, by adhesives or by an extrusion process. Though the flexible film laminate may be described as having a first film layer, a second film layer, and/or an adhesive layer, the laminate may include additional layers beyond these three layers, and one of skill in the art would be able to adopt the teachings herein to accommodate additional layers of the flexible film laminate.

As noted above, in one illustrative embodiment, the flexible film package will have a partial-depth cut and a throughcut or full-depth cut in the flexible film. These cuts may be formed in a variety of manners including mechanical formation or laser formation.

The package opening feature described herein may be incorporated into a wide variety of package formats. In one particular format, the flexible film packages may be a resealable or reclosable package, though it is also anticipated that the packages produced pursuant to these teachings may be neither resealable nor reclosable. If the package is resealable, such that at least a partial hermetic seal is obtain after initial opening, a pressure sensitive adhesive or other resealable adhesive may be disposed around the partial-depth cuts that form the package opening and between the film layers. In one approach, the pressure sensitive or resealable adhesive is neutral and non-reactive with the product being packaged. For example, the pressure sensitive or resealable adhesive may include a cold formed adhesive, a hot melt adhesive, a cold seal adhesive, a natural or synthetic latex adhesive, a low tack adhesive, ethylene vinyl acetate (EVA), an acrylic adhesive (such as a water-based or solvent acrylic adhesive), a styrene block copolymer adhesive, a butyl rubber adhesive, a silicone rubber adhesive, a natural rubber adhesive, a nitriles adhesive, an acrylic emulsion adhesive, an acrylic water-based adhesive, and combinations thereof. Further, the pressure sensitive or resalable adhesive may be extruded, coextruded, printed, or a combination thereof.

As discussed further below, the end or terminus of the partial-depth cuts and throughcuts or full-depth cuts may be configured to inhibit or prevent further tearing of the film beyond the formed cut. For example, the end of the cut may have a configuration similar to a "J" hook, or double "J" hook, a smile, a shepherd's hook, a teardrop, and a double teardrop, to note but a few tear termination features.

As mentioned above, consumers have, at times, struggled to quickly locate and operate the package opening feature included with flexible film packaging. The throughcut or full-depth cut discussed above capitalizes on the tension inherent in the film such that during the laminate converting or package converting process the throughcut or full-depth cut forms a gripping edge that can be easily manually grasped by a consumer. The full-depth cut alters the tension in the flexible film laminate or how the tension functions in various portions of the flexible film. For example, portions of film around the full-depth cut may lose tension in certain directions (i.e., the machine direction or the cross-machine direction) depending on the configuration of the full-depth cut. In one aspect, the throughcut results in an increase in the tension in the machine direction in a portion of the film that is disposed between the outward edges of the throughcut and the edges of the web. Further, as discussed below, to prevent the change in the tension of the flexible film from destroying or altering the functioning of the film, a reverse perforation or tack point may be used.

Further, once the package is formed the full-depth cut provides a separation or distance between the gripping edge of a pull tab formed in the outer, first film layer from the remainder of the outer film. This helps highlight the location of the package opening feature to the consumer, in addition to providing an easy manner of opening the package. In addition to the separation or distance between the portions of the outer film layer, the full-depth cut, may result in a pull tab that is lifted or raised slightly from the adjacent film such as the first film layer forming an opposing gripping portion. Further, the full-depth cut and the change in tension between portions of the film may result in a puckering or irregularity in the web as the package is being formed. This puckering, if present when the package seals are formed, may enhance the lifting of the pull tab as compared to the surrounding film.

In some configurations described herein, it may be desirable to treat the package opening feature to highlight the location of the feature for consumers. More particularly, the gripping portions may be treated to create tension and irregularities in the tab surface and shape, which then may result in a more noticeable tab. For example, the gripping portions or tab portion may include a pop-up partial-depth cut or score or may be heat treated. The treatment features may be in addition to a printed indication on the flexible film laminate that directs the consumer to the package opening feature.

By one approach, the pop-up partial-depth cut may be formed into the tab portion that the consumer lifts to open the package. The pop-up partial-depth cut may be through a portion of a single film layer and may be formed from the outer surface of the first film layer. While some partial-depth cuts discussed above were disposed partly through the entire thickness of the flexible film but entirely through a layer of the film, the pop-up partial-depth cut does not extend entirely through a single layer of the film in one embodiment. By one approach, the package opening feature may include a pop-up partial or incomplete partial-depth cut. The pop-up cut may create additional tension in the film during package formation. This tension may create irregularities in the flexible film laminate such that the package opening feature or pull tab may be further recognizable to consumers or users.

By another approach, a leading edge portion of the pull tab, or the entire pull tab, may be disposed in the end seal so that the pull tab is treated with the heat that is used to form the end seal. In some configurations, the first film layer at the end seal may not have a sealant or other adhesive that may cause the first film layer to bind or adhere to the second film layer when heated, and therefore, by treating the first film layer to heat it will not bind the first film layer to the second film layer. It is anticipated, however, that the application of the heat will cause shrinking, stretching, or other irregularities in the film to occur, which may indicate or call attention to the pull tab of the package opening feature. In one illustrative example, the heat treated area of the tab portion will curl, arc, or pull upward slightly so that the consumer can easily feel the portion of the package opening feature that is to be manually grasped.

A flexible film package with a package opening feature may combine the opening features described herein in a number of different package configurations. As outlined below, a variety of different combinations are anticipated. The combination of features may further help consumers locate the package opening feature to avoid a consumer accidentally and unintentionally rupturing an end seal when the package already includes a resealable package opening on the face of the package in between end seals (and when the package end seals are not intended to be ruptured under typical package use). Further, the combination of features disclosed herein also may help consumers easily rupture or open a package end seal where intended.

Referring initially to FIG. 1, an illustrative flexible film package 5 is shown. The flexible film package 5 is formed from a flexible film laminate 10 (see, e.g., FIG. 8) and includes a first film layer 12 and a second film layer 14. As shown in FIGS. 1-8, the first film layer 12 is disposed over a portion of the width of the second film layer 14 and along the entire length of the second film layer 14. A pressure sensitive or resealable adhesive 16 (FIGS. 11 and 12) may be disposed between at least portions of the first and second film layers 12, 14 and may be disposed entirely between all portions of the first and second film layers 12, 14. In the configuration of FIGS. 1-11, it is anticipated that the pressure sensitive or resealable adhesive 16 may be continuously disposed between the first and second film layers 12, 14 without interruption.

An exemplary embodiment of a package with an elongated closure layer disposed from one end seal to another end seal is found in co-pending U.S. application Ser. No. 13/698,568, which is hereby incorporated by reference.

The flexible film laminate 10 is formed into a flexible film package 5 having an interior cavity 18 and a set of package seals. Specifically, the flexible film package 5 includes a first pair of edge portions 20 that are formed into a first end seal 22, a second pair of edge portions 24 that become a second end seal 26, and a third pair of edge portions 28 that are formed into a longitudinal seal 30 (FIG. 4). The flexible film laminate 10 is wrapped around the product or may be configured to form an interior cavity to receive the product. The third edge portions 28, shown in FIGS. 4, 11, and 12, are joined together and sealed to thereby form a portion of an interior cavity 18 that is completely sealed once the end seals 22 and 26 are formed into the flexible film laminate 10. The interior cavity 18 may hold, for example, food products 6 or other consumer products. As illustrated in FIG. 3, the food products 6 disposed within flexible film package 5 are accessible through a package opening 38 that is disposed on the face of the package in between the end seals 22, 26. Though the package opening 38 in FIG. 3 is resealable, it is also anticipated that a package with one of the package opening features described herein may include a non-resealable or non-reclosable opening.

The flexible film package 5 of FIG. 1 further includes an exemplary package opening feature 8. The package opening feature 8 of FIG. 1 includes gripping portions 32 disposed adjacent the first end seal 22. In one illustrative embodiment, the gripping portions 32 comprise a pull tab 34 and an opposing gripping tab 36. A user or consumer may grasp the pull tab 34 in one hand and the opposing gripping tab 36 in another hand, and then pull the pull tab 34 and the gripping tab 36 apart or away from one another to open the flexible film package 5. As the pull tab 34 is pulled away or lifted from a remainder of the package, a portion of the first film layer 12 is lifted to expose the package opening 38.

As illustrated in FIG. 3, when the first film layer 12 of the package 5 is lifted, a flap 68 of the second film layer 14, defined by inner partial-depth cut 48 (see, e.g., FIGS. 7 and 8), is lifted to expose the opening 38. Though the example of FIG. 3 illustrates a flap 68 being lifted and separated from the remainder of the second film layer 14, it is also anticipated that only an inner partial cut may be exposed when the first film layer 12 is lifted such that the inner partial cut exposes a slit through which the products are withdrawn. FIG. 6 also illustrate that the inner partial-depth cut 48 may include a package integrity feature 82, which stretch and break upon initial opening of the package (see, e.g., FIG. 3). Further, while one example of a package integrity feature is illustrated herein, numerous exemplary package integrity features may be employed with the packages described herein.

The pull tab 34 may comprise a portion or cut-away 70 of the second film layer 14 and portions of the first film layer 12. The leading or outer edge of the pull tab 34 may be defined by a throughcut or full-depth cut 54. Further, the cut-away portion 70 may have a trailing or inner edge defined by a partial-depth cut 50 disposed in the second film layer 14. Examples of different configurations of such partial-depth cuts 50 may be found in U.S. application Ser. No. 13/300,317, which is hereby incorporated by reference.

In addition, the opposing gripping tab 36 may comprise a portion of the first film layer 12 and the second film layer 14 defined by a leading, outer edge of the package. The throughcut or full-depth cut 54 disposed through both the first and second film layers 12, 14 also may define a portion of the opposing gripping tab 36. For example, the opposing gripping tab 36 may include a separated portion 76 that is defined, in part, by a separation cut that forms a leading edge 66 of the package and the gripping tab 36 may extend to or past the full-depth cut 54. The separated portion 76 of the first film layer 12 is formed by the leading edge 66 and the full-depth cut 54 and is typically held to the remainder of the container by the edge welding or residual heat from the seal jaw or knife. This edge welding binds the upper and lower package portions together at the package edge. In one configuration, the edge welding may not secure the separated portion 76 to the remainder of the package, and therefore, the opposing gripping tab 36 is defined by a portion of the upper package portion 72 disposed below the separated portion 76. The opposing gripping tab 36 may extend from leading edge 66 of the package 5 to the inner surface of the second film layer 14 exposed when the cut away portion 70 of the second film layer 14 is pulled upward. This is exposed because the cut away portion 70 of the second film layer 14 exposes the inner surface of the lower film portion 74 of the package end (see, e.g., FIG. 10). Thus, the gripping tab 36 may extend beyond the full-depth cut 54 disposed through the first and second film layers of the upper package portion 72. For example, the opposing gripping tab 36 may include the separated portion 76 and may include a portion of the lower film portions adjacent the full-depth cut 54. Alternatively, if the package edge, such as leading edge 66, was not edge welded by the knife and seal jaws, then the opposing gripping portion 36 may include the film disposed below the separated portion 76 prior to separating the packages when the separated cutout 76 is no longer attached to the package. As used herein, the full-depth cut 54 is disposed through the entire thickness of the first and second film layers prior to forming the package such that when the package is formed, the full-depth cut is only completely disposed through the upper package portion that is wrapped around the contents, as discussed further below.

As mentioned above, highlighting the location of the gripping portions 32 helps the consumer or user to locate and manipulate the package opening feature 8. One manner of providing such indication is through a separation 17 disposed between the separated portion 76 and the pull tab 34.

A portion of a flexible film laminate web 11, shown in FIGS. 5-8, may be formed into the flexible film package 5 of FIG. 1. In FIG. 5, the laminate web 11 includes the first film layer 12 disposed over the second film layer 14. An outer partial-depth cut 46 is formed into the first film layer 12 and creates a sealing panel or sealing label 80 that is lifted from the package to expose the package opening 38. The outer partial-depth cut 46 forms a narrowing portion 60 of the sealing panel 80 and a portion of the narrowing portion 60 is subsequently formed into the pull tab 34 that is manually grasped and lifted from the remainder of the package 5 to expose a package opening 38. In one illustrative embodiment, the portions of the first film layer 12 that do not form the sealing panel 80 may stripped away or removed from the laminate or package.

Figure 7:
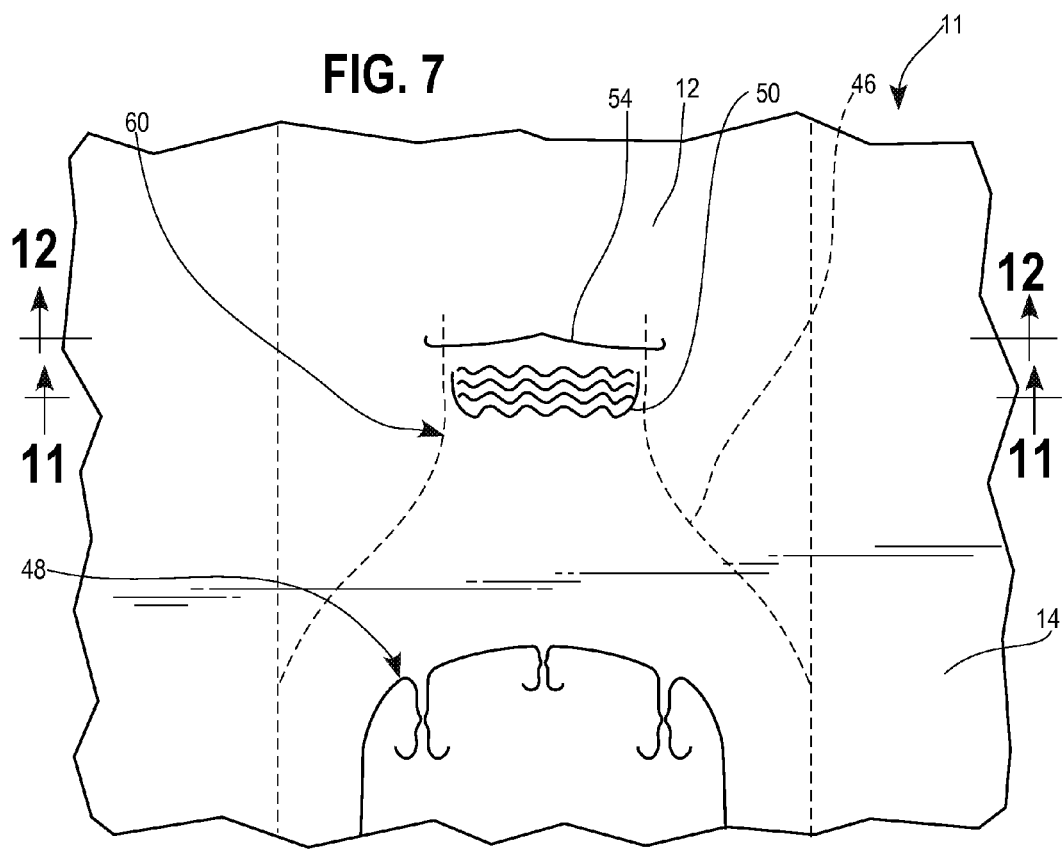
FIG. 7 comprises a top schematic view of an inner portion of a laminate.

In FIG. 6, the laminate web 11 has undergone further processing and now includes a throughcut or full-depth cut 54 that extends through the entire thickness of the film laminate web 11 and inner partial-depth cuts 48, 50. The inner partial-depth cut 48 subsequently forms a package opening and inner partial-depth cut 50 subsequently forms an edge, such as the trailing edge, of the pull tab 34. Whereas FIG. 6 depicted an exterior surface of the laminate, FIG. 7 illustrates the laminate surface that becomes the interior surface of the package.

When forming individual packages 5 from a series of packages, a separation cut 62 through the flexible film laminate is made in between the end seals of adjacent packages. In one example, this separation point occurs between the second seal 26 of a leading package and the first seal 24 of a trailing package. The location of separation cut 62 is illustrated in relation to the end seal areas 64 and the partial- and full-depth cuts 54, 50 in FIG. 8.

As illustrated, there is a distance between seal areas 64 (where the end seals of adjacent packages are formed into the flexible film) and the location of the separation cut is disposed in this distance. Therefore, in the area between the end seals of adjacent packages, the end portions of the flexible film are typically not sealed together. Thus, the upper and lower portions of the film 10 that is wrapped around the product, in this area, are not sealed to one another. Thus, the film disposed between the end seals of adjacent packages typically has free ends 58. In some manufacturing applications, however, the separation knife becomes quite hot and begins to fuse, bind, or weld the free ends 58 of the package together, and this edge welding can extend the entire width of the package. This edge welding can make it difficult for consumers to pick apart the package walls to rupture the end seal. In such configurations, a package opening feature such as that described herein may be particularly useful.

In the flexible film package 5 of FIG. 1, the leading and trailing packages edges are formed by a contoured knife. Thus, the contoured edge of the package 5 may be edge welded together such that the consumer cannot easily pull the upper and lower portions 72, 74 of the flexible film 10 apart from one another. Nonetheless, a consumer can easily grasp the gripping edge 56 that is formed into the flexible film 10 by a throughcut or a full-depth cut 54 formed therein.

Figure 8:
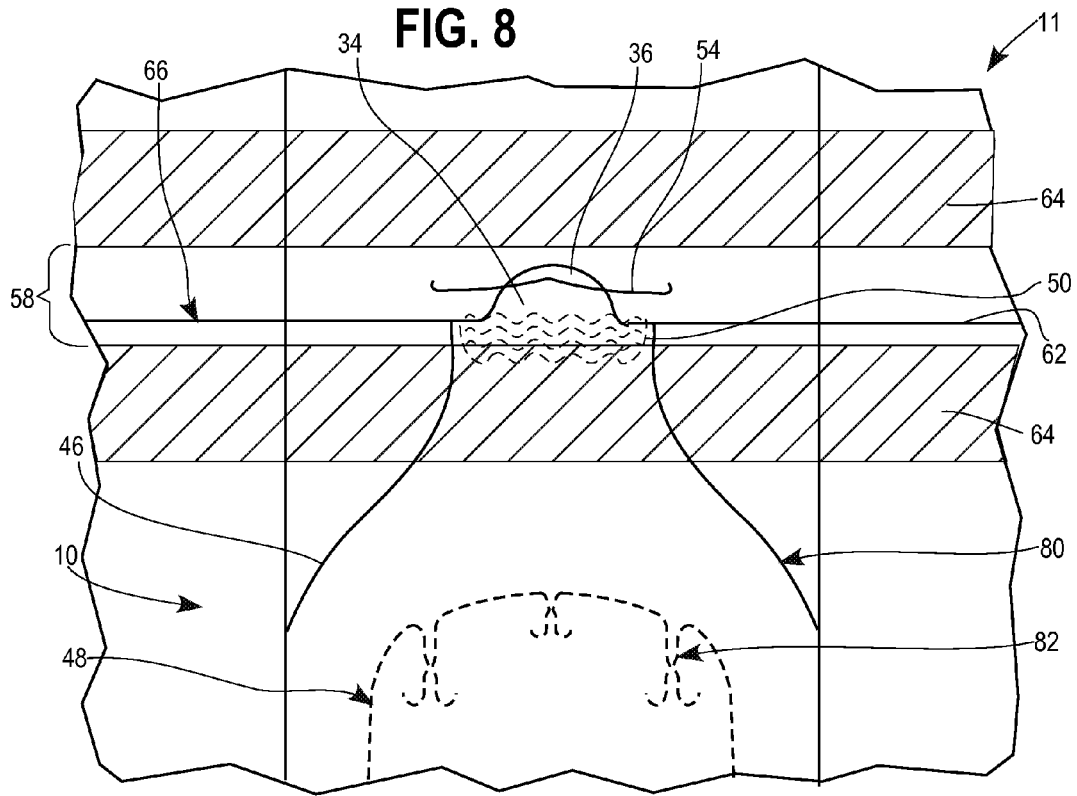
FIG. 8 comprises a top schematic view of an outer portion of a laminate.

As mentioned, FIG. 8 illustrates the location of the cuts 46, 48, 50, 54 formed into the laminate web 11 and the seal area 64 where the seal jaws 64 will press into the shaped film and form the end seals and the separation cut 62 where the knife will separate the packages from the web or series of packages. In addition, FIG. 8 shows where the opposing gripping portion 36 and the pull tab 34 will be formed. The separation cut 62 will define the leading edge 66 of the package and define the shape of the opposing gripping portion 36. The full-depth cut 54 forms, in part, the pull tab 34, along with the inner partial-depth cut 50. Indeed, the particular inner partial-depth cut 50 that forms the trailing edge of the pull tab 34 will typically be the partial-depth cut 50, such as a wavy line, that falls partly inside the seal area 64 in the configuration of FIGS. 1-10. More particularly, as the pull tab 34 is pulled upward, the first film layer 12 pulls the inner, second film layer 14 upward. A portion of the second film layer 14 will separate from itself once the film has been pulled back to partial-depth cut 50 that is disposed within the end seal 64, which then forms the trailing edge of the pull tab 34. This occurs because one or more of the wavy lines or partial-depth cuts 50 through the second film layer 14 is sealed down into the seal area 64. The partial-depth cuts 50 that do not fall within the seal area 64 are not tacked down to the remainder of the package, and therefore, they are free to be lifted upward with the first film layer 12.

Figure 1A:
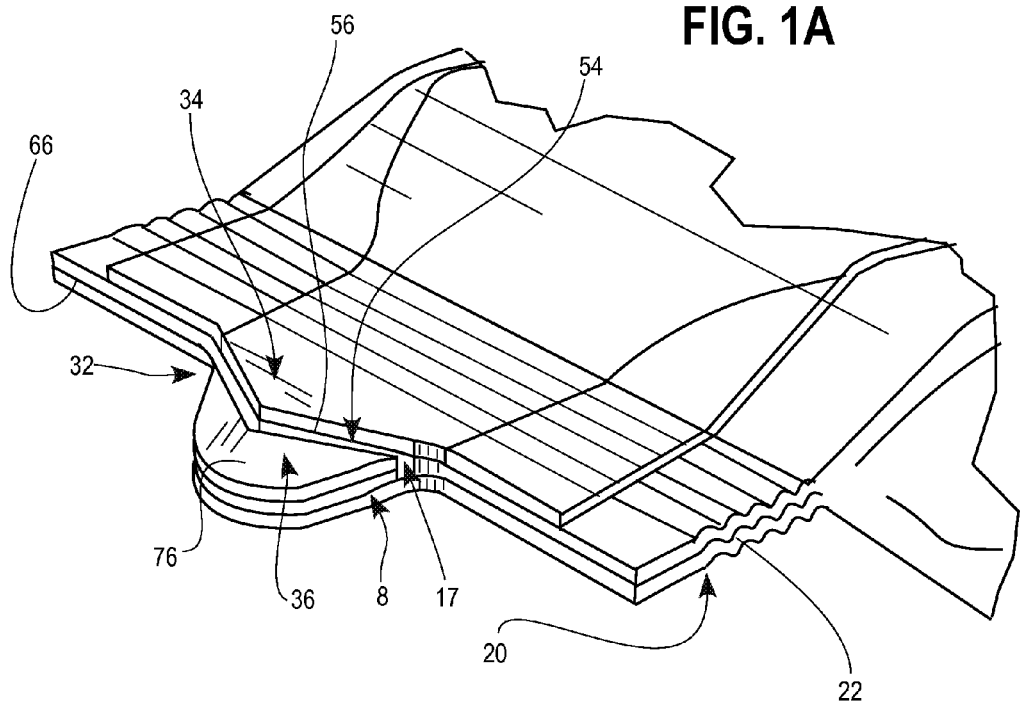
FIG. 1A comprises a detail view of a portion of the package of FIG. 1.

The package seals subsequently formed into the flexible film capitalize on the tension induced or altered in the laminate web 11 due to the formation of the full-depth cut 54 into the laminate web 11, as discussed above. While the effects of the tension may not be great, they become noticeable once the flexible film laminate web 11 is formed into packages 5. As can be seen in FIG. 1A, the full-depth cut 54 has created a bit of separation 17 between portions of the film that form the pull tab 34 and the separated portion 76 of the opposing gripping portion 36. This separation 17 highlights the gripping edge 56 of the pull tab 34, which the consumer or use can pull upward to open the package 5. In addition to the separation 17, the package opening feature 8 may include some vertical lift or distance between the pull tab 34 and the adjacent end seal such that the pull tab 34 is raised upward such that the consumer or user may more easily grasp the pull tab 34.

Figure 9:
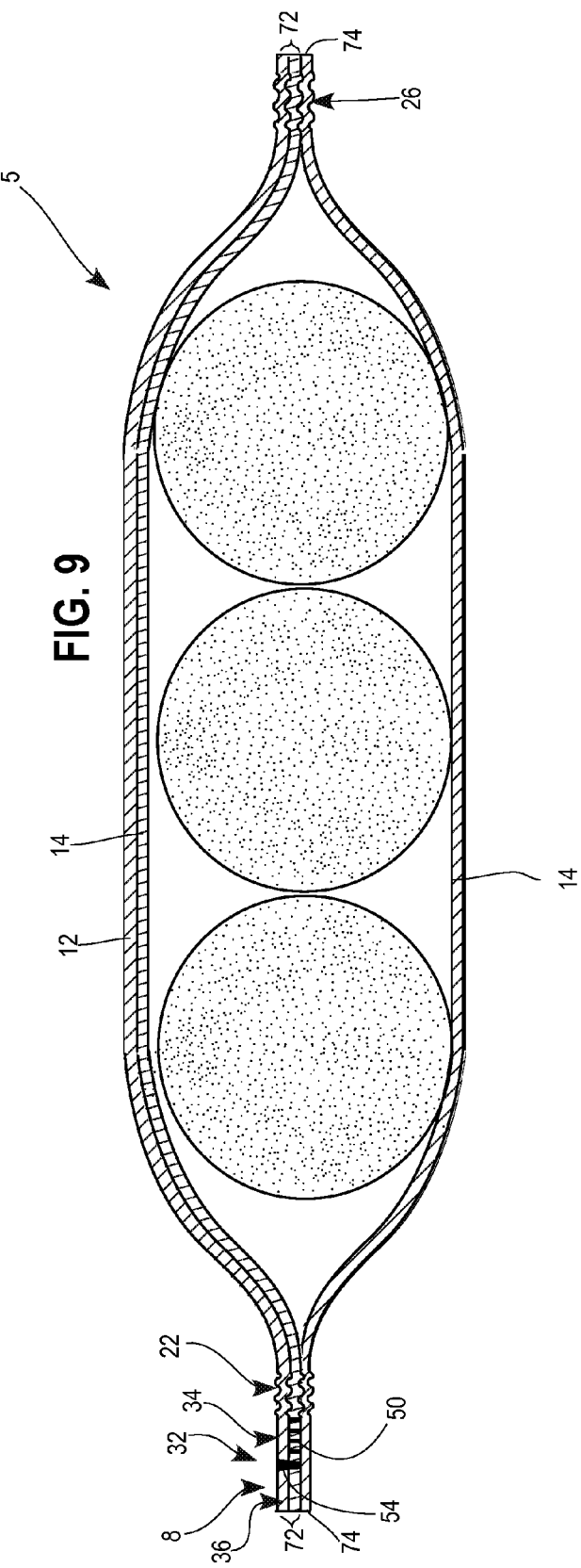
FIG. 9 comprises a cross section of the package of FIG. 1 at line 9-9.
Figure 10:
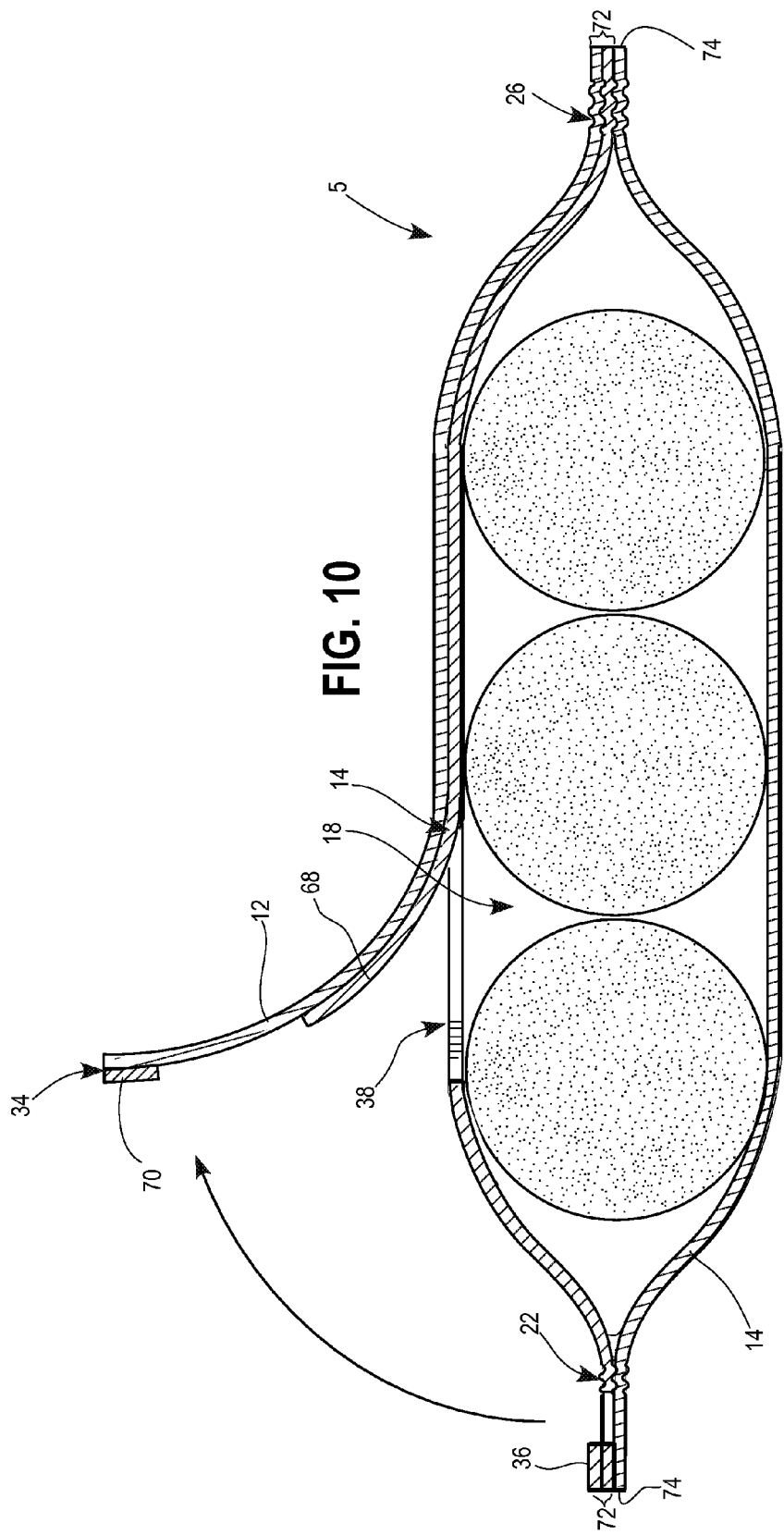
FIG. 10 comprises a cross section of the package of FIG. 3 at line 10-10.

To illustrate the various portions of the package opening feature 8, FIGS. 9 and 10 illustrate the package in cross section along lines 9-9 and 10-10, respectively. Though these figures illustrate the cross section of the packages along the center-line, the longitudinal seal on the lower portion of the package has been removed for clarity. The end seals 22 and 26 are formed from upper and lower film portions 72, 74 of the package. The upper and lower film portions 72, 74 are sealed together at the ends to form the end seals 22, 26. As shown in FIG. 9, the throughcut or full-depth cut 54 extends through the entire thickness of the flexible film 10 of the upper film portion 72 and the inner partial-depth cuts extend through partially through the second film layer 14 from an interior surface of the flexible film 10.

The full-depth cut 54, through the entire thickness of the flexible film 10 of the upper film portion 72, provides a gripping edge 56 of the pull tab 34 that the consumer or user may use to grasp the pull tab 34 and lift the cut away portion 70 and the first film layer 12, or at least the sealing panel 80 of the first film layer 12. Since there is no adhesive between the upper and lower portions 72, 74 and the portions 72, 74 have not been sealed or welded together at the position beyond the first end seal 22, the consumer is able to thumb the gripping edge 56 of the pull tab 34 and put a finger on either side of the tab 34 to firmly grasp and pull the pull tab 34 upward from a remainder of the container. In addition, the consumer can grasp the opposing grasping tab 36 to firmly hold while the package is being opened. As the pull tab 34 is lifted away from the remainder of the container the inner partial cut defining the opening 38 is exposed, and in the embodiment of FIGS. 1-10, the flap 68 (or at least a portion thereof) is lifted from the remainder of the second film layer 14, which thereby provides a relatively large package opening 38 so that the consumer may more easily access the products 6 within the package. Also, by having the package opening feature 8 moved to a location adjacent to or at the package end seal, the package may have a relatively larger opening, than those packages having a package opening feature on the face of the package. More particularly, by having the pull tab 34 near the end seal, the package opening can be a bit larger than those previously incorporated into such packages.

Another exemplary configuration is illustrated in FIG. 13 as flexible film package 15. Though flexible film package 15 is similar to flexible film package 5, the flexible film package 15 is not intended to be resealable. The flexible film package 15 includes a first end seal 122, a second end seal 126, and a package opening feature 18 that is disposed adjacent one of the end seals. Further, the package 15 may include a single film layer 113 that is wrapped around the contents of the package, as opposed to first and second film layers where at least one of the film layers wraps around the contents.

The package opening feature 18 includes gripping portions 132, which may include a pull tab 134 and an opposing gripping tab 136. As can be seen in the detailed view of FIG. 14, a full-depth cut, similar to full-depth cut 54, provides a noticeable separation 117 between the gripping edge 156 of the pull tab 134 and a separated portion 176, which is defined by a leading edge of the package formed by a separation or knife cut and the full-depth cut through the entire thickness of the upper portions of the flexible film 10. The opposing gripping tab 136 may include the separated portion 176 and the inner surface of the lower film portion that is disposed adjacent the separated portion 176.

As suggested above, if the knife forming the cut that separates the packages does not edge weld the separated portion 176 portion to the lower film portion of the package end, then the separated portion 176 will not bind or adhere to the remainder of the package 15, and therefore, may be completely separated from the package. In such a configuration, the lower film portion disposed below the separated portion 176 will form that area of the opposing gripping portion 136. Further, the package opening feature 18 remains readily visible to consumers, even without the separation 17 between the separated portion 176 and the gripping edge 156 (i.e., if the separated portion 176 was not bound or fused to the package at the package edge). More particularly, the leading edge of the package, which defines the opposing gripping tab 136, is disposed a distance beyond the gripping edge 156 in such a configuration, and therefore, two edges (the package edge 166 and the gripping edge 156) are offset from one another. In this manner, the upper and lower portions 72, 74 that form the end of the package extend different lengths from the first end seal 122.

Figure 15:
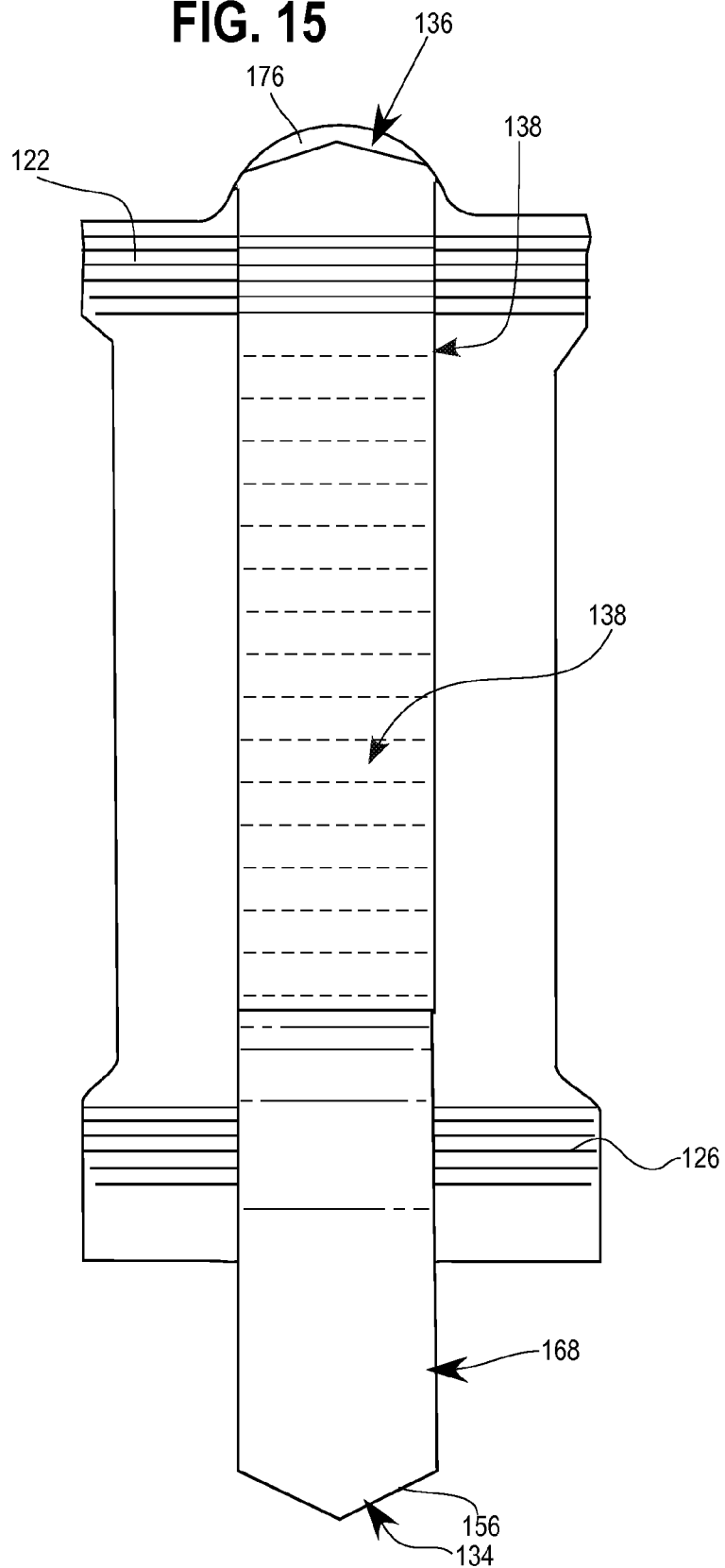
FIG. 15 comprises the package of FIG. 13 is an open configuration.

As shown in FIGS. 13-15, the pull tab 134 is defined, in part, by a gripping edge 156 formed by the full-depth cut and a portion of the film 113 adjacent thereto. Further, once the pull tab 134 and a flap 168, which is a portion of the film 113 defined by a partial-depth cuts 147, are pulled upward from the remainder of the package, the opening 138 is exposed. The partial-depth cuts 147 of the package 15 are ruptured to expose a package opening 138. More particularly, the partial-depth cut 147 is ruptured such that the entire thickness of the flexible film is torn through. In FIGS. 13-15, the rupturing or tearing of the partial-depth cut 147 creates an opening that begins at the end seal 122, which is ruptured. The partial-depth cut 147 may be formed from the inside surface and/or the outside surface of the flexible film, though if both inside and outside partial-depth cuts are incorporated into package 15, staggering of the cuts would be employed to ensure that the package retained a seal against ambient atmosphere. Further, though package 15 is not intended to be resealable, a cold seal adhesive could be used at the first end seal 122 to provide a tack-down reclose feature.

Figure 50:
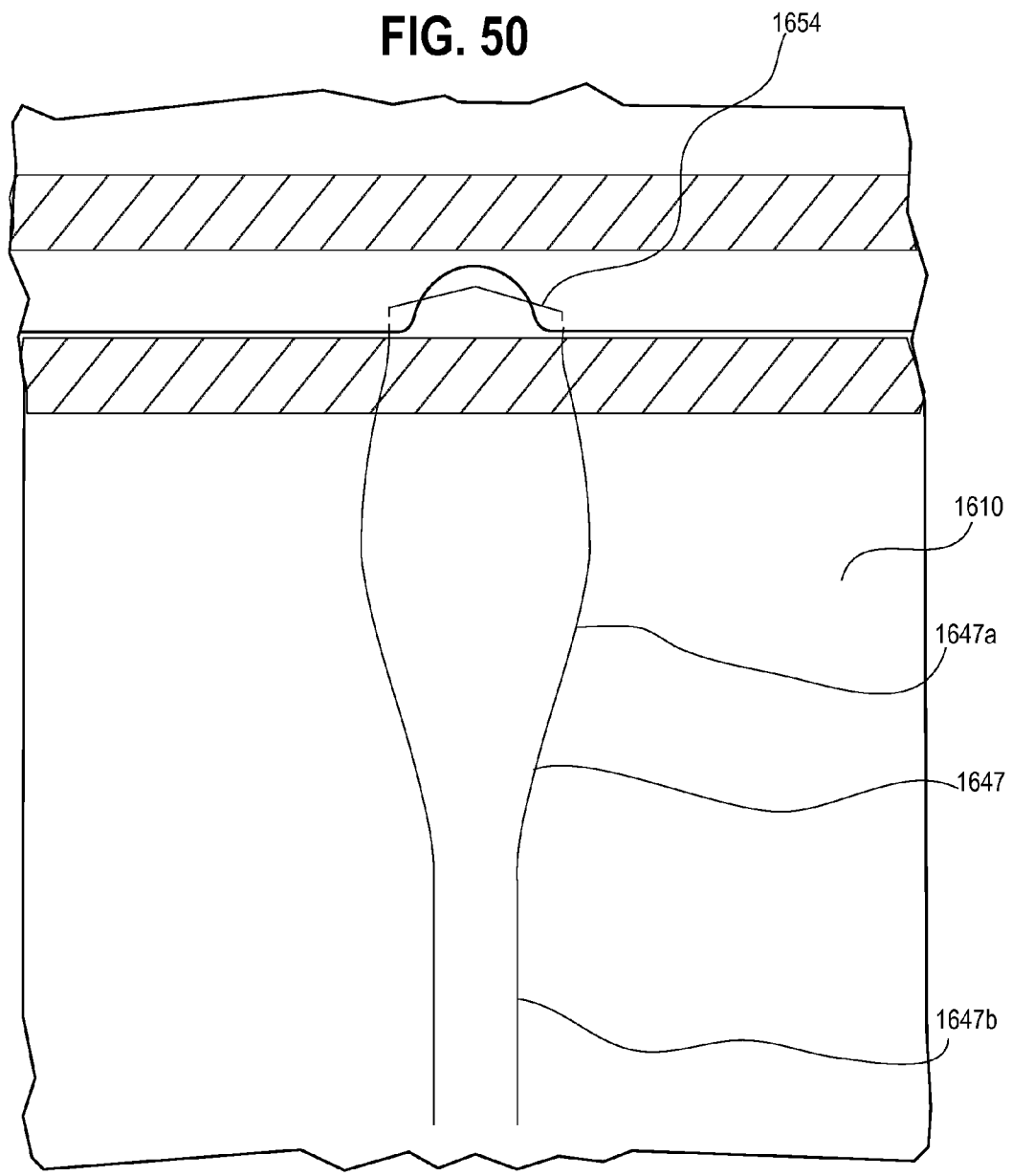
FIGS. 50-52 comprise top schematic views of alternative laminate configurations.
Figure 51:
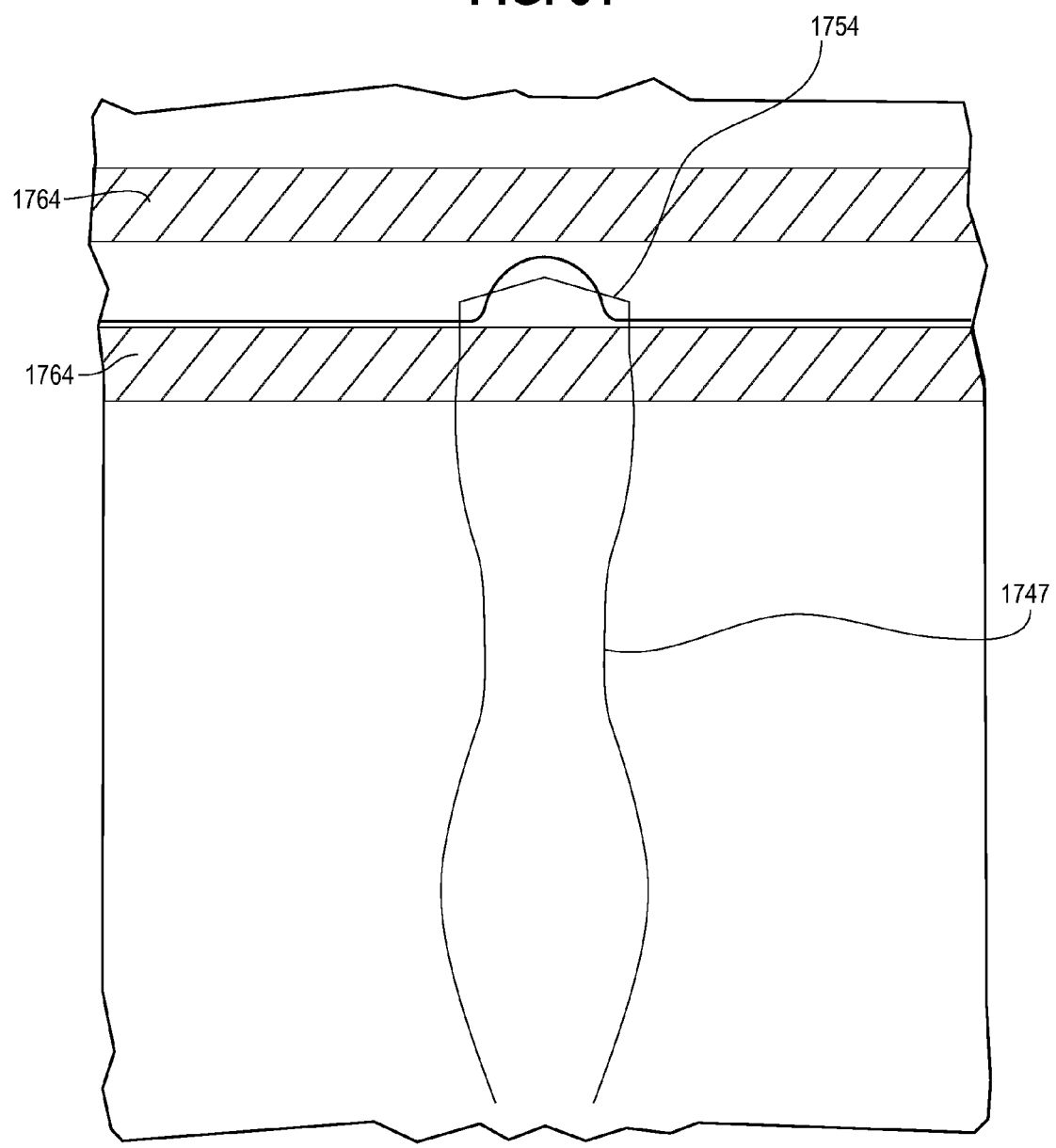
Figure 52:
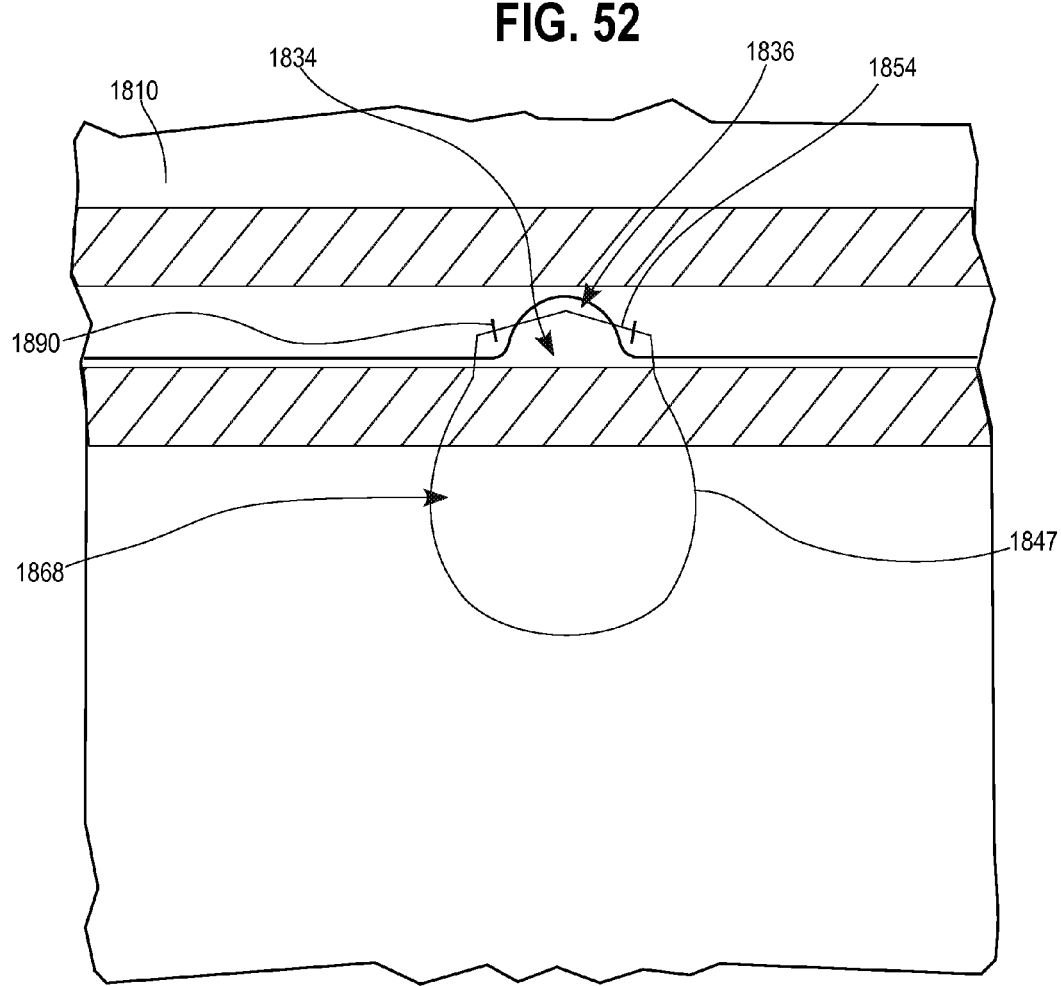

As shown in FIGS. 13-15, the partial-depth cuts 147 guide the tearing of the film 113, which creates the package opening 138. The partial-depth cuts 147 illustrated in FIGS. 13 and 14 are straight lines, however, additional configurations are anticipated. For example, FIG. 50 illustrates a full depth cut 1654 and partial-depth cuts 1647 that include a pair of curved lines 1647a that intersect two straight lines 1647b, and such a configuration provides for a larger package opening disposed near the opening feature. As suggested above, the partial-depth cuts 1647 may be formed on an interior or exterior surface of the flexible film 1610. Another example, shown in FIG. 51 illustrates a full-depth cut 1754 and a partial-depth cut 1747 that includes two lines that have several curved sections. The cuts 1754 and 1747 have two different depths, but can be formed on the same die. In such a configuration, the full-depth cut 1754 does not extend into the film beyond the end seal area 1764. Finally, FIG. 52 illustrates a partial-depth cut 1847 that forms a loop, which forms a panel or flap 1868 that is lifted from a remainder of the package to expose a package opening. Such an opening might be suitable for a bag from which the package contents are poured through the opening.

FIG. 52 also illustrates notches or reverse perforations 1890 that leave material land there, at that location, which remains uncut. In one illustrative example, the reverse perforations 1890 may be formed by a notch in the die that forms the full-depth cut 1854 such that the die does not cut the film material at the notched location. Such a reverse perforation 1890 helps maintain the relationship between different portions of the flexible film 1810. For example, the reverse perforations 1890 permit the various portions of the film surrounding the full-depth cut to maintain their relation to one another after formation of the full-depth cut. A reverse perforation incorporated into a flexible film may permit the flexible film package to have additional or alternative configurations for the full-depth cut. In the example of FIG. 52, the reverse perforations 1890 are disposed outside of the area that forms the pull tab 1834 and the opposing gripping tab 1836. Further, such reverse perforations primarily function to maintain the relationship of the film portions prior to package formation. For example, the rollers upon which flexible film web is wound can fold back portions of the flexible film if the film portions are not held in their proper relation to one another. Thus, the reverse perforations may be particularly useful during the laminate and package converting processes.

Figure 16:
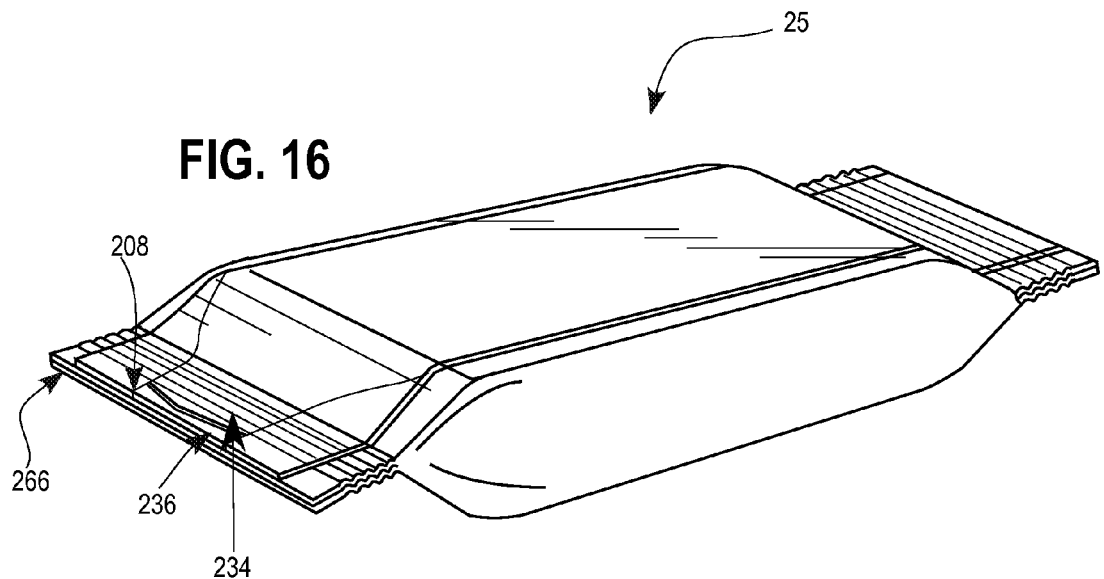
FIGS. 16-17 comprise perspective views of an alternative embodiment of a package with an opening feature.
Figure 17:
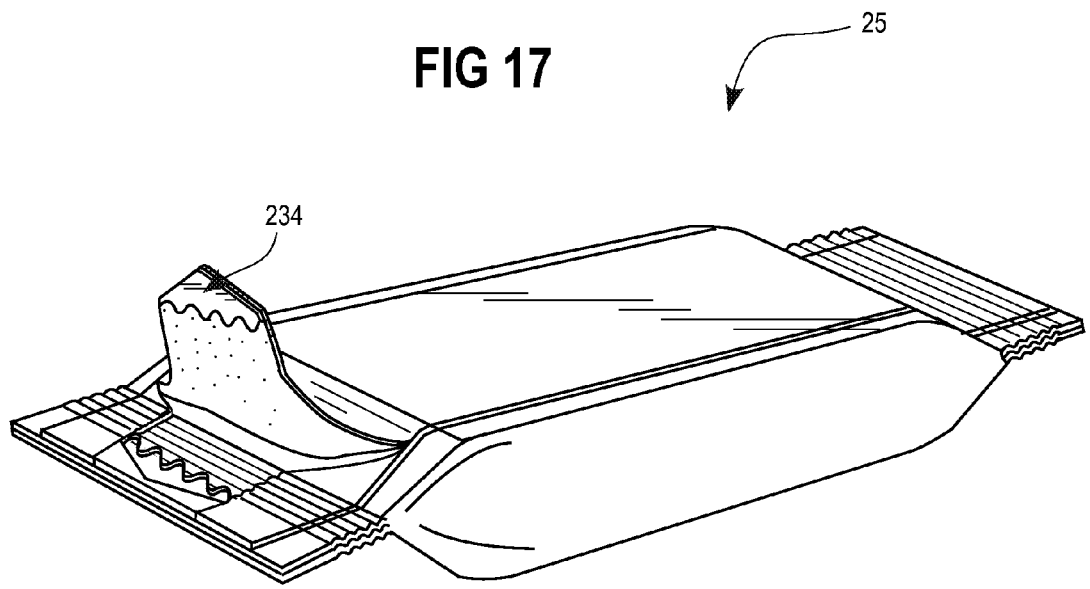
Figure 18:
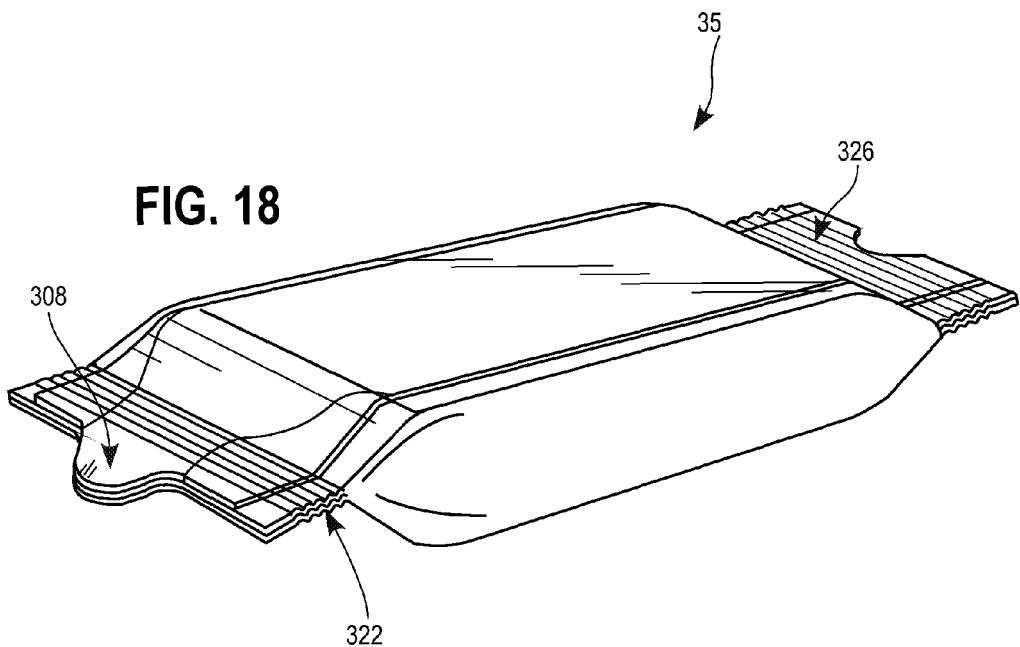
FIGS. 18-20 comprise perspective views of an alternative embodiment of a package with an opening feature.
Figure 19:
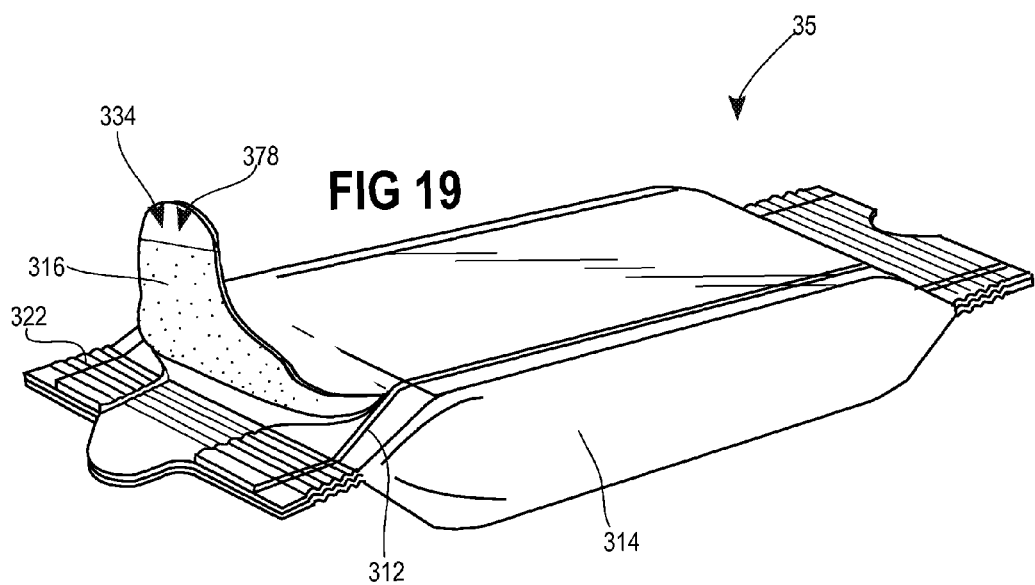
Figure 20:
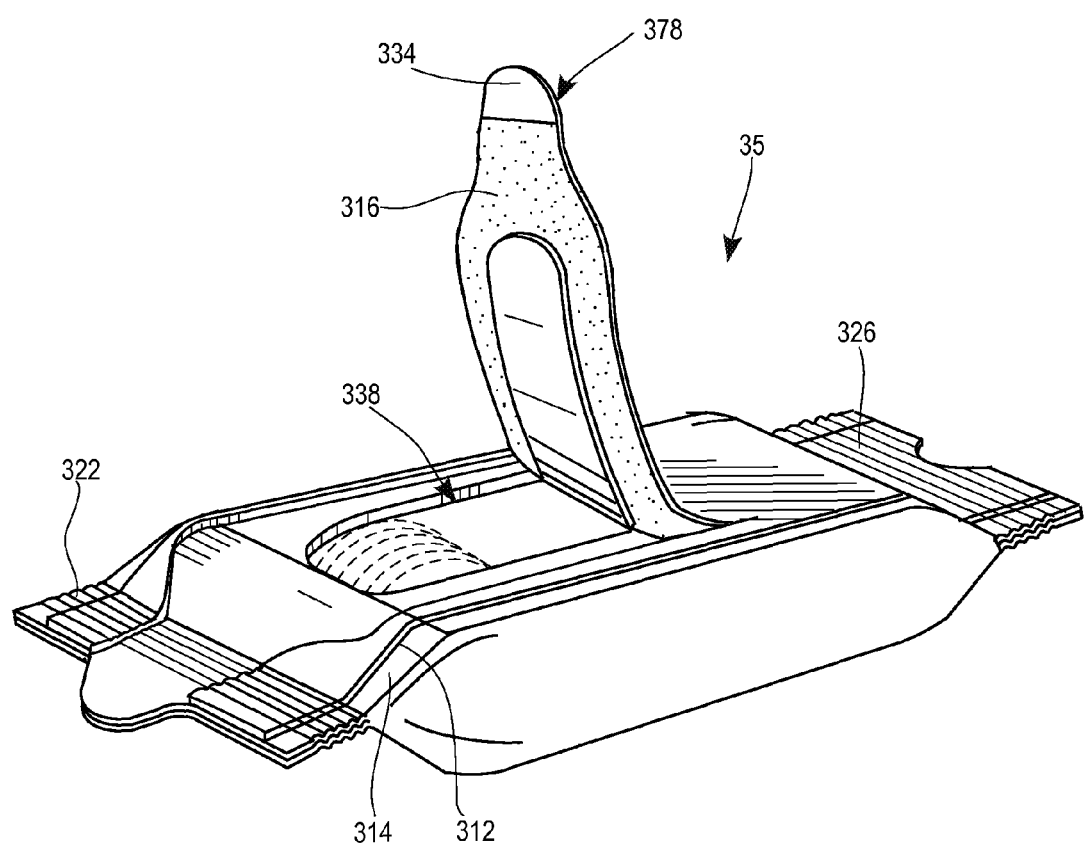
Figure 25:
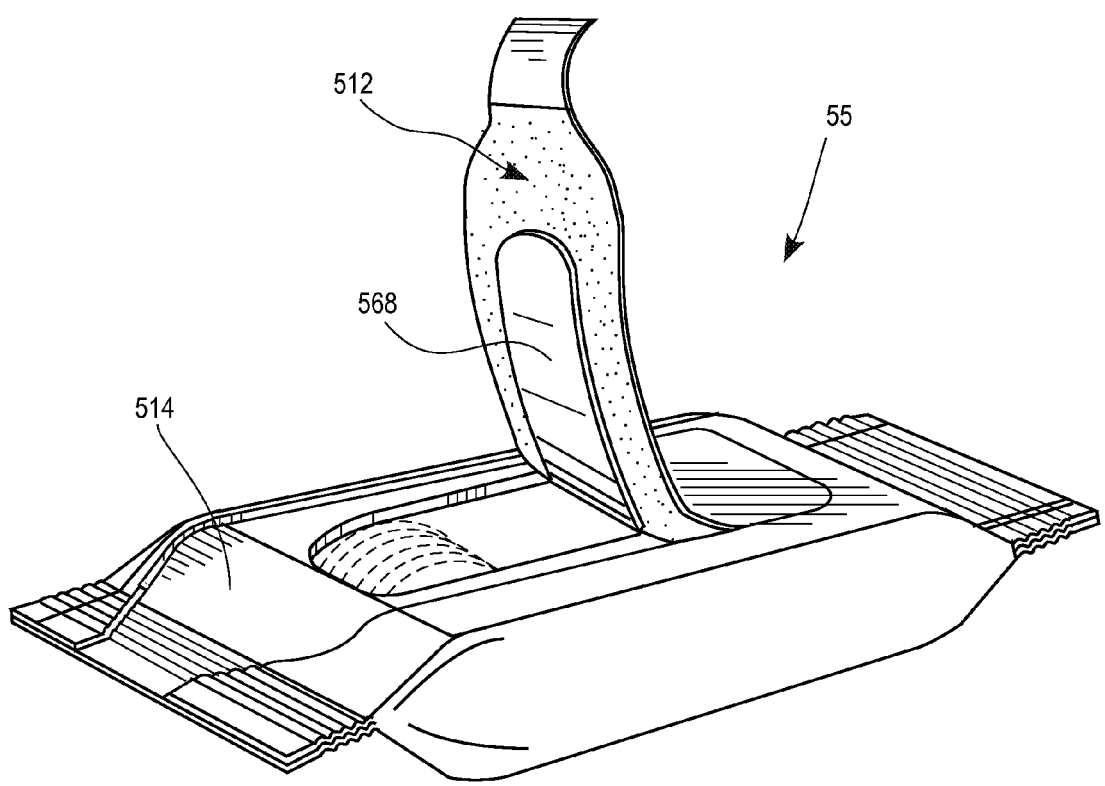
Figure 30:
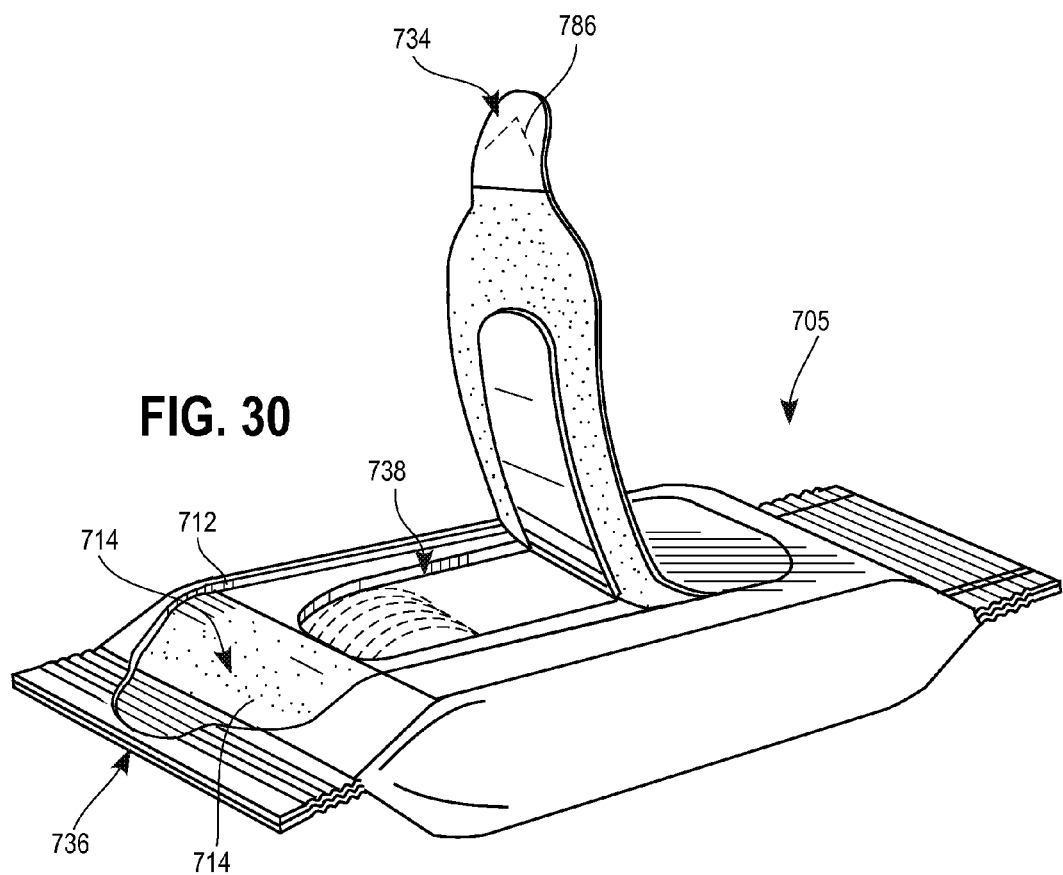

While the embodiments of FIGS. 1-15 have a package edge formed by a curved or contoured knife, in another package configuration 25, shown in FIGS. 16 and 17, the leading, outer package edge 266 is a straight, linear line across the width of the package 25. Further, while the packages 5, 15 have an extension portion defined by the leading edge of the package and a corresponding extension cut-out portion at the trailing edge of the package, the package 25 does not include such an extension. Further, in the packages 5, 15, at least the opposing gripping portions 36, 136 are disposed on the extension portion.

On the other hand, the package 25 of FIGS. 16 and 17, which is formed, in part, by a straight knife cut, does not have a package extension or a corresponding extension cut-out portion. Thus, the leading edge of the package is straight, and the opposing gripping tab 236 has a straight edge as well. The pull tab 234, however, still has a leading edge defined by a full-depth cut, similar to that discussed above with respect to FIGS. 1-10. Therefore, in FIGS. 16 and 17, the leading edge of the package and the opposing gripping tab 236 has a straight edge, whereas the leading edge of the pull tab 234 has a non-linear configuration defined by the full-depth cut. Though the configuration of the package opening feature 208 may be slightly different than the configurations described above, the package opening feature 208 functions similarly to package opening features 8, 18.

In another package configuration, illustrated in FIGS. 18-21, package 35 has an adhesive free area 378. The laminate web 311, illustrated in FIG. 21, illustrates the location of the adhesive free area 378 disposed between the first and second film layers 312 and 314, which may be formed by pattern applying adhesive, or alternatively formed by pulse-coating adhesive, as discussed below. The package opening feature 308 is disposed at the location of the adhesive free area 378, which is disposed beyond the end seal 322. To open the package 35, a consumer may grasp the adhesive free pull tab 334 that is defined by the leading edge of the package and the adhesive free area 378. While previous packages may have incorporated an adhesive free tab on the face of the package in between the end seals, the package opening feature 308 is disposed beyond the end seal 322 such that the consumer may recognize the package opening feature 308 prior to rupturing the end seal 322 and also such that the resulting package opening 338 may be relatively larger than if the package opening feature were included on the face of the package. In addition, to help the consumer further recognize the package opening feature 308, the adhesive free pull tab 334, or a portion thereof, may be disposed in the seal area 364 when the packages are formed. Thus, while the adhesive free tab 334 will not bind to the lower package portions because there is no sealant or other adhesive that may cause them to bind during package formation, the heat treatment of the adhesive-free pull tab 334 will cause shrinking, stretching, or other irregularities in the film to occur, which then curls, arcs, or pulls the adhesive-free pull tab 334 upward slightly so that the consumer more easily recognizes the location of the package opening feature 308. FIG. 22 illustrates a laminate 411 that is similar to the laminate of FIG. 21. For example, the laminate 411 includes an adhesive free area 478 that is disposed, in part, at an end seal area 464. It is anticipated, however, that a straight knife (as opposed to a contoured knife) will separate formed laminate 411 into individual packages such that the packages will have a straight leading and trailing edges.

In the illustrative configuration of FIGS. 23-26, the package 55 includes first and second film layers 512, 514 that are coextensive with one another. Thus, both the first and second film layers 512, 514 wrap around the product and form the longitudinal seal and the upper and lower portions of the end seals 522, 526. By having coextensive films 512, 514, the outer partial-depth cut 546 defines a sealing panel 580 and the general shape of the adhesive-free pull tab 534. When the sealing panel 580 is lifted upward from the package 55, by pulling the adhesive-free pull tab 534 at an end thereof, a flap 568, or a portion thereof, formed in the second film layer 514 also is lifted. The flap 568 is formed by an inner partial-depth cut 548 formed on the interior surface of the second film layer 514. Further, when such packages are formed via pattern-applied adhesives, the pattern may include a permanent adhesive in one area, a resealable adhesive in another area, and an adhesive free area. The various cuts formed into the package are then aligned or registered with the various adhesive zones. For example, the permanent adhesive may be disposed between the film layers 512, 514 in the area where the flap 568 is formed, whereas the resealable adhesive may be disposed in the area between the partial-depth cuts 546 and 548. It also is anticipated that the package 55 may be formed with only resealable adhesive disposed between the layers 512, 514. In such a configuration the resealable adhesive may be discontinuously applied between the layers to form an adhesive free portion 578.

In the embodiment of FIGS. 23-26, the cutting knife that separates the packages 55 from one another is a straight knife, and therefore, the leading edge of the package opening feature 508 is a straight, linear edge. Further, as illustrated in the laminate 511 of FIG. 26, the adhesive-free area 578 is disposed, in part, in the seal area 564 that forms the end seal 522 during package formation. Thus, the adhesive-free pull tab 534 is heat treated to create irregularities in the film to curl, arc, or pull the tab upward at the leading edge thereof.

FIG. 27 illustrates a laminate web 611 similar to the laminate web 511 of FIG. 26, but the outer partial-depth cut 646 is configured differently than the outer partial-depth cut 546. Specifically, the adhesive-free pull tab 634, instead of extending straight outward to the separation cut 562, is defined at the leading edge by the outer partial-depth cut 646. Indeed, the outer partial-depth cut 646 curves inward and closes or intersects with the other portion of the outer partial-depth cut 646 a distance away from the leading edge of the package. In this manner, the leading edge of the adhesive-free pull tab 646 is not defined by a leading edge of the package, which is formed by the separation cut 662, but instead, is defined by the shape of the outer partial-depth cut 646. The pull tab 634, depending on the material of the outer flexible film layer that forms the sealing panel 680 and the pull tab 634, also may have irregularities created therein that cause it to curve or arc upward from the package or otherwise highlight the location of the pull tab 634.

As mentioned above, further tab treatment features may be incorporated into the packages to highlight, or otherwise provide additional indication of, the package opening feature. By one approach, shown in FIGS. 28-31, package 75 includes a pop-up cut 786. The pop-up cut 786 may be a partial-depth cut that is formed into, or near, the pull up tab 734. Specifically, the pop-up cut 786 may be disposed partially through the outer, first film layer such that the pop-up cut 786 is not disposed entirely through the outer, first film layer 712. It is anticipated that the pop-up cut 786 may be formed from the outside surface of the first film layer 712.

Figure 31:
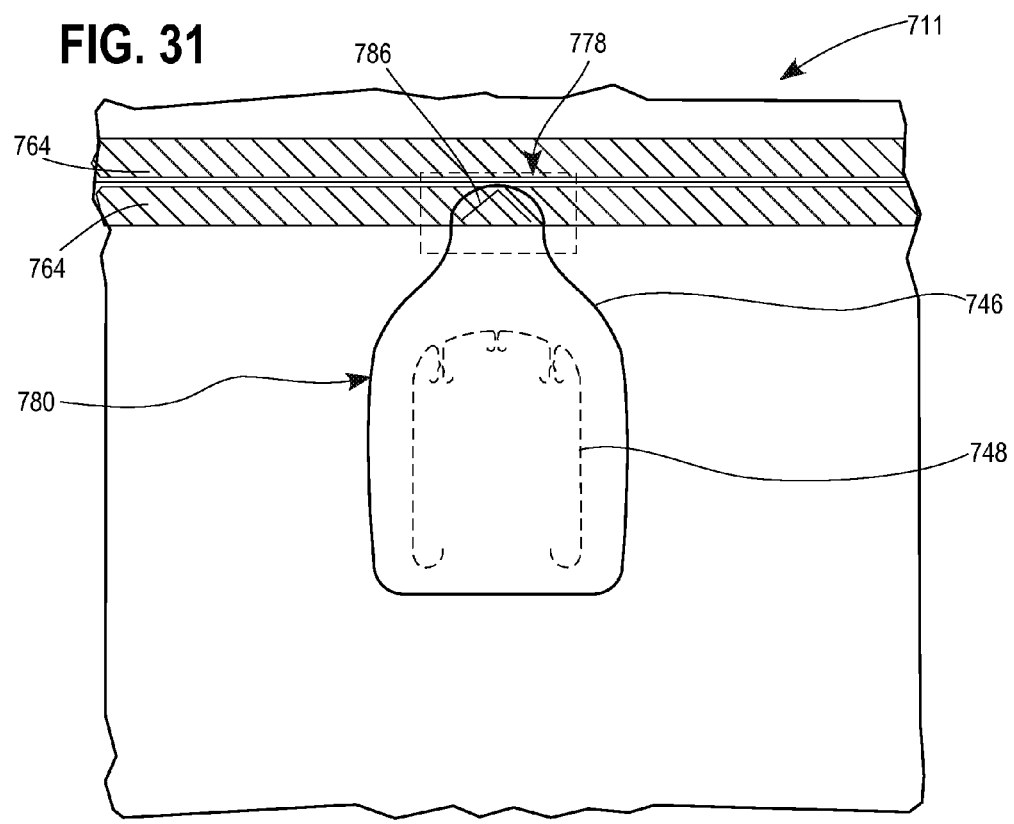
FIG. 31 comprises a top schematic view of a laminate configurable to form the package of FIG. 28.

The flexible film laminate web 711 that forms package 75 has coextensive film layers 712, 714. As shown in FIG. 31, there is an adhesive free area 778 between the first and second film layers 712, 714 that is disposed in the area where the sealing jaws create the seal area 764 that forms the end seal 722. Thus, in addition to the pop-up cut 786, the pull tab 734 may have undergone heat treatment at the end seal, which may create irregularities in the pull tab 734 if the material of the outer, first film layer 712 is susceptible to such deformation. The laminate web 711 is similar to the laminate web 611 illustrated in FIG. 27, with the addition of the pop-up cut 786. Thus, the outer partial-depth cut 746 defines the sealing panel 780 that is lifted upward to expose the package opening 738 defined by inner partial-depth cut 748. Further, the configuration of the outer partial-depth cut 748 defines the generally shape of the pull tab 734. Further, though outer partial-depth cut 746 is illustrated as a closed loop, other configurations are contemplated such that the trailing edge of the sealing panel may not be defined by the outer partial-depth cut 746. In such a configuration, the outer partial-depth cut 746 may terminate, for example, in tear-limiting ends such as a hook configuration.

Figure 32:
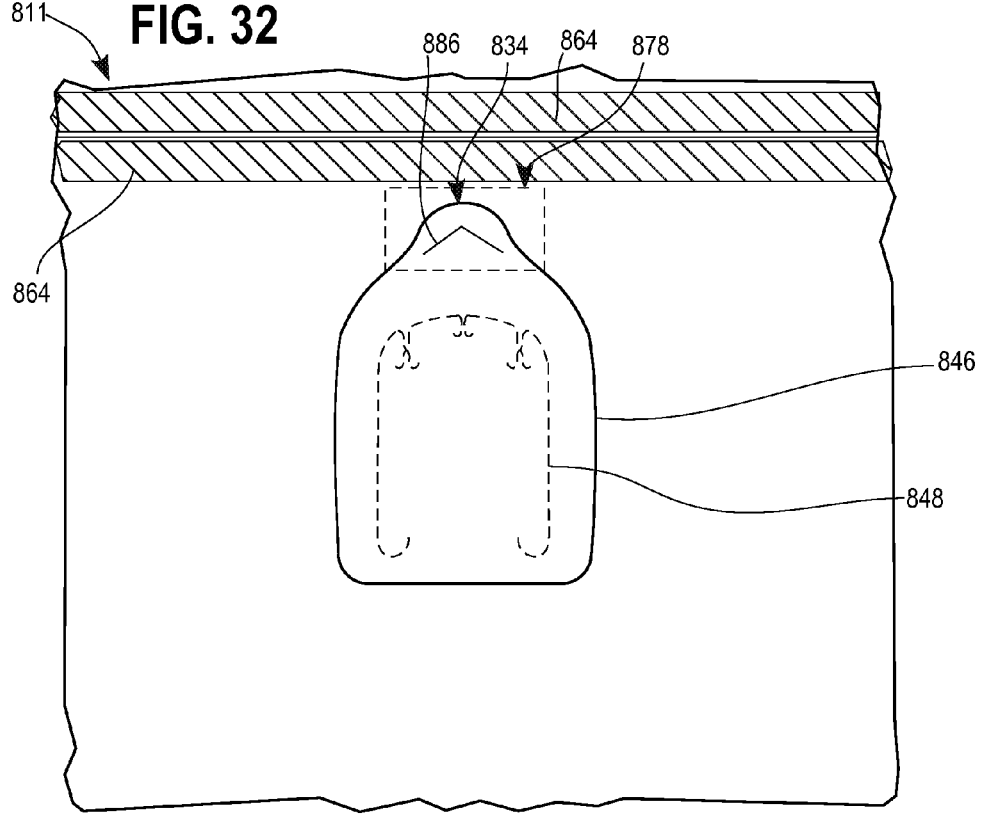
FIG. 32 comprises a top schematic view of an alternative laminate configuration.

By another approach, the flexible film laminate 811, shown in FIG. 32, is configured such that the adhesive-free area 878 is not disposed in the seal area 864, but instead, the adhesive-free area 878 and the peel tab 834 are disposed on the body of the package in between the end seals. As shown, the adhesive-free area is disposed outside of the seal area 864, and the pull tab 834 is, therefore, not subjected to heat treatment. The pull tab 834 does include a pop-up cut 886 formed through a portion of the first film layer.

Figure 33:
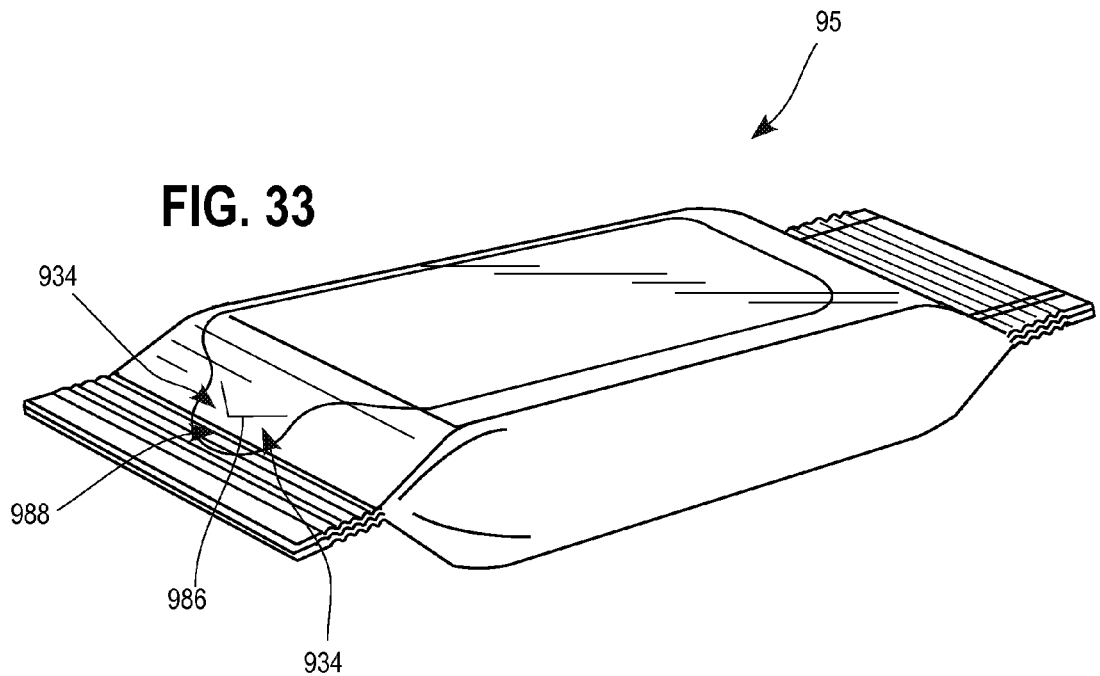
FIGS. 33-35 comprise perspective views of an alternative embodiment of a package with an opening feature.
Figure 34:
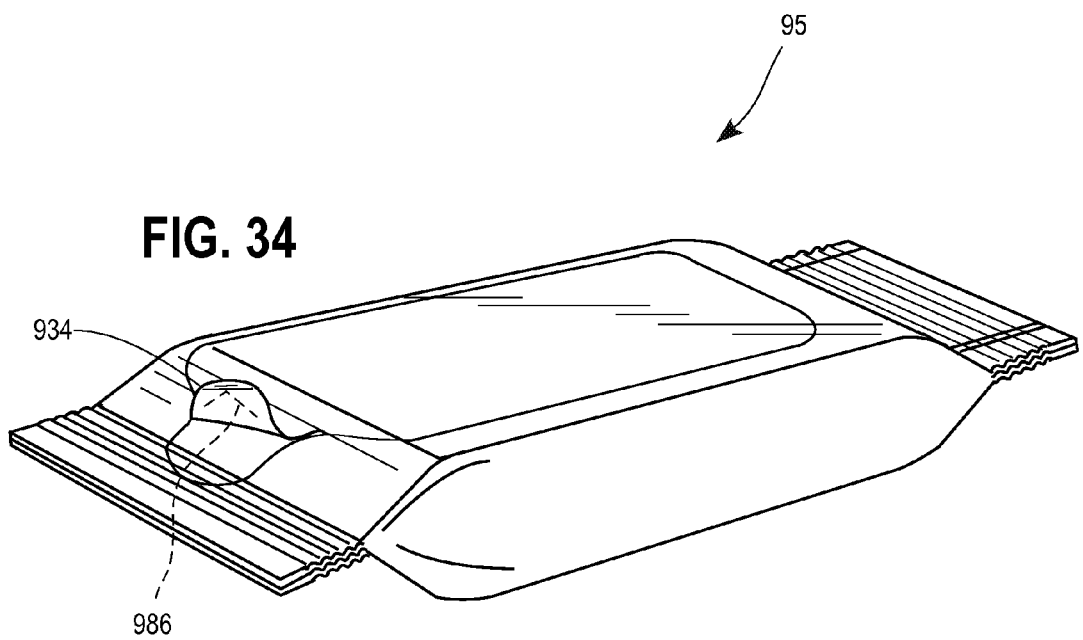
Figure 35:
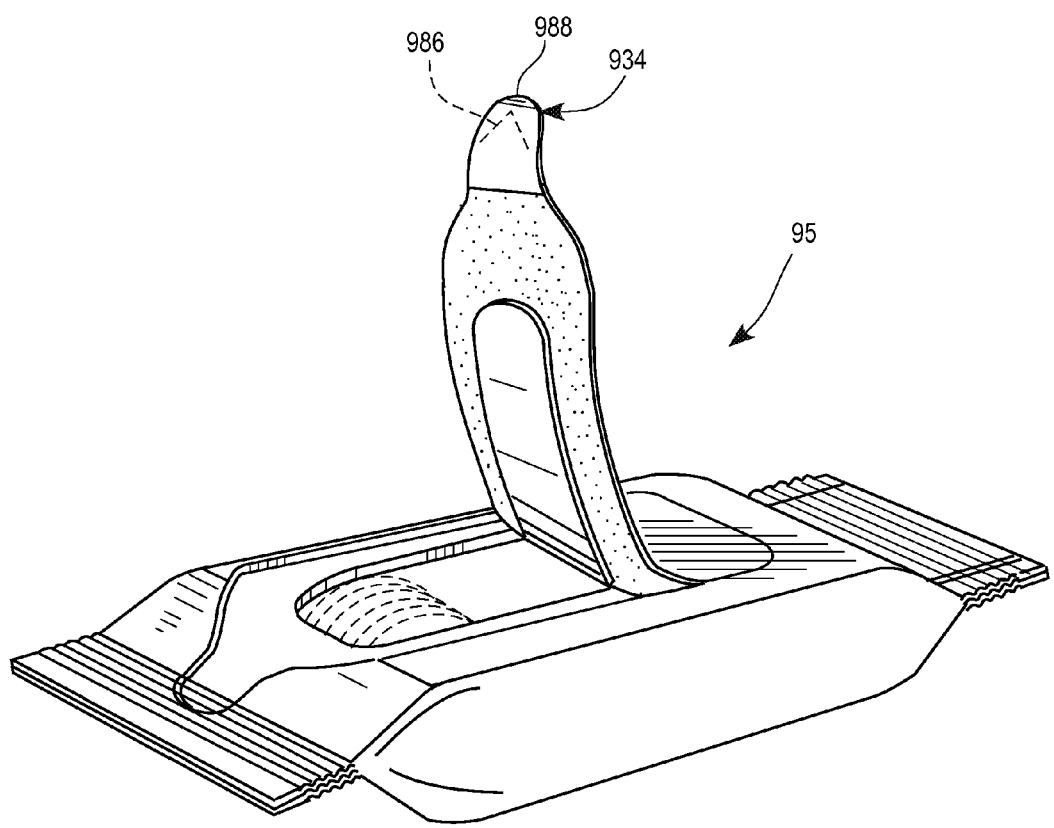

Another embodiment, depicted in FIGS. 33-35, includes a package 95 with a pull tab 934 that has a small portion or a tab tip 988 thereof disposed in the seal area. The tap tip 988 will, therefore, undergo heat treatment that may create irregularities in that portion of the pull tab 934 (if the film material is susceptible to such deformation), which therefore creates a more noticeable or recognizable leading edge of the pull tab 934. Further, by having only a small portion of the pull tab 934 subject to such heat treatment, the majority of the pull tab 934 retains its uniform appearance, similar to the remainder of the package. Package 95 also includes a pop-up cut 986, similar to those discussed above, disposed in a chevron shape. Further, a variety of shapes can be used to create the pop-up cut, such as, for example, an arc, straight line, non-linear line, waves, and closed shapes, to note but a few options.

FIG. 36 illustrates another laminate web 1011 that is similar to the laminate used to create package 95. The laminate web 1011, however includes a differently configured pop-up cut 1086. As shown, the laminate web 1011 has a pull tab 1034 with a tab tip 1088 that is disposed within the seal area 1064 to be heat treated during package formation. In addition, the laminate web 101 includes a linear pop-up cut 1086 disposed at the edge of the heat treated area of the tab tip 1088. In this manner, the tab tip 1088 will be heat treated to create irregularities in that portion of the pull tab 1034, and the heat treatment will not create irregularities that extend beyond the tab tip 1088. Also illustrated in FIG. 36 is the adhesive free area 1078 that extends the entire width of the laminate web 1011. Whereas the adhesive-free areas previously depicted were pattern applied, the adhesive-free area 1078 may be formed by a pulse application of adhesive. More particularly, as the pressure sensitive or resealable adhesive is coated between the first and second film layers of the laminate web 1011, an application tool can apply the adhesive until a certain point or pulse, and then the application tool may refrain from applying any adhesive on that portion of the first or second film layers.

FIG. 37 illustrates yet another laminate web 1111 that is similar to the laminate 1011, but with a slightly different pup-up cut 1186. More particularly, while the pop-up cut 1086 is a linear cut across the width of the pull tab 1034, the pop-up cut 1186 is a linear cut along the longitudinal axis of pull tab 1134. As illustrated, the pop-up cut 1186 extends from a leading edge of the pull tab 1034 along a central, longitudinal axis of the laminate web 1111 where the pull tab 1134 is disposed, but the pop-up cut 1186 terminates a distance before the end of the adhesive-free area 1178 and the location of the inner partial-depth cut 1148 that subsequently forms the package opening.

FIG. 38 illustrates a configuration similar to that of FIG. 37. More particularly, laminate web 1211 includes a pull tab 1234 with a pop-up cut 1286 disposed through a portion of an outer, first film layer. The pop-up cut 1286 has a curved configuration that corresponds to the curvature of the outer partial-depth cut 1246 that forms the sealing panel 1208 that is pulled upward to subsequently expose the package opening.

Figure 41:
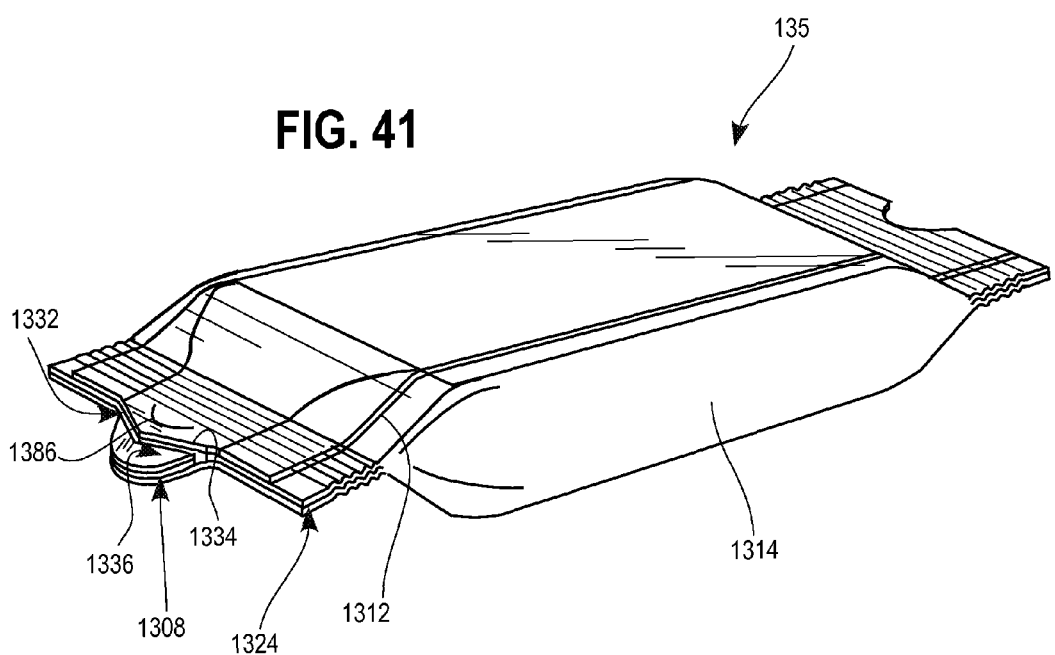
FIGS. 41-42 comprise perspective views of the alternative laminate configuration of FIGS. 39-40 formed into a package.
Figure 42:
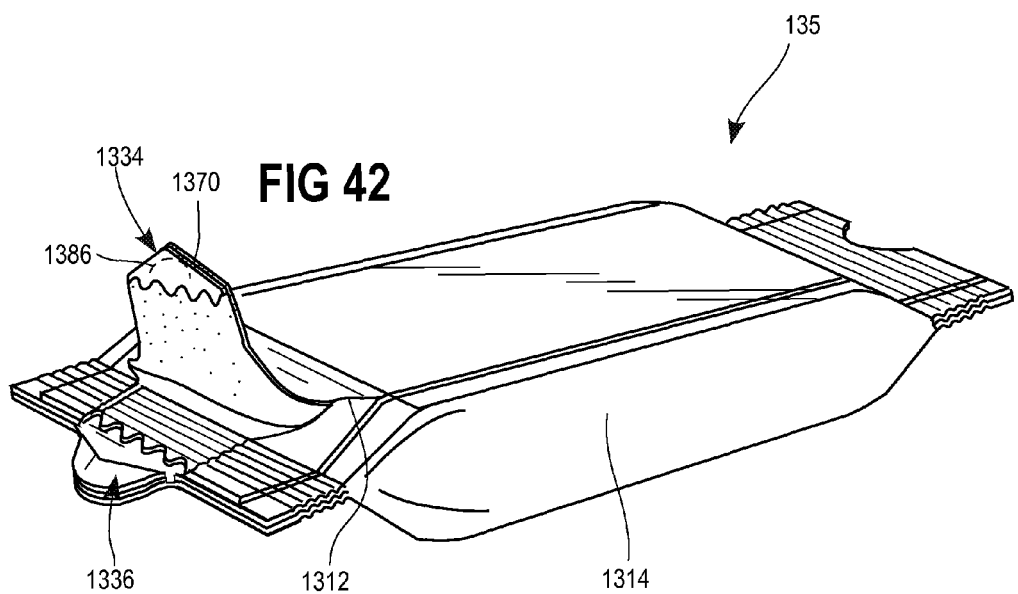

In another configuration, a laminate web 1311, illustrated in FIGS. 39 and 40, includes both a full-depth cut 1354 that defines a leading edge of the pull tab 1334 and partial-depth cuts 1350 that define, in part, a trailing edge of the cut-away portion 1370 (see, e.g., FIG. 42) that forms a portion of the pull tab 1334. In addition, the pull tab 1334 further includes a pop-up score 1386 that is disposed through a portion of the outer, first film layer 1312. In short, the laminate web 1311 is similar to the laminate web 11, with the addition of the pop-up score 1386. As shown in FIGS. 41 and 42, the package 135 formed of the laminate web 1311 includes a package opening feature 1308 that includes opposing gripping portions 1336, a pull tab 1334, and a pop-up score 1386 that creates tension in the film to create irregularities that draw attention to the presence of the pull tab 1334 of the package opening feature 1308.

Figure 43:
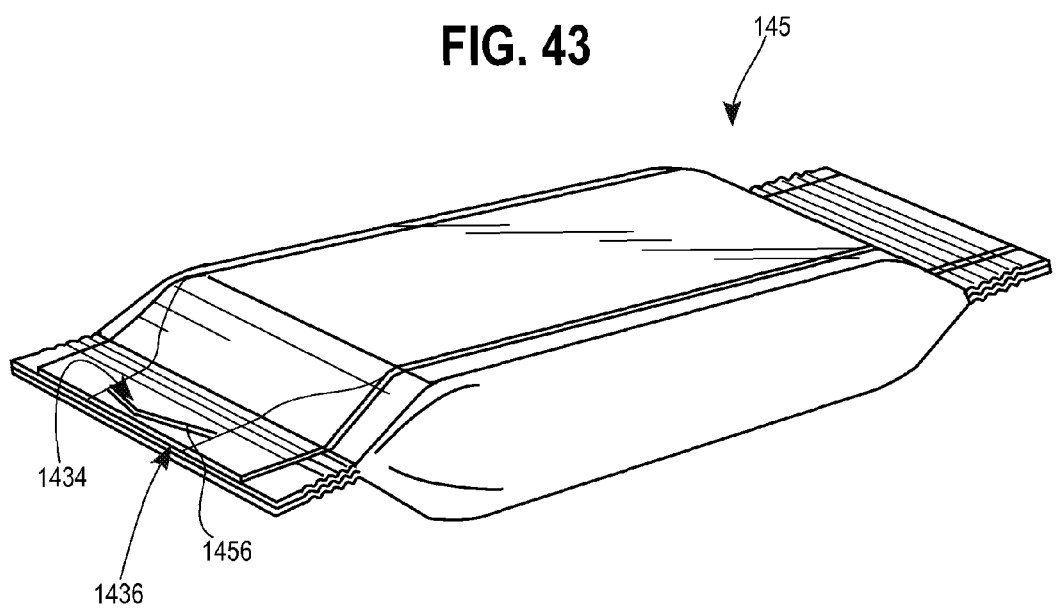
FIGS. 43-44 comprise perspective views of an alternative embodiment of a package with an opening feature.
Figure 44:
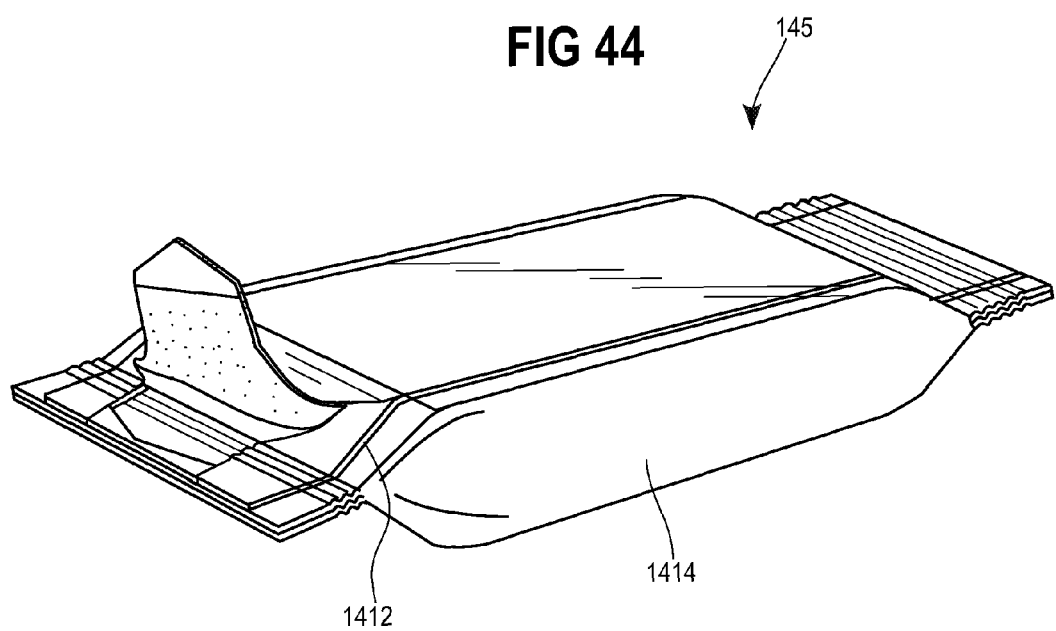

Another package configuration is depicted in FIGS. 43 and 44. The package 145 includes a full-depth cut 1454 and an adhesive free area 1478, as shown in FIG. 45. Further, the full-depth cut 1454 extends through the entire thickness of the flexible film laminate. In addition, the full-depth cut 1454 extends from one portion of the outer partial-depth cut 1446a to another portion of the outer partial-depth cut 1446b, as shown in FIG. 45. Thus, the outer partial-depth cuts 1446a, 1446b connect with the full-depth cut 1454 that forms the leading edge of the pull tab 1434. In such a configuration, a single die may form both cuts, but the portions of the die may have different depths forming the varied cuts.

The laminate web 1411 forming package 145 does not include an inner partial-depth cut at the sealing area to form a cut away portion of the second film layer. Instead, the pull tab 1434 lacks any pressures sensitive or resealable adhesive disposed thereon, and instead, has an adhesive free area 1478 disposed in the location of the pull tab 1434. Thus, a consumer or user can manually pick up the gripping edge 1456 of the pull tab 1434, and pull upward on the first film layer 1412. In the configuration of package 145, the opposing gripping tab 1436 is defined by an outer, leading edge of the package, formed by a straight knife.

In another configuration, similar to FIG. 45, a package formed of a laminate web includes an adhesive-free area that may have a partial-depth cut disposed where the full-depth cut 1454 is located in FIG. 45. In a package formed with this configuration, the pull tab remains the same as depicted in FIGS. 43 and 44, however, the second film layer disposed below the pull tab is anchored to the surrounding second film layer, which helps prevent a consumer from accidentally lifting a portion of the second film layer, which could rupture the adjacent end seal.

Figure 49:
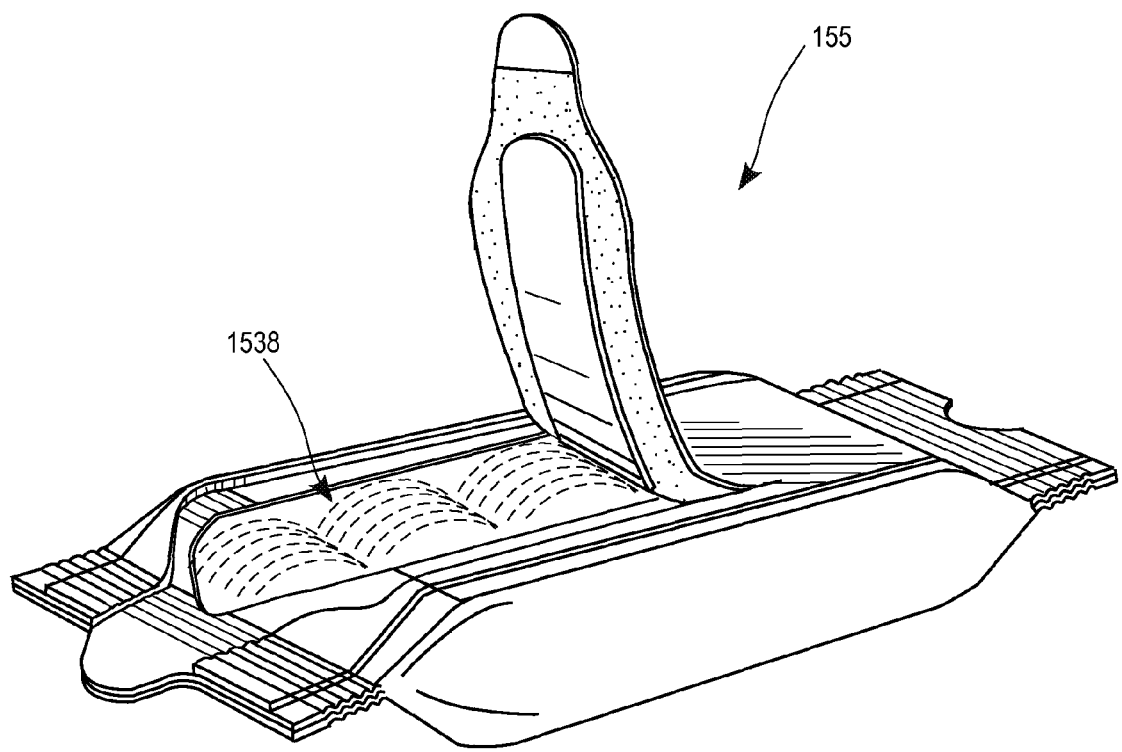

As illustrated above, a number of configurations and geometries can be used for the package opening feature, and the desired opening feature and opening may depend on the products being packaged. FIG. 46 illustrates a laminate web 1511 that is used to form a package 155 shown in FIGS. 47-49. The package 155 includes an opening 1538 that is disposed closer to the package opening feature 1508 than those previously discussed, such that the opening is larger and disposed closer to the end seal 1522. As shown in FIG. 46, the inner partial-depth cut 1548 is partly disposed within the end seal area 1564, such that once the package 155 is formed, the package opening begins directly adjacent the end seal 1522 without completely rupturing the end seal 1552. In this way, the opening 1538 can be quite large without completely rupturing or destroying the end seal and its sealing properties. FIG. 47 illustrates how package 155 is similar to FIG. 18 in the closed configuration. As the pull tab 1534 is lifted from the remainder of the package 155, the package opening 1538 is exposed earlier and closer to the end seal 1522 than the opening of package 35 in FIG. 18. In this manner, the package opening 1538 is larger than other openings and permits increased access to the food products or other contents contained within the package 155.

Figure 53:
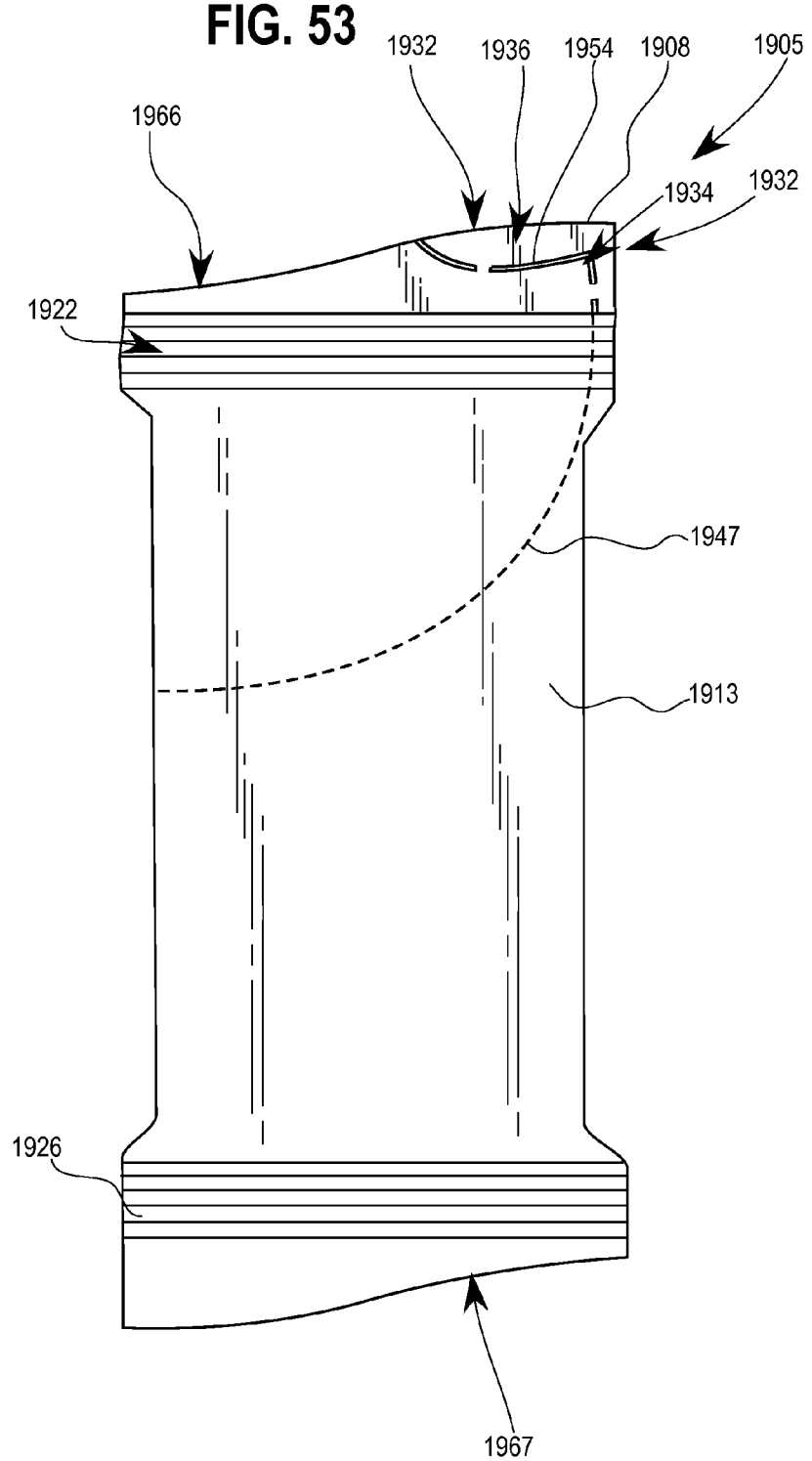
FIGS. 53-54 comprise top schematic view of an alternative embodiment of a package with an opening feature.
Figure 54:
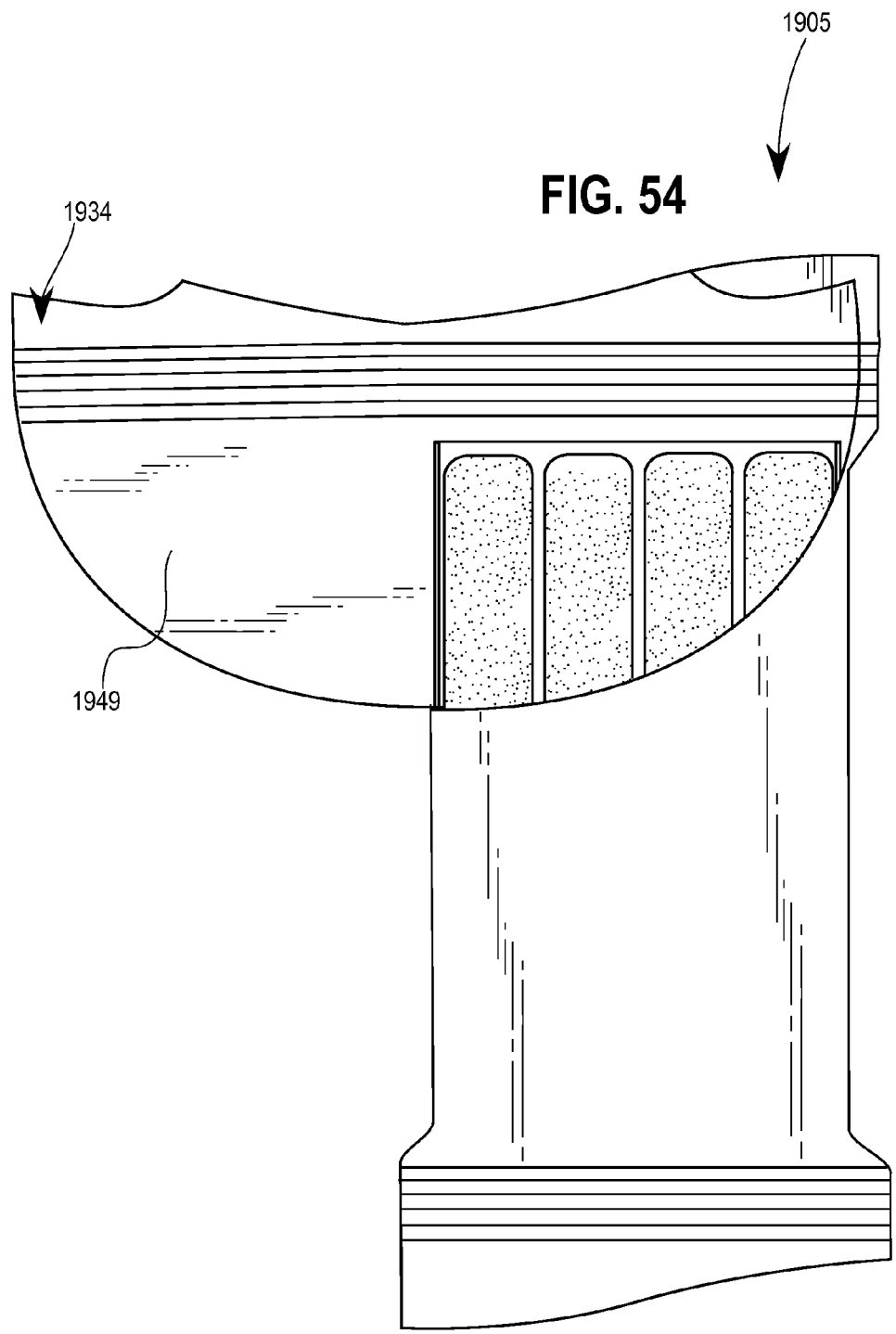
Figure 55:
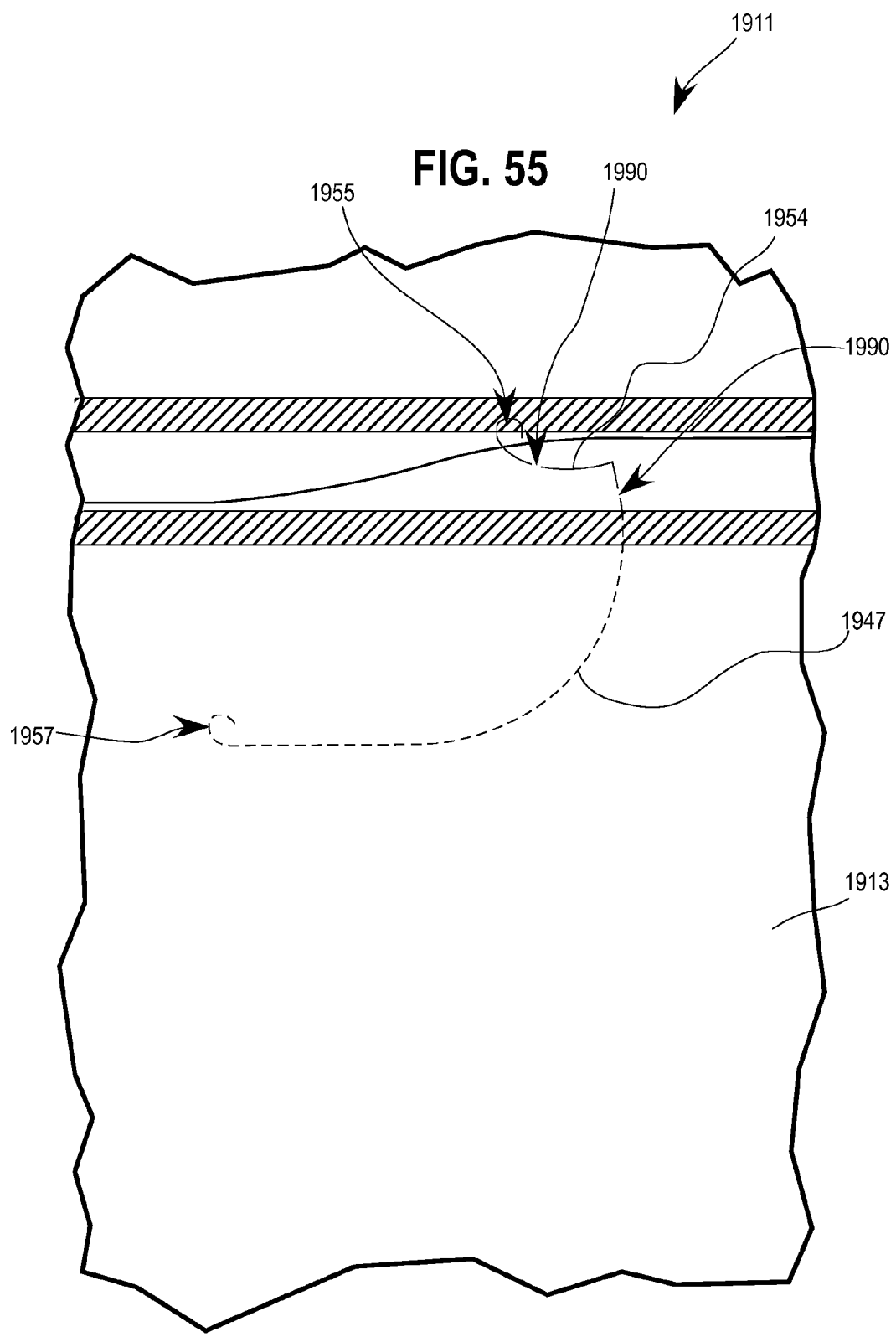
FIG. 55 comprises a top schematic view of a portion of a laminate configured to form the package of FIGS. 53-54.
Figure 56:
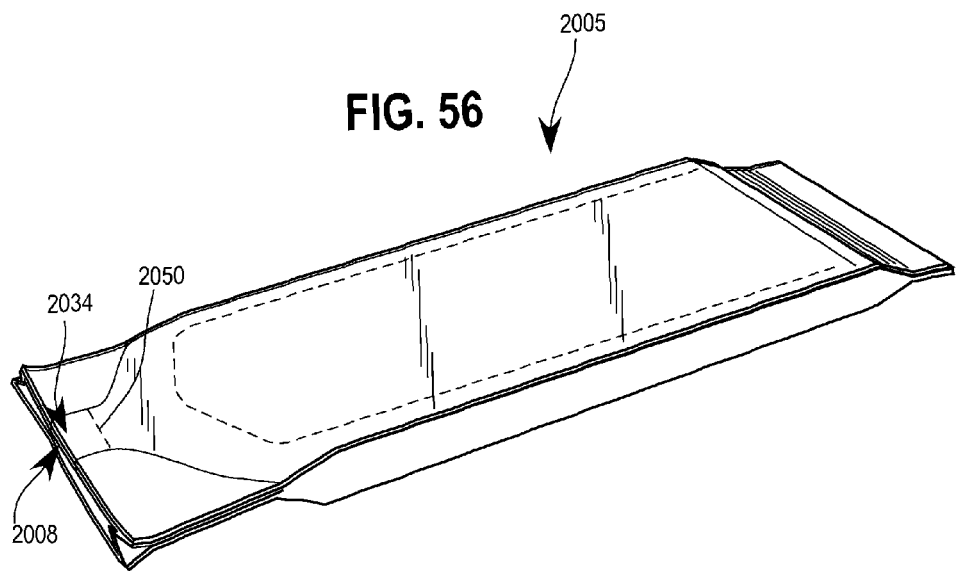
FIGS. 56-57 comprise perspective view of an alternative embodiment of a package with an opening feature.
Figure 57:
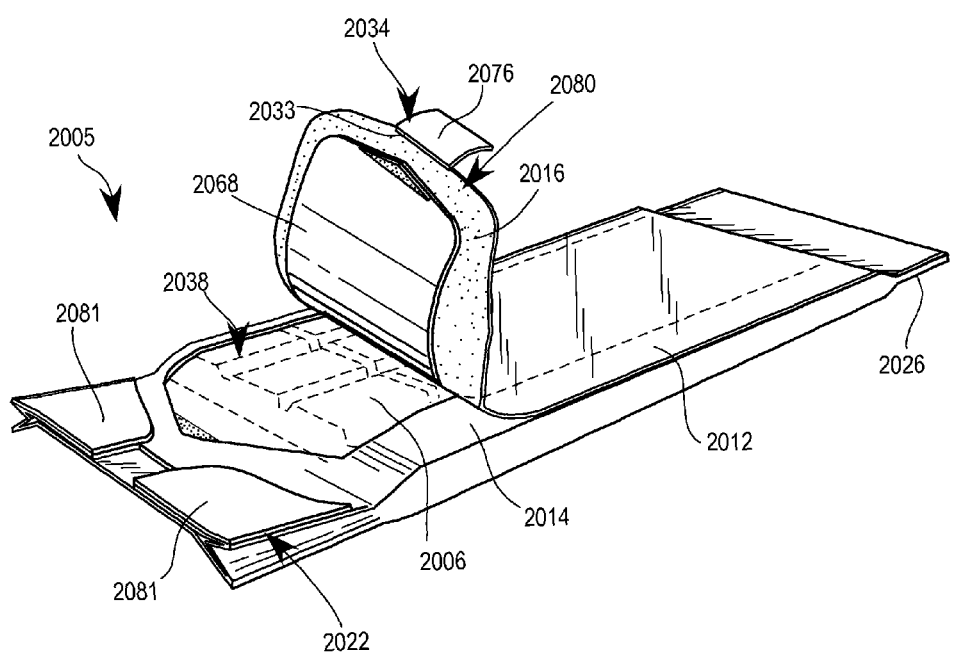

Another exemplary embodiment, depicted in FIGS. 53-55, includes a package 1905 formed of a film 1913 having a first seal 1922, a second 1926, and a longitudinal seal (not shown). The package 1905 is similar to package 15 discussed above such that the package is not intended to be resealable. Thus, there is likely no resealable adhesive in the package 1905. The package 1905 does include an asymmetrical leading and trailing package ends 1966, 1967. These package ends 1966, 1967 may be formed by an asymmetrical separation cut that is formed between end seals of adjacent packages in a series of packages.

In addition, the package 1905 may have an asymmetrical full-depth cut 1954 that is disposed completely through an upper portion of the package end. When formed, the full-depth cut 1954 will be disposed completely through the entire laminate 1911, shown in FIG. 55. The full-depth cut 1954 has an asymmetrical shape that forms an asymmetrical pull tab 1934. Further, the full-depth cut 1954 has reverse perforations 1990, as shown in FIG. 55. This film land area between the portions of the full-depth cut 1954 helps retain the various portions of the film 1913 in relation to one another after the formation of the full-depth cut 1954.

The package 1905 also may include a partial-depth cut 1947. As illustrated in FIG. 54, the partial-depth cut 1947 may have an asymmetrical configuration. Further, this partial-depth cut 1947 extends upward through the first end seal 1922, but does not affect the initial seal of the package because it is only partially through the film 1913. As shown in FIGS. 53 and 55, the parital-depth cut 1947 and the full-depth cut 1954 may extend adjacent one another. Thus, a single die may be used to form both cuts, with the portion of the die forming the full-depth cut 1954 being longer than the portion of the die forming the partial depth cut 1947.

Upon package opening, the user or consumer will grasp the pull tab 1934 of the package opening feature 1908 and pull upward, which will tear or rupture the film 1913 along the partial depth score line 1947 that extends through the first seal 1922. As can be shown in FIG. 54, the package 1905 is opened by pulling a flap 1949 of the film 1913 to the left of the package such that it is disposed adjacent the opening, as opposed to the package 15, where the pull tab 134 is generally pulled down the middle of the package.

Despite the difference in the appearance of the package, the package 1905 functions similarly to package 15. For example, the gripping portions 1932 include the gripping tab 1934 and an opposing gripping portion or tab 1936. Unlike package 15, the opposing gripping portion 1936 does not include a completely separated portion. The portion forming the gripping portion 1936 is formed by a full-depth cut 1954 that terminates within the first seal 1922 and terminates near the partial-depth cut 1954 such that the film can be torn open during the manual opening operation. Both the full-depth cut 1954 and the partial-depth cut 1947 may have one end 1955, 1957 that terminates in a tear-inhibiting configuration such that tear propagation is limited at the terminus. The full-depth cut 1954 and partial-depth cut 1947 can be formed in a number of manners. In one configuration, the asymmetrical partial-depth score 1947 is formed as a controlled tear by forming a score line about 50% through the film with a laser press.

FIGS. 56-59 illustrate a package 2005 suitable for packaging a number of products including those in tablet form such as chocolate tablets. The package 2005 includes a first film layer 2012 and a second film layer 2014. The first film layer 2012 is disposed over a portion of the width of the second film layer 2014 and the entire length of the second film layer 2014, similar to the package 5 of FIG. 1. In addition, a resealable adhesive may be used between portions of the first and second film layers 2012, 2014. In some configurations, the resealable adhesive is disposed continuously between the first and second film layers 2012, 2014.

The package 2005 further includes a first end seal 2022, a second end seal 2026, and a longitudinal end seal (not shown). In one illustrative embodiment, at least the first end seal 2022 is a cold seal such that the film layers that form the seal can be pulled apart within the seal, as opposed to rupturing or separating layers of the film itself. As understood in the art, a cold seal may be produced by an adhesive that may seal only to itself (the film may be given a corona treatment, primer, coating, or another surface treatment so that it bonds to the cold seal adhesive) and the cold seal adhesive only requires contact pressure to bind. It is anticipated that either an adhesive failure or a cohesive failure may be used for the cold seal, though if a cohesive failure is employed, it is anticipated that the damage or change to the originally formed film structure will be minimal. More specifically, depending on how the adhesive or cohesive is applied at the cold seal, the failure may occur within the adhesive or cohesive itself or at the interface or connection between the film and the adhesive or cohesive.

With respect to package 2005 having a chocolate tablet 2006 disposed therein, the first film layer 2012 may cover nearly the entirety of the top of the package. Further, it is anticipated that the resealable adhesive 2016 may be continuously disposed between the two film layers 2012, 2014 without interruption, though other configurations also may be employed. Similar to some of the packages described above, a sealing panel 2080 may be formed within the first film layer 2012. The sealing panel 2080 is lifted to expose an opening 2038 into the package 2005 that provides access to the contents thereof, such as the chocolate tablet 2006. The sealing panel 2080 is formed into the first film layer 2012 by an outer partial-depth cut 2046 formed into the first film layer 2012.

After the sealing panel 2080 is created by forming the outer partial-depth cut 2046 into the first film 2012, the matrix or remainder of the first film layer 2012 that does not form the sealing panel 2080 could be removed from the package. In one exemplary embodiment, however, the matrix 2081 is retained atop the package 2005 and may help retain the shape of the package during opening and closing operations. For example, having a substantial opening 2038 in the package 2005 may result in some buckling occurring at the sides, corners or other transition points, of the opening. If the matrix 2081 is retained on top of the package 2005, the matrix 2081 may stiffen the second film layer 2014 that forms a remainder of the package to thereby help the package 2005 retain its shape and reduce potential buckling of the film. In some embodiments, the matrix 2081 may extend along the edges of the first film layer 2012 nearly or the entire length of the package. In other embodiments, the first film layer 2012 and the matrix may extend nearly the entire width of the package, up to and including the area forming the longitudinal end seal. In other configurations, the matrix 2081 may only be disposed at the leading edge of package 2005 such that the sealing panel 2080 extends the entire width of the first film layer 2012.

Figure 58:
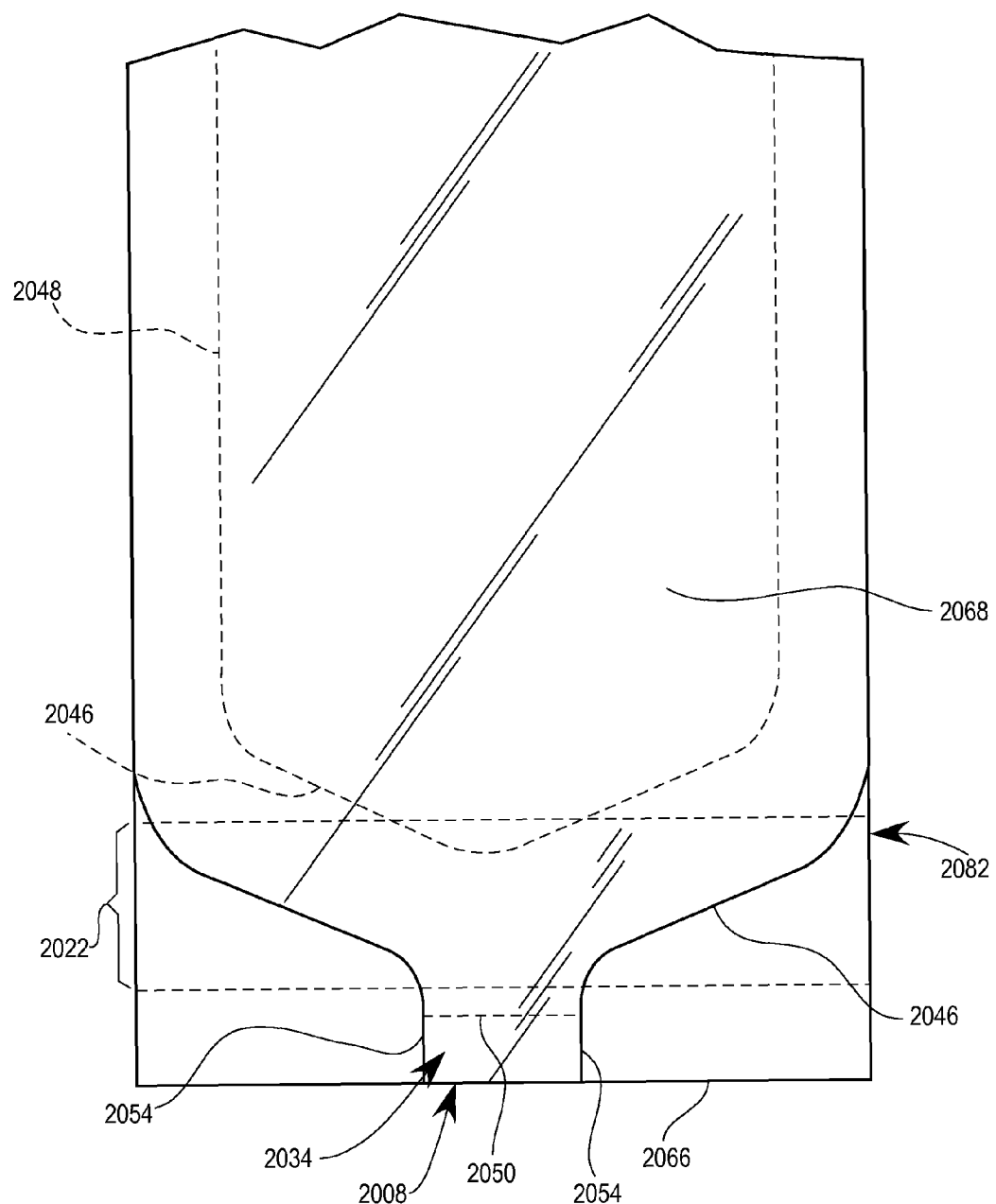
FIG. 58 comprises a top schematic view of a portion of the package of FIGS. 56 and 57.

Package opening feature 2008, as shown in FIG. 58, is formed from a number of cuts through different package layers. These cuts may extend into the portions of the film that form the first end seal 2022 (shown in FIGS. 58 and 59 in dashed lines), which is a cold seal as discussed above. The package opening feature 2008 includes two full-depth cuts 2054, illustrated parallel to one another in this embodiment. The full-depth cuts 2054 extend from the leading edge of the package 2066 to the beginning of the outer partial-depth cuts 2046 that form a portion of the sealing label 2080. Further, the full-depth cuts 2054, along with a leading edge 2066 of the package, form three sides of the pull tab 2034. The full depth-cuts 2054 are disposed through the entire thickness of the first and second film layers 2012, 2014 of the upper portion of the package end 2005. Thus, similar to the packages previously discussed, when a laminate forming a series of packages 2055 is formed, the full-depth cuts 2054 are formed through the entirety of the film laminate.

The trailing edge 2033 (see, e.g., FIG. 57) of the pull tab 2034 is formed by a partial-depth cut 2050 (shown in dashed line in FIG. 58) through the second film layer 2014. The partial-depth cut 2050 may extend into the resealable adhesive 2016 between the film layers, and might even slightly enter the first film layer 2012 that forms the sealing panel 2080. The partial-depth cut 2050, however, does not extend completely through the first film layer 2012 that forms the sealing panel 80. Instead, the pull tab 2034 remains attached to the remainder of the sealing panel 2080 and operates to assist a user or consumer to lift the sealing panel 2080 and expose the package opening 2038.

The package opening 2038 is formed by another partial-depth cut 2048 through the second film layer 2014. As shown in FIG. 58, the inner partial-depth cut 2048 is formed into the second film layer 2014 and the leading end begins at a location that corresponds to the first end seal 2022. Thus, when the flap 2068 is lifted with the sealing panel 2018, a portion of the first end seal 2022 is ruptured. Nonetheless, the remainder of the first end seal 2022 that is not formed by the portion of the second film layer 2014 that forms the flap 2068 remains in position forming the remainder of the first end seal 2022. Further, the first end seal 2022 is a cold seal such that the cohesive or adhesive between the two portions of the second film layer 2014 that form the end seal 2022 retains some of its adhesive properties after the first end seal 2022 has ruptured. Thus, the flap 2068 can be tacked down to the remainder of the container, which helps reclose the package. This tack-to-close feature is in addition to the resealable adhesive 2016 between the sealing label 2080 and the second film layer 2014 that forms the resealable seal around the package opening 2038.

Figure 59:
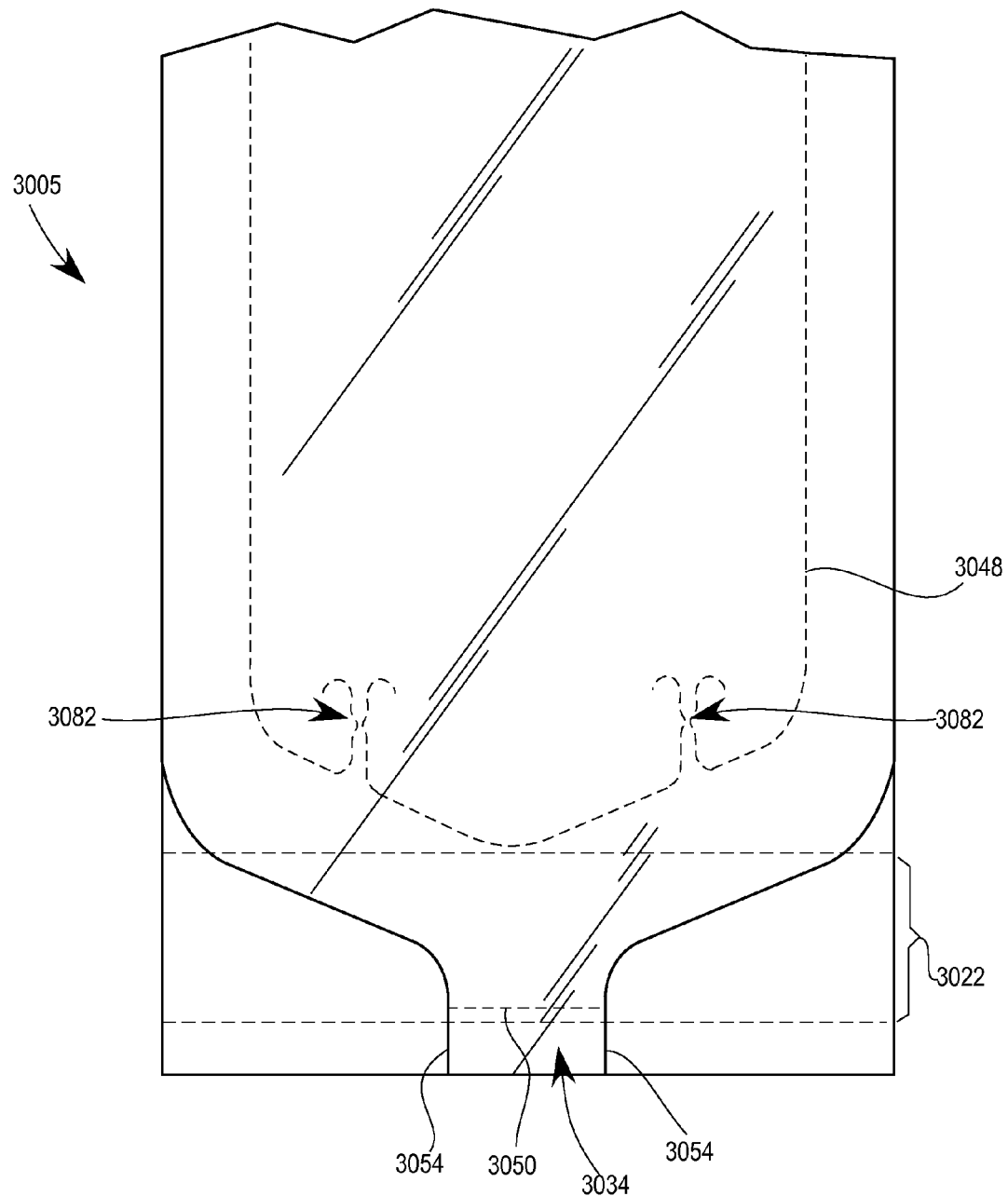
FIG. 59 comprises a top schematic view of an alternative embodiment of FIG. 58.

FIG. 59 illustrates a package 3005 similar to package 2005, but with the addition of package integrity features 3082 and a slight adjustment of the location of the inner partial-depth cut 3048. In this configuration, the inner partial-depth cut 3048 is just outside the first end seal 3022 and is disposed a distance from the end seals. The package integrity feature 3082 includes small strips of film that are stretched and break upon initial opening, to provide an indication that the package 2005 has been previously opened after that initial opening. A number of different integrity features may be incorporated into the packages described herein. Further, the package 3005 has the tab, inner partial-depth cut 3050 just inside the first end seal 3022. In this manner, a small portion of the trailing edge of the pull tab 3034 will have cohesive or adhesive properties thereon.

In addition to tablet products, package 2005 may be particularly useful for products that require a fairly strong reseal or reclosure feature. The reseal adhesive 2016 between the sealing panel 2080 and the second film layer 2014 assist with forming an hermetic seal around the opening and, because the partial-depth cut 2048 may be disposed, in part, within the first seal area 2022, the cohesive or adhesive forming the cold seal may retain some adhesive properties such that this substance helps tack the inner flap 2068 back to a remainder of the package 2005.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed:

1. A package comprising:
   a flexible film laminate having at least first and second film layers, the flexible film laminate defining at least part of an interior cavity and at least the second film layer of the flexible film laminate having:
   a first pair of edge portions forming a first end seal,
   a second pair of edge portions forming a second end seal, and
   a third pair of edge portions forming a longitudinal seal extending from the first end seal to the second end seal;
   the flexible film laminate having a first side, a second side, and a laminate thickness therebetween, the second side of the flexible film laminate oriented toward the interior cavity of the package;
   gripping portions formed in the flexible film laminate adjacent the first end seal, the gripping portions having a pull tab having a first position when the package is closed and a second position when the pull tab, a portion of a sealing panel of the first film layer, and a flap of the second film layer are disposed upward from a remainder of the package to expose a package opening; and
   an outer partial-depth cut extending from the first side of the flexible film laminate through at least a portion of the first film layer, the outer partial-depth cut forming a narrowing portion in the first film layer to facilitate lifting of the sealing panel of the first film layer from a remainder of the package,
   wherein the flap of the second film layer and a trailing edge of the pull tab are defined by inner partial-depth cuts in the second side of the flexible film laminate through at least a portion of the second film layer, and a gripping edge of the pull tab is defined by a throughcut through the entire thickness of the flexible film laminate, the throughcut intersecting the outer partial-depth cut, and wherein the gripping edge is offset from a leading edge of the package.

2. The package of claim 1 wherein the gripping portions further comprises an opposing gripping tab defined by the leading edge of the package.

3. The package of claim 2 further comprising an extension portion defined by the leading edge of the package and a corresponding cut-out portion defined by a trailing edge of the package.

4. The package of claim 3 wherein the opposing gripping portion is disposed upon the extension portion of the package and the pull tab is partly disposed upon the extension portion of the package.

5. The package of claim 4 wherein the throughcut is a line cut disposed on the extension portion and extends from a first extension edge to a second extension edge.

6. The package of claim 1 wherein the first film layer extends at least one of:
   partially over the second film layer and is disposed in at least a portion of the first end seal;
   within the third edge portions of the second film layer and extends from the first end seal to the second end seal; and
   over the second film layer such that the first and second film layers are coextensive with one another.

7. The package of claim 1 further comprising a resealable adhesive disposed between at least portions of the first and second film layers and the sealing layer of the first film layer is resealable with respect to the second film layer with the resealable adhesive disposed between the first and second film layer.

8. The package of claim 1 wherein the pull tab further comprises a cut-away portion of the second film layer defined by the throughcut and a portion of the outer partial-depth cut disposed at the first end seal.

* * * * *

UNITED STATES PATENT AND TRADEMARK OFFICE
CERTIFICATE OF CORRECTION

PATENT NO. : 9,676,537 B2  
APPLICATION NO. : 14/773016  
DATED : June 13, 2017  
INVENTOR(S) : Louis Peter Fenech, III et al.

Page 1 of 1

It is certified that error appears in the above-identified patent and that said Letters Patent is hereby corrected as shown below:

On the Title Page

Column 1, (71) Applicant, Line 1, delete "Intercontintental" and insert --Intercontinental-- therefor.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*